(12) United States Patent
Tidwell et al.

(10) Patent No.: US 8,179,594 B1
(45) Date of Patent: May 15, 2012

(54) METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS

(75) Inventors: Steven C. Tidwell, Kirkland, WA (US); Thomas H. Loftus, Seattle, WA (US); Charles A. Lemaire, Apple Valley, MN (US)

(73) Assignee: Lockheed Martin Corporation, Bethesda, MD (US)

(*) Notice: Subject to any disclaimer, the term of this patent is extended or adjusted under 35 U.S.C. 154(b) by 571 days.

(21) Appl. No.: 12/165,651

(22) Filed: Jun. 30, 2008

Related U.S. Application Data

(60) Provisional application No. 60/937,770, filed on Jun. 29, 2007, provisional application No. 60/947,398, filed on Jun. 30, 2007.

(51) Int. Cl.
  *H01S 4/00* (2006.01)
  *H04B 10/17* (2006.01)
(52) U.S. Cl. ...................................... 359/349
(58) Field of Classification Search ............ 359/349
  See application file for complete search history.

(56) References Cited

U.S. PATENT DOCUMENTS

| | | | |
|---|---|---|---|
| 3,728,117 A | 4/1973 | Heidenhain et al. | |
| 4,200,846 A | * 4/1980 | Stark et al. | ............... 359/349 |
| 4,278,902 A | 7/1981 | Loy et al. | |
| 4,313,648 A | 2/1982 | Yano et al. | |
| 4,367,040 A | 1/1983 | Goto | |
| 4,424,435 A | 1/1984 | Barnes, Jr. | |
| 4,523,315 A | 6/1985 | Stone | |
| 4,794,345 A | 12/1988 | Linford et al. | |
| 4,862,257 A | 8/1989 | Ulich | |

(Continued)

FOREIGN PATENT DOCUMENTS

EP 1 458 067 9/2004

(Continued)

OTHER PUBLICATIONS

Krause, J.T., et al., "Arc Fusion Splices With Near Pristine Strengths and Impoved Optical Loss", "22nd European Conference on Optical Communication", 1996, pp. 2.237-2.240.

(Continued)

*Primary Examiner* — Eric Bolda
(74) *Attorney, Agent, or Firm* — Charles A. Lemaire; Lemaire Patent Law Firm, P.L.L.C.

(57) ABSTRACT

Apparatus and method for spectral-beam combining of light from a plurality of high-power lasers (e.g., fiber MOPA lasers) that, in some embodiments, use substantially identical diffraction gratings in a 1-D non-parallel, mutually compensating configuration to combine non-parallel converging input beams in one plane each having a slightly different successively higher wavelength into a single output beam of high quality. In other embodiments, an output grating and one or more input gratings in a 1-D parallel, mutually compensating configuration combine non-parallel input beams in one plane into a single output beam of high quality. In other embodiments, a 2-D plurality of input gratings in a non-parallel configuration combine a plurality of non-parallel input beams not in one plane each having a slightly different successively higher wavelength into a set of converging beams in one plane directed towards an output grating that compensates for chromatic dispersions introduced by the input gratings.

23 Claims, 37 Drawing Sheets
(33 of 37 Drawing Sheet(s) Filed in Color)

U.S. PATENT DOCUMENTS

| | | | |
|---|---|---|---|
| 4,895,790 A | 1/1990 | Swanson et al. | |
| 5,052,780 A | 10/1991 | Klein | |
| 5,243,448 A * | 9/1993 | Banbury | 359/13 |
| 5,319,668 A | 6/1994 | Luecke | |
| 5,323,404 A | 6/1994 | Grubb | |
| 5,379,310 A | 1/1995 | Papen et al. | |
| 5,440,416 A | 8/1995 | Cohen et al. | |
| 5,526,155 A | 6/1996 | Knox et al. | |
| 5,608,826 A | 3/1997 | Boord et al. | |
| 5,642,447 A | 6/1997 | Pan et al. | |
| 5,661,835 A | 8/1997 | Kato et al. | |
| 5,802,236 A | 9/1998 | DiGiovanni et al. | |
| 5,815,518 A | 9/1998 | Reed et al. | |
| 5,818,630 A | 10/1998 | Fermann et al. | |
| 5,838,700 A | 11/1998 | Dianov et al. | |
| 5,847,863 A | 12/1998 | Galvanauskas et al. | |
| 5,867,305 A | 2/1999 | Waarts et al. | |
| 5,907,436 A | 5/1999 | Perry et al. | |
| 5,930,030 A | 7/1999 | Scifres | |
| 5,974,060 A | 10/1999 | Byren et al. | |
| 6,014,249 A | 1/2000 | Fermann et al. | |
| 6,023,361 A | 2/2000 | Ford | |
| 6,028,879 A | 2/2000 | Ershov | |
| 6,031,952 A | 2/2000 | Lee | |
| 6,053,640 A | 4/2000 | Miyokawa et al. | |
| 6,061,170 A | 5/2000 | Rice et al. | |
| 6,072,931 A | 6/2000 | Yoon et al. | |
| 6,081,635 A | 6/2000 | Hehmann | |
| 6,097,863 A | 8/2000 | Chowdhury | |
| 6,163,552 A | 12/2000 | Engelberth et al. | |
| 6,163,554 A | 12/2000 | Chang et al. | |
| 6,181,465 B1 | 1/2001 | Grubb et al. | |
| 6,192,062 B1 | 2/2001 | Sanchez-Rubio et al. | |
| 6,208,679 B1 | 3/2001 | Sanchez-Rubio et al. | |
| 6,212,310 B1 | 4/2001 | Waarts et al. | |
| 6,226,077 B1 | 5/2001 | Dunne | |
| 6,275,623 B1 | 8/2001 | Brophy et al. | |
| 6,295,304 B1 | 9/2001 | Koch et al. | |
| 6,301,271 B1 | 10/2001 | Sanders et al. | |
| 6,310,899 B1 | 10/2001 | Jacobvitz-Veselka et al. | |
| 6,327,292 B1 | 12/2001 | Sanchez-Rubio et al. | |
| 6,330,523 B1 | 12/2001 | Kacyra et al. | |
| 6,339,662 B1 | 1/2002 | Koteles et al. | |
| 6,381,008 B1 | 4/2002 | Branagh et al. | |
| 6,381,388 B1 | 4/2002 | Epworth et al. | |
| 6,400,495 B1 | 6/2002 | Zayhowski | |
| 6,407,855 B1 | 6/2002 | MacCormack et al. | |
| 6,418,152 B1 | 7/2002 | Davis | |
| 6,426,965 B1 | 7/2002 | Chang et al. | |
| 6,434,172 B1 | 8/2002 | DiGiovanni et al. | |
| 6,456,756 B1 | 9/2002 | Mead | |
| 6,496,301 B1 | 12/2002 | Koplow et al. | |
| 6,501,782 B1 | 12/2002 | Farmer | |
| 6,584,133 B1 | 6/2003 | Walker et al. | |
| 6,603,912 B2 | 8/2003 | Birks | |
| 6,625,180 B2 | 9/2003 | Bufetov et al. | |
| 6,625,364 B2 | 9/2003 | Johnson et al. | |
| 6,631,234 B1 | 10/2003 | Russell et al. | |
| 6,654,522 B2 | 11/2003 | Chandalia et al. | |
| 6,665,471 B1 | 12/2003 | Farmer et al. | |
| 6,696,142 B2 | 2/2004 | Baer et al. | |
| 6,697,192 B1 | 2/2004 | Fan et al. | |
| 6,717,655 B2 | 4/2004 | Cheng et al. | |
| 6,754,006 B2 | 6/2004 | Barton et al. | |
| 6,765,724 B1 | 7/2004 | Kramer | |
| 6,775,057 B2 | 8/2004 | Akasaka et al. | |
| 6,798,960 B2 | 9/2004 | Hamada | |
| 6,807,338 B2 | 10/2004 | Bouteiller et al. | |
| 6,819,871 B1 | 11/2004 | Baldwin et al. | |
| 6,822,796 B2 | 11/2004 | Takada et al. | |
| 6,829,421 B2 | 12/2004 | Forbes et al. | |
| 6,836,607 B2 | 12/2004 | Dejneka et al. | |
| 6,845,108 B1 | 1/2005 | Liu et al. | |
| 6,845,204 B1 | 1/2005 | Broeng et al. | |
| 6,865,344 B1 | 3/2005 | Johnson et al. | |
| 6,868,099 B1 | 3/2005 | Walker et al. | |
| 6,882,431 B2 | 4/2005 | Teich et al. | |
| 6,882,467 B1 | 4/2005 | Emori et al. | |
| 6,882,468 B2 | 4/2005 | Emori et al. | |
| 6,898,339 B2 | 5/2005 | Shah et al. | |
| 6,901,197 B2 | 5/2005 | Hasegawa et al. | |
| 6,914,916 B2 | 7/2005 | Pezeshki et al. | |
| 6,917,466 B2 | 7/2005 | Namiki et al. | |
| 6,917,631 B2 | 7/2005 | Richardson et al. | |
| 6,937,795 B2 | 8/2005 | Squires et al. | |
| 6,950,692 B2 | 9/2005 | Gelikonov et al. | |
| 6,952,510 B1 | 10/2005 | Karlsen et al. | |
| 6,958,859 B2 * | 10/2005 | Hoose et al. | 359/566 |
| 6,959,021 B2 | 10/2005 | Po et al. | |
| 6,959,130 B2 | 10/2005 | Fauver et al. | |
| 6,960,027 B1 | 11/2005 | Krah et al. | |
| 6,961,356 B2 | 11/2005 | Brown | |
| 6,963,354 B1 | 11/2005 | Scheps | |
| 6,965,469 B2 | 11/2005 | Avizonis et al. | |
| 6,996,343 B2 | 2/2006 | Neilson | |
| 7,043,127 B2 | 5/2006 | Hasegawa et al. | |
| 7,050,221 B2 | 5/2006 | Emori et al. | |
| 7,065,107 B2 | 6/2006 | Hamilton et al. | |
| 7,072,369 B2 | 7/2006 | Matsushita et al. | |
| 7,072,553 B2 | 7/2006 | Johnson et al. | |
| 7,106,932 B2 | 9/2006 | Birks et al. | |
| 7,113,327 B2 | 9/2006 | Gu et al. | |
| 7,113,524 B2 | 9/2006 | Bonaccini et al. | |
| 7,116,469 B2 | 10/2006 | Bragheri et al. | |
| 7,136,559 B2 | 11/2006 | Yusoff et al. | |
| 7,142,757 B1 | 11/2006 | Ward | |
| 7,167,300 B2 | 1/2007 | Fermann et al. | |
| 7,190,705 B2 | 3/2007 | Fermann et al. | |
| 7,199,919 B2 | 4/2007 | Emori et al. | |
| 7,199,924 B1 * | 4/2007 | Brown et al. | 359/556 |
| 7,206,123 B2 | 4/2007 | Emori et al. | |
| 7,221,822 B2 | 5/2007 | Grudinin et al. | |
| 7,227,814 B2 | 6/2007 | Frederick et al. | |
| 7,233,442 B1 | 6/2007 | Brown et al. | |
| 7,242,835 B2 | 7/2007 | Busse et al. | |
| 7,248,399 B2 | 7/2007 | Taniguchi et al. | |
| 7,259,906 B1 | 8/2007 | Islam | |
| 7,280,730 B2 | 10/2007 | Dong et al. | |
| 7,340,140 B1 | 3/2008 | Xu et al. | |
| 7,349,589 B2 | 3/2008 | Temelkuran et al. | |
| 7,349,611 B2 | 3/2008 | Broeng et al. | |
| 7,362,497 B2 | 4/2008 | Hodder et al. | |
| 7,376,312 B2 | 5/2008 | Nawae et al. | |
| 7,376,315 B2 | 5/2008 | Kurosawa et al. | |
| 7,391,561 B2 | 6/2008 | Di Teodoro et al. | |
| 7,400,442 B2 | 7/2008 | Matsushita et al. | |
| 7,414,780 B2 | 8/2008 | Fermann et al. | |
| 7,424,193 B2 | 9/2008 | Galvanauskas | |
| 7,433,116 B1 | 10/2008 | Islam | |
| 7,436,588 B2 * | 10/2008 | Rothenberg et al. | 359/349 |
| 7,437,046 B2 | 10/2008 | DiGiovanni et al. | |
| 7,440,167 B2 | 10/2008 | Taniguchi et al. | |
| 7,447,444 B2 | 11/2008 | Igarashi et al. | |
| 7,471,705 B2 | 12/2008 | Gerstenberger et al. | |
| 7,477,666 B2 | 1/2009 | Liu | |
| 7,508,853 B2 | 3/2009 | Harter et al. | |
| 7,519,253 B2 | 4/2009 | Islam | |
| 7,532,656 B2 | 5/2009 | Yang et al. | |
| 7,548,368 B2 | 6/2009 | Akasaka et al. | |
| 7,576,909 B2 | 8/2009 | Harter et al. | |
| 7,590,323 B2 | 9/2009 | Broeng et al. | |
| 7,620,077 B2 | 11/2009 | Henderson | |
| 7,671,337 B1 | 3/2010 | Tidwell | |
| 7,692,852 B2 | 4/2010 | Akasaka et al. | |
| 7,701,987 B1 | 4/2010 | Savage-Leuchs et al. | |
| 7,711,013 B2 | 5/2010 | Liu et al. | |
| 7,768,700 B1 | 8/2010 | Savage-Leuchs | |
| 7,782,912 B2 | 8/2010 | Harter et al. | |
| 7,787,729 B2 | 8/2010 | Dong et al. | |
| 7,872,794 B1 | 1/2011 | Minelly et al. | |
| 7,876,498 B1 | 1/2011 | Honea et al. | |
| 7,876,803 B1 | 1/2011 | Di Teodoro et al. | |
| 7,907,197 B2 | 3/2011 | Takiguchi | |
| 2002/0122644 A1 | 9/2002 | Birks | |
| 2002/0181856 A1 | 12/2002 | Sappey et al. | |
| 2003/0068150 A1 | 4/2003 | Ariel et al. | |
| 2004/0033043 A1 | 2/2004 | Monro et al. | |

| | | |
|---|---|---|
| 2004/0076197 A1 | 4/2004 | Clarkson |
| 2004/0240038 A1 | 12/2004 | Kado et al. |
| 2005/0041702 A1 | 2/2005 | Fermann et al. |
| 2005/0169590 A1 | 8/2005 | Alkeskjold |
| 2006/0028374 A1 | 2/2006 | Fullerton |
| 2006/0067632 A1 | 3/2006 | Broeng et al. |
| 2006/0204190 A1 | 9/2006 | Ranka et al. |
| 2006/0233554 A1 | 10/2006 | Ramachandran et al. |
| 2008/0077200 A1 | 3/2008 | Bendett et al. |

FOREIGN PATENT DOCUMENTS

| | | |
|---|---|---|
| EP | 1 482 609 | 12/2004 |
| WO | WO 0049436 | 8/2000 |
| WO | WO 0060388 | 10/2000 |
| WO | WO 0165647 A2 | 9/2001 |

OTHER PUBLICATIONS

Augst, S.J., et al., "Wavelength beam combining of ytterbium fiber lasers", "Opt. Lett.", 2003, pp. 331-333, vol. 28, No. 5.

Blazephotonics (Company), "Hollow Core Photonic Bandgap Fiber HC-580-01 Product Description", "http://www.crystal-fibre.com/datasheets/HC-580-01.pdf", Feb. 10, 2006.

Blazephotonics (Company), "High NA Multimode Fiber MM-37-01 Product Description", "http://www.crystal-fibre.com/datasheets/MM-37-01.pdf", 2005.

Brooks, Christopher D, et al., "1-mJ energy, 1-MW peak-power, 10-W averagepower, spectrally narrow, diffraction-limited pulses from a photonic-crystal f", "Optics Express", Oct. 31, 2005, pp. 8999-9002, vol. 13, No. 22.

Champert, P.A., et al., "3.5 W frequency-doubled fiber-based laser source at 772 nm", "Applied Physics Letters", Apr. 23, 2001, pp. 2420-2421, vol. 78, No. 17.

Chen et al., "Laser-to-Fiber Coupling Scheme by Utilizing a Lensed Fiber Integrated with a Long-Period Fiber Grating", "IEEE Photonics Technology Letters", May 2000, pp. 501-503, vol. 12, No. 5.

Cooper, L.J., et al., "High-power Yb-doped multicore ribbon fiber laser", Nov. 1, 2005, pp. 2906-2908, vol. 30, No. 21.

Crystal Fibre (Company), "High-Power Fiber Laser and Amplifier Subassembly Modules Product Description", "http://www.crystal-fibre.com/products/subassemblies.shtm", 2005 (copyright).

Crystal Fibre (Company), "Multimode Ultra High NA Photonic Crystal Fiber MM-HNA-110 Product Description", "http://www.crystal-fibre.com/datasheets/MM-HNA-110.pdf", Apr. 2005.

Crystal Fibre (Company), "Multimode Ultra High NA Photonic Crystal Fiber MM-HNA-200 Product Description", "http://www.crystal-fibre.com/datasheets/MM-HNA-200.pdf", Apr. 2005.

Crystal Fibre (Company), "Multimode Ultra High NA Photonic Crystal Fiber MM-HNA-35 Product Description", "http://www.crystal-fibre.com/datasheets/MM-HNA-35.pdf", Apr. 2005.

Crystal Fibre (Company), "Multimode Ultra High NA Photonic Crystal Fiber MM-HNA-5 Product Description", "http://www.crystal-fibre.com/datasheets/MM-HNA-5.pdf", Apr. 2005.

Crystal Fibre (Company), "Towards 100 kW fiber laser systems Scaling up power in fiber lasers for beam combining", "http://www.crystal-fibre.com/support/White_Paper_-_Towards_100kW_fiber_laser_systems_-_Scaling_up_power_in_fiber_lasers_for_beam_combining.pdf", Feb. 28, 2006.

Davitt, Kristina, et al., "290 and 340 nm UV LED arrays for fluorescence detection from single airborne particles", "Optics Express", Nov. 14, 2005, pp. 9548-9555, vol. 13, No. 23.

Di Teodoro, Fabio, et al., "Harmonic generation of an Yb-doped photonic-crystal fiber amplifier to obtain 1ns pulses of 410, 160, and 190kW peak-pow", "Advanced Solid-State Photonics 29 Technical Digest, Paper ME3", 2006.

Di Teodoro, Fabio, et al., "Diffraction-limited, 300-kW peak-power pulses from a coiled multimode fiber amplifier", "Optics Letters", Apr. 1, 2002, pp. 518-520, vol. 27, No. 7.

Di Teodoro, Fabio, et al., "1.1 MW peak-power, 7 W average-power, high-spectral-brightness, diffraction-limited pulses from a photonic crystal fiber", "Optics Letters", Oct. 15, 2005, pp. 2694-2696, vol. 30, No. 20.

Dunne, Mike, "Laser-driven particle accelerators", "Science", Apr. 21, 2006, pp. 374-376, vol. 312.

Emori, et al., "High-power Cascaded Raman Fiber Laser with 41-W output power at 1480-nm band", "Optical Society of America", May 2007, pp. 1-2.

Fan, T.Y., "Laser Beam Combining for High-Power, High Radiance Sources", "IEEE Journal of Selected Topics in Quantum Electronics", 2005, pp. 567-577, vol. 11.

Fan, T.Y., "Laser Beam Combining for High-Power, High-Radiance", "IEEE Journal of Selected Topics in Quantum Electronics", May 1, 2005, pp. 567-577, vol. 11, No. 3.

Furusawa, et al., "Cladding pumped Ytterbium-doped fiber laser with holey inner and outer cladding.", "Optics Express", Dec. 17, 2001, pp. 714-720, vol. 9, No. 13.

Galvanauskas, A., et al., "Fiber-laser-based femtosecond parametric generator in bulk periodically poled LiNbO3", "Optics Letters", Jan. 15, 1997, pp. 105-107, vol. 22, No. 2.

Galvanauskas, Almantas, "Mode-scalable fiber-based chirped pulse amplification systems", "IEEE Journal on Selected Topics in Quantum Electronics", Jul. 2001, pp. 504-517, vol. 7, No. 4.

Galvanauskas, A., et al., "Fiber-laser-based femtosecond parametric generator in bulk periodically poled LiNb03", "Optics Letters", Jan. 15, 1997, pp. 105-107, vol. 22, No. 2.

Blaze Photonics (Crystal Fibre Company), "HC-580-01 'yellow' Hollow Core Photonic Bandgap Fiber", "http://www.crystal-fibre.com/datasheets/HC-580-01.pdf", Feb. 10, 2006.

Hehl, Karl, et al., "High-efficiency dielectric reflection gratings: design, fabrication, and analysis", "Appl. Opt.", 1999, pp. 6257-6271, vol. 38.

Henderson, Angus, et al., "Low threshold, singly-resonant CW OPO pumped by an all-fiber pump source", "Optics Express", Jan. 3, 2006, pp. 767-772, vol. 14, No. 2.

Krause, J.T., et al., "Arc Fusion Splices with Near Pristine Strengths and Improved Optical Loss", "22nd European Conference on Optical Communication—EEOC'96, Oslo, Norway", 1996, pp. 237-240, vol. 2.

Kristiansen, Rene E., et al., "Microstructured fibers and their applications", "Proceedings of the 4th Reunion Espanola of Optoelectronics (OPTOEL), CI-5", 2005, pp. 37-49.

Liem, A., et al., "100-W single-frequency master-oscillator fiber power amplifier", "Optics Letters", Sep. 1, 2003, pp. 1537-1539, vol. 28, No. 17.

Limpert, J., et al., "High power Q-switched Yb-doped photonic crystal fiber laser producing sub-10 ns. pulses", "Appl. Phys. B 81", 2005, pp. 19-21.

Limpert, J., et al., "High-power rod-type photonic crystal fiber laser", "Optics Express", Feb. 21, 2005, pp. 1055-1058, vol. 13, No. 4.

Limpert, J., et al., "Low-nonlinearity single-transverse-mode ytterbium-doped photonic crystal fiber amplifier", "Optics Express", Apr. 5, 2004, pp. 1313-1319, vol. 12, No. 7.

Liu, F., et al., "Cost-effective wavelength selectable light source using DFB fibre laser array", "Electronics Letters", Mar. 30, 2000, pp. 620-621, vol. 36, No. 7.

Liu, A., et al., "Spectral beam combining of high power fiber lasers", "Proceedings of SPIE", Jun. 7, 2004, pp. 81-88, vol. 5335.

Loftus, T.H., et al., "Spectrally Beam-Combined Fiber Lasers for High-Average-Power Applications", "IEEE Journal of Selected Topics in Quantum Electronics", May 1, 2007, pp. 487-497, vol. 13, No. 3.

Madasamy, P., et al., "Dual-Grating Spectral Beam Combination", "IEEE Journal of Selected Topics in Quantum Electronics", Mar. 1, 2009, pp. 337-343, vol. 15, No. 2.

Miguelez, et al., "Optical Segmentation Technology Alternative and Architectures", "Motorola", 2008, pp. 1-12.

Moutzouris, Konstantinos, et al., "Highly efficient second, third and fourth harmonic generation from a two-branch femtosecond erbium fiber source", "Optics Express", Mar. 6, 2006, pp. 1905-1912, vol. 14, No. 5.

Perry, M.D., et al., "High-efficiency multilayer dielectric diffraction gratings", "Opt. Lett.", 1995, pp. 940-942, vol. 20.

Roser, F., et al., "131 W 220 fs fiber laser system", "Optics Letters", Oct. 15, 2005, pp. 2754-2756, vol. 30, No. 20.

Schreiber, T., et al., "Stress-induced single-polarization single-transverse mode photonic crystal fiber with low nonlinearity", "Optics Express", Sep. 19, 2005, pp. 7621-7630, vol. 13, No. 19.

"Sensor Systems for Biological Agent Attacks: Protecting Buildings and Military Bases", 2005, p. 73, Publisher: Committee on Materials and Manufacturing Processes for Advanced Sensors, National Research Council.

Sorensen, T., et al., "Metal-assisted coupling to hollow-core photonic crystal fibres", "Electronics Letters", Jun. 9, 2005, vol. 41, No. 12.

Tunnermann, A., et al., "The renaissance and bright future of fibre lasers", "Journal of Physics B: Atomic, Molecular and Optical Physics", 2005, pp. S681-S693, vol. 38.

* cited by examiner

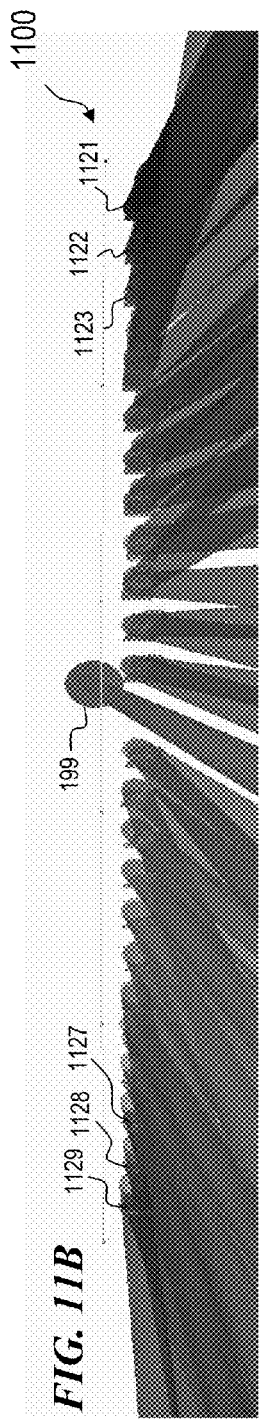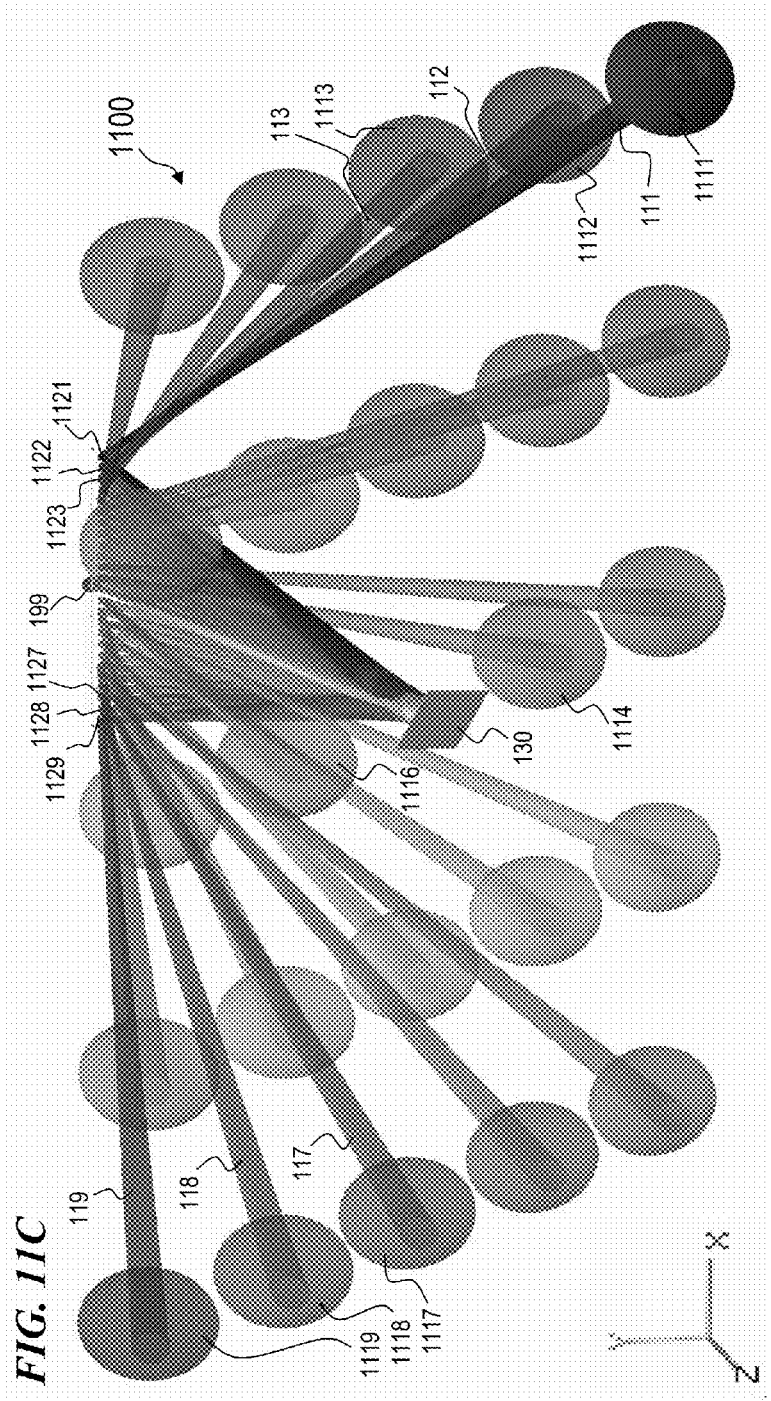

laser # in lens Φ/
beams center +/- grating
4 0 2 2.236 laser # in lens Φ/
beams center +/- grating
6 0 3 2.236 laser # in lens Φ/
beams center +/- grating
3 1 1 1.414 laser # in lens Φ/
beams center +/- grating
5 1 2 2.236 laser # in lens Φ/
beams center +/- grating
7      1      3      2.828 laser # in lens Φ/
beams center +/- grating
8      0      4      2.828

METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS

CROSS-REFERENCE TO RELATED APPLICATIONS

This application claims benefit under 35 U.S.C. §119(e) of U.S. Provisional Patent Application No. 60/937,770 filed on Jun. 29, 2007, titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS," and U.S. Provisional Patent Application No. 60/947,398 filed on Jun. 30, 2007, titled "METHOD AND APPARATUS FOR SPECTRAL-BEAM COMBINING OF FANNED-IN LASER BEAMS WITH CHROMATIC-DISPERSION COMPENSATION USING A PLURALITY OF DIFFRACTIVE GRATINGS," each of which is incorporated herein by reference in its entirety.

This application is also related to:

U.S. patent application Ser. No. 11/751,637 (which issued as U.S. Pat. No. 7,535,631 on May 19, 2009) titled "METHOD AND APPARATUS FOR SPECTRAL-BEAM COMBINING OF FIBER-AMPLIFIED LASER BEAMS USING HIGH-EFFICIENCY DIELECTRIC DIFFRACTIVE GRATINGS";

U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD";

U.S. Pat. No. 7,199,924 titled "APPARATUS AND METHOD FOR SPECTRAL-BEAM COMBINING OF HIGH-POWER FIBER LASERS";

U.S. Pat. No. 7,233,442 titled "METHOD AND APPARATUS FOR SPECTRAL-BEAM COMBINING OF HIGH-POWER FIBER LASERS," which claims benefit of U.S. Provisional Patent Application No. 60/647,747 filed on Jan. 26, 2005 and titled "SPECTRAL BEAM COMBINING OF HIGH POWER FIBER LASERS" and U.S. Provisional Patent Application No. 60/703,824 filed on Jul. 29, 2005 and titled "PERIODIC FIBER TO SUPPRESS NONLINEAR EFFECTS IN RARE-EARTH-DOPED FIBER AMPLIFIERS AND LASERS," each of which is incorporated herein by reference in its entirety.

STATEMENT REGARDING FEDERALLY SPONSORED RESEARCH OR DEVELOPMENT

This work was supported by the U.S. Navy under contract N00178-04-C-3045. The U.S. Government has a paid-up license in this invention and the right in limited circumstances to require the patent owner to license others on reasonable terms as provided for by the terms of these contracts.

FIELD OF THE INVENTION

The invention relates generally to high-power optical amplifiers and lasers and more particularly to methods and apparatus for combining larger numbers of input laser beams each having different wavelengths into a chromatic-dispersion-compensated single beam of excellent beam quality, as measured by beam-waist size and dispersion angle.

BACKGROUND OF THE INVENTION

Existing spectral-beam combiners that incorporate wavelength-dispersion compensating techniques (such as described in U.S. Pat. No. 7,199,924 and U.S. Pat. No. 7,233,442, which are commonly owned by the assignee of the present invention) use input beams that propagate parallel to one another in a single plane, thus limiting the number of laser beams that can be conveniently combined into a single output beam.

The broad gain bandwidth of conventional fiber-laser systems allows for operation over a wide range of wavelengths, or even tunable operation. For the simplest fiber laser system with cavity mirrors having reflectivity across a broad range of wavelengths, the output wavelength can be very broad and can vary with pump power, fiber length, and/or other parameters. The power that can be generated from fiber lasers and fiber-laser amplifiers can often be limited by nonlinear optical effects in the gain and/or delivery fibers used in the system.

It is desirable to produce high peak and average powers from fiber lasers and amplifiers. Stimulated Brillouin scattering (SBS) and other nonlinear effects such as self-phase modulation (SPM), four-wave mixing (FWM), and stimulated Raman scattering (SRS) are the main effects limiting the output power and pulse energy of a fiber amplifier or laser. To suppress these effects in a fiber amplifier/laser, it is desirable to use a rare-earth-doped (RE-doped) fiber with a large core. The large core provides two benefits: Spreading the light over a larger core decreases the intensity driving the nonlinear processes, and increasing the core/cladding diameter ratio increases pump absorption, enabling the shortening of the fiber to further reduce nonlinearities. When good beam quality is required, however, increasing the core diameter of the fiber requires that the fiber numerical aperture (NA) be decreased, in order that higher-order modes cannot propagate in the fiber. Using relatively large-core, low-NA fibers with mode-filtering techniques has been demonstrated to achieve good beam quality, but there are practical disadvantages to the use of such fibers. Fibers with very low values of NA exhibit large bending losses, even for relatively large-radius bends. With fibers having the lowest NA, the fiber must be kept quite straight, otherwise the optical amplifier and/or laser has very low efficiency as the bending loss becomes too high. Since a typical laser oscillator or amplifier might require on the order of a meter or more of gain fiber, the inability to coil the fiber has precluded compact packaging of the fiber-laser system.

Stimulated Brillouin scattering (SBS) is a well-known phenomenon that can lead to power limitations or even the destruction of a high-power fiber-laser system due to sporadic or unstable feedback, self-lasing, pulse compression and/or signal amplification.

Even when a fiber amplifier or fiber laser is designed to compensate for the above effects, there will be a limit on the maximum power that can be obtained from a single fiber when scaling to larger fiber sizes and/or lengths, pump powers, and the like.

U.S. Pat. No. 6,192,062 to Sanchez-Rubio et al. entitled "Beam combining of diode laser array elements for high brightness and power" and U.S. Pat. No. 6,208,679 to Sanchez-Rubio et al. entitled "High-power multi-wavelength external cavity laser" describe the fundamental techniques of spectral beam combining, and both are incorporated herein by reference.

In some embodiments, the gratings used for spectral-beam combining are "blazed," i.e., formed with V-grooves having sidewall angles that are asymmetrical with respect to a vector normal to the overall surface of the grating. U.S. Pat. No. 3,728,117 to Heidenhain et al. entitled "Optical Diffraction Grid" (incorporated herein by reference) describes a method for making blazed gratings having asymmetric grooves. U.S. Pat. No. 4,895,790 to Swanson et al. entitled "High-efficiency, multilevel, diffractive optical elements" (incorporated herein by reference) describes a method for making blazed gratings having asymmetric grooves using binary photolithography to create stepped profiles. U.S. Pat. No. 6,097,863, titled "Diffraction Grating with Reduced Polarization Sensitivity" issued Aug. 1, 2000 to Chowdhury (incorporated herein by reference) describes a reflective diffraction grating with reduced polarization sensitivity for dispersing the signals. The Chowdhury grating includes facets that are oriented for reducing efficiency variations within a transmission bandwidth and that are shaped for reducing differences between the diffraction efficiencies in two orthogonal directions of differentiation. U.S. Pat. No. 4,313,648 entitled "Patterned Multi-Layer Structure and Manufacturing Method" issued Feb. 2, 1982 to Yano et al. (incorporated herein by reference) describes a manufacturing method for a patterned (striped) multi-layer article.

U.S. Pat. No. 6,754,006 entitled "Hybrid metallic-dielectric grating" issued Jun. 22, 2004 to Barton et al. and is incorporated herein by reference. This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization-insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

U.S. Pat. No. 6,822,796 to Takada et al. entitled "Diffractive optical element" (incorporated herein by reference) describes a method for making blazed gratings having asymmetric grooves with dielectric coatings. U.S. Pat. No. 6,958,859 to Hoose et al. entitled "Grating device with high diffraction efficiency" (incorporated herein by reference) describes a method for making blazed gratings having dielectric coatings.

U.S. Pat. No. 5,907,436 entitled "Multilayer dielectric diffraction gratings" issued May 25, 1999 to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 6,212,310 entitled "High power fiber gain media system achieved through power scaling via multiplexing" issued 3 Apr. 2001 to Waarts et al., and is incorporated herein by reference. This patent describes certain methods of power scaling by multiplexing multiple fiber gain sources with different wavelengths, pulsing or polarization modes of operation is achieved through multiplex combining of the multiple fiber gain sources to provide high power outputs, such as ranging from tens of watts to hundreds of watts, provided on a single mode or multimode fiber. One method described by Waarts et al. is similar to that shown in the present invention shown in FIG. 2A, described below, where a plurality of input laser beams of differing wavelengths are directed at different angles to a diffraction grating, which diffracts the beams into a single output beam, however, this output beam necessarily has a wavelength linewidth-dependent chromatic divergence introduced by the grating. The present invention includes many distinguishing features not in Waarts et al.

In some embodiments, the present invention uses features and/or is combined with features described in commonly owned U.S. Pat. No. 7,199,924, U.S. Pat. No. 7,391,561, and U.S. Pat. No. 7,233,442, and U.S. patent application Ser. Nos. 11/565,619, 11/426,302, 11/688,854 and 11/556,658, each of which is incorporated herein by reference.

When combining many high-power laser beams into a single beam, the last output grating is impinged by the highest power. Even when using highly reflective dielectric gratings, some power is absorbed by the output grating, which causes that grating to increase in temperature and distort. In order to reduce the power density at the output grating (to reduce its temperature and distortion), it is necessary to increase the beam diameter. Previous dual-grating approaches could only combine a limited number of beams due to geometric constraints.

There is a need for improved laser systems, particularly fiber lasers and/or fiber optical amplifiers, wherein the optical outputs from a larger number of optical-fiber amplifiers and/or other lasers are combined into a single beam.

BRIEF SUMMARY OF THE INVENTION

In some embodiments, the invention provides methods and apparatus for spectral-beam combining the optical output from a plurality of high-power fiber lasers in a manner that provides improved or superior output beam quality.

In some embodiments, the present invention uses two parallel gratings to combine the optical outputs from a plurality of optical fibers, each having a successively higher, slightly different peak wavelength. In some embodiments, the output beams from the plurality of fibers are focused into a row of parallel collimated input beams that impinge on the first grating of the pair and are each diffracted at a plurality of successively higher slightly different angles that all impinge on the second grating of the pair at a common overlapped area, whereupon they all diffract into a single combined output beam having higher power and higher quality (e.g., a small waist and small divergence), as compared to conventional devices.

One of the main drawbacks of the prior dual-grating SBC concept (as described in U.S. Pat. No. 7,199,924 and U.S. Pat. No. 7,233,442) is that only a small number of sources can be combined using this approach. The minimum beam size for a given power output is determined and limited by the thermally induced aberrations on the second (or output) grating. Increasing the beam size to accommodate additional laser-beam sources quickly leads to large aperture requirements for the first (or input) grating(s) since all the input sources are lined up in a one dimensional (1-D) array. Dead space between sources needed for mounting components and to avoid clipping further limits the power-scaling capability. One objective of some embodiments of the present invention was to find a cavity design that expands space between sources and increases the number of sources that can be combined.

In some embodiments, the nominal design for a dual-grating cavity has two identical gratings (i.e., the same groove dimensions, although perhaps not the same overall size or shape) with their grooved faces facing each other and parallel (at the same angle to the output beam) so the input beams are all parallel to the combined output beam. In some embodiments, in order to combine sources (the input laser beams) distributed across a fan of angles (to achieve greater spacings) some embodiments use the gratings in a way that is asymmetrical (input to output). Two methods for generating the asymmetry in the cavity are: 1) use two identical gratings at different angles or 2) use two gratings that have differing groove density (often measured in grooves per millimeter (g/mm) of the grating, and sometimes also measured in millimeters per groove (mm/g) and called groove spacing or groove pitch). Each of these methods locate every source in a first plane (e.g., the plane in which multi-spectral light would disperse if directed toward the output grating in the opposite direction as the intended final output beam).

A third additional way is to locate a plurality of input gratings along a line in a first plane (e.g., the plane in which multi-spectral light would disperse if directed toward the output grating in the opposite direction as the intended final output beam), with the grooved face of each input grating initially parallel to the grooved face of the output grating and the groove ridges all parallel to one another, but then tilting the input gratings relative to the first plane (in some embodiments, rotating each grating along an arc that lies in a respective plane perpendicular to the first plane and parallel to the output beam), in order to fan the input beams in a direction perpendicular to the first plane as well as spaced laterally from the output beam. Thus, the input beams are fanned in a direction perpendicular to the first plane, but lie within planes that are parallel to the output beam. This two-dimensional fan configuration provides still more spacing than the first and second methods.

Further, either of the first two methods can be combined with the third method to achieve a fan pattern in both the directions perpendicular to the first plane and the directions parallel to the first plane.

Designs using both identical gratings at different angles (method 1) and gratings with different groove spacing (pitch) (method 2) were analyzed using Zemax and shown to work. Neither design was perfectly optimized or studied in great detail as yet. Rather these analyses were of point designs that demonstrate the concept and provide some insight into the general properties. In both cases, the angle between sources was 0.64 degrees and, although this is not a limit, it is unlikely to get too much larger. Because the angular separation is small this approach probably does not provide scaling potential beyond maybe two times the number of lasers that can be combined and wavelength-dispersion compensated using the techniques such as described in U.S. Pat. No. 7,199,924 and U.S. Pat. No. 7,233,442. Also, in one experiment the overlap in space and angle was not perfect due to the nonlinear grating dispersion so the beam combination degrades the beam quality somewhat, perhaps $M^2$ of about 1.2 in some embodiments. In some embodiments, a separation between the output grating and the input gratings was 39 cm when using identical gratings (e.g., having equal groove density) for the input gratings and the output grating, and 65 cm with different groove densities, so it can be seen that cavity lengths can be reasonable.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 11B is a schematic back-top close-up perspective view of a wavelength-dispersion-compensated two-dimensional-fan-in spectral-beam combiner (WDC-2.5D-SBC) 1100.

FIG. 11C is a schematic back-top perspective view of a wavelength-dispersion-compensated two-dimensional-fan-in spectral-beam combiner (WDC-2.5D-SBC) 1100.

DETAILED DESCRIPTION OF THE INVENTION

Figure 1:
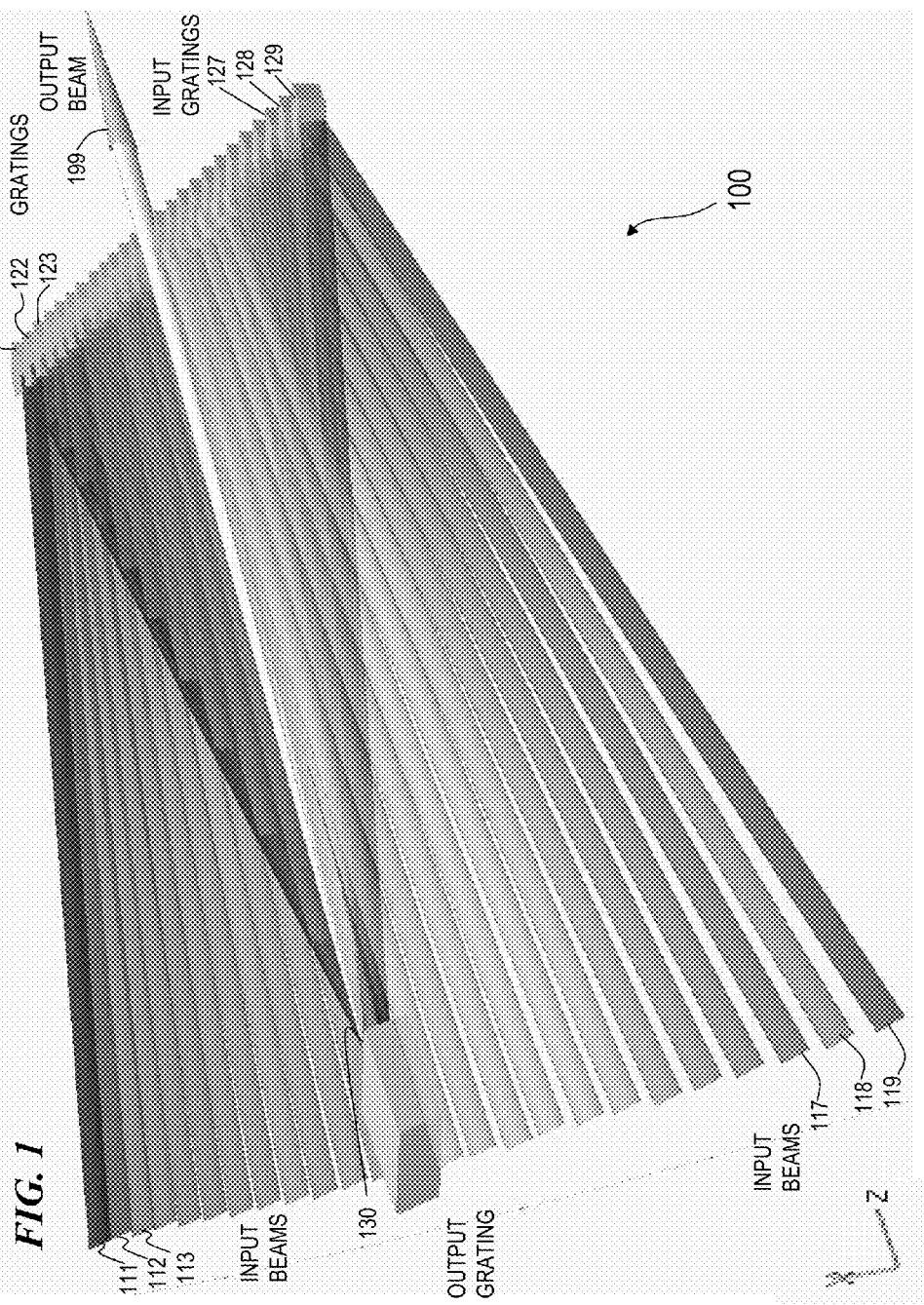
FIG. 1 is a schematic back-side-top perspective view of a wavelength-dispersion-compensated one-dimensional-fan-in spectral-beam combiner (WDC-2D-SBC) 100.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple Figures. Signals and connections may be referred to by the same reference number or label, and the actual meaning will be clear from its use in the context of the description.

In some embodiments, the present invention uses high-efficiency gratings having multilayer dielectric layers provided by Lawrence Livermore National Laboratory (which is operated by the Regents of the University of California). In some embodiments, such gratings can be made according to U.S. Pat. No. 5,907,436 entitled "Multilayer dielectric diffraction gratings" issued May 25, 1999 to Perry et al., (incorporated herein by reference), which is assigned to the Regents of the University of California (Oakland, Calif.). This patent describes the design and fabrication of dielectric grating structures with high diffraction efficiency. The gratings have a multilayer structure of alternating index dielectric materials, with a grating structure on top of the multilayer, and obtain a diffraction grating of adjustable diffraction efficiency (up to 90% or more, and, in some embodiments, 95% or more), and variable optical bandwidth.

In some embodiments, the present invention uses high-efficiency gratings having multilayer dielectric layers provided by General Atomics (San Diego, Calif.). In some embodiments, such gratings can be made according to U.S. Pat. No. 6,754,006 entitled "Hybrid metallic-dielectric grating" issued Jun. 22, 2004 to Barton et al. (incorporated herein by reference) is assigned to General Atomics (San Diego, Calif.). This patent describes a diffraction grating having a metallic base layer and layers of dielectric materials of varying refractive index, where a bottom interface of the layers is adherent to the metallic base layer. The dielectric layers are periodically spaced on top of the metallic base layer, leaving the metallic base layer exposed in regions. This grating allows for the polarization insensitive reflective properties of the base metallic layer to operate in conjunction with the polarization sensitive diffraction properties of the multilayer grating structure to provide near 100% diffraction efficiency over a reasonable wavelength bandwidth, independent of the polarization of the incident beam.

In some embodiments, high-efficiency dielectric gratings are used, wherein the gratings exhibit polarization sensitivity, wherein the direction of optimal input polarization relative to the direction of the grooves may change when polarized input beams are impinging on the grating "out-of-plane" (i.e., from above or below the plane of the intermediate beams as described in the various figures herein). Accordingly, some embodiments adjust the orientation of the input laser sources to align the polarization of the input beams (e.g., by rotating the end of each fiber) to the optimal direction of polarization of the grating (i.e., the polarization angle at which the maximum amount of power goes into the output beam from a particular input beam). In other embodiments, an adjustable waveplate is located in the propagation path of each input beam to adjust its angle of polarization (e.g., by rotating their respective waveplates), also to optimize the amount of power and/or the beam quality (e.g., to lower its $M^2$ beam-quality factor value) of the output beam.

In some embodiments, the input beams have a Gaussian intensity profile. In some embodiments, to increase the amount of power from each input beam that is included in the output beam and/or to reduce diffractive rings or perturbations of each of the beams due to clipping or sharp edges in the main beam path (e.g., due to the beam encountering the edges of its collimating lens, or encountering the edge of the input grating), the center-to-center spacings between beams are increased. In some such embodiments, the center-to-center spacing of adjacent beams is at least three times the diameter of the beams, wherein the diameter of the beam is measured from the radius on one side where the intensity is $1/e^2$ times the maximum beam intensity at the center of the beam to the radius on the opposite side where the intensity is $1/e^2$ times the maximum beam intensity at the center of the beam. (In other embodiments, the center-to-center spacing of adjacent beams is at least two times the diameter of the beams, but such embodiments tend to have poorer quality output beams due to diffraction effects. In still other embodiments, the center-to-center spacing of adjacent beams is at least four times the diameter of the beams, where such embodiments tend to have better quality output beams due to fewer diffraction effects.) The design goal of having the center-to-center spacing of adjacent beams of at least three times the diameter of the beams is to allow a lens size for each input beam that is at least three times the beam diameter, however the lens is typically held in a holder that takes additional space, and thus the center-to-center spacings will be larger than three times the diameter of the beams in order that each lens is at least three times the diameter of its beam. Accordingly, the present invention provides ways of providing these larger spacings between beams and the lens sizes of at least three times the diameter of the beams.

In some embodiments, each grating is made using conventional methods for making single gratings, for example, such as described in U.S. Pat. No. 3,728,117 to Heidenhain et al., U.S. Pat. No. 4,895,790 to Swanson et al., U.S. Pat. No. 6,822,796 to Takada et al., and/or U.S. Pat. No. 6,958,859 to Hoose et al. (each of which are incorporated herein by reference). In some embodiments, asymmetric grooves in gratings $G_1$ 151 and $G_2$ 152 are dielectric coated, and have a groove profile and periodicity spacing selected to maximize the efficiency of diffracting the most power into a single-order mode (i.e., the order that goes in the direction of the second grating) and to minimize the power absorbed by the gratings, in order to minimize heat distortion of the grating and to maximize output power and intensity. In some embodiments, every input beam impinges onto its input grating at the same angle $\alpha_1$, but each intermediate beam leaves its input grating at a different angle $\beta_{11} \ldots \beta_{IN}$ that depends on the wavelength of that beam, and each intermediate beam converges to a single spot and impinges on the output grating (the surface of which, in some embodiments, is parallel to the input grating(s) using the same respective angles $\alpha_{21} \ldots \alpha_{IN}$ as the outgoing angles $\beta_{11} \ldots \beta_{IN}$ for that wavelength from the input grating(s), and every beam leaves the second grating at the same outgoing angle $\beta_2$ in a single combined beam that is parallel to the input beams and in the same direction.

Regardless of how narrow are the linewidths of the input laser beams, the output grating will introduce a chromatic dispersion (also called wavelength dispersion, this is beam spreading at some angle in a plane perpendicular to the grating lines caused by the difference in wavelengths at the edges of the linewidth of an otherwise collimated laser beam when diffracted by a prism or diffraction grating). By introducing a compensating chromatic dispersion (i.e., beam spreading at the opposite angle in a plane perpendicular to the grating lines), the input grating(s) angular dispersion and the output grating angular dispersion negate one another. The beam widens between the input grating and the output grating by an amount based on the linewidth and/or wavelength of the input laser beam and on the distance between the input grating(s) and the output grating. If only one input grating is used, the plurality of input beams (each at a different wavelength and thus different angle) will travel different distances between the input grating and output grating (the distance traveled between the input grating and the output grating for a first outermost beam will be longer than the distance traveled between the input grating and the output grating for a second beam on the opposite side. This causes a greater amount of beam widening for the first beam than for the second beam. Therefore, in some embodiments, a plurality of input gratings is used and the input gratings are located along an arc-shaped line that is located such that the amount of beam widening for each beam is approximately equal. In some embodiments, a separate input grating is provided for each input laser beam.

Figure 2:
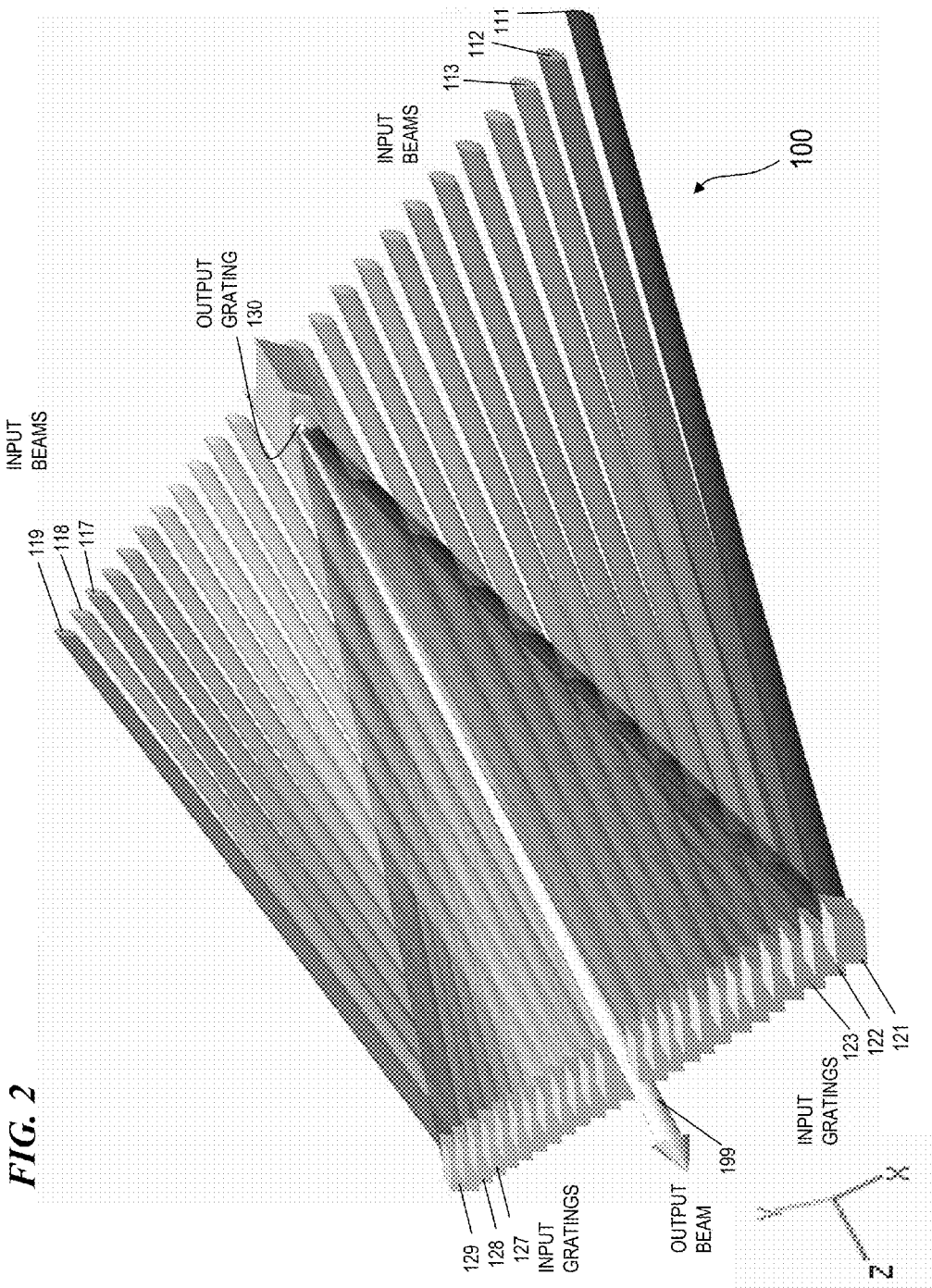
FIG. 2 is a schematic side-top perspective view of WDC-2D-SBC 100.
Figure 3:
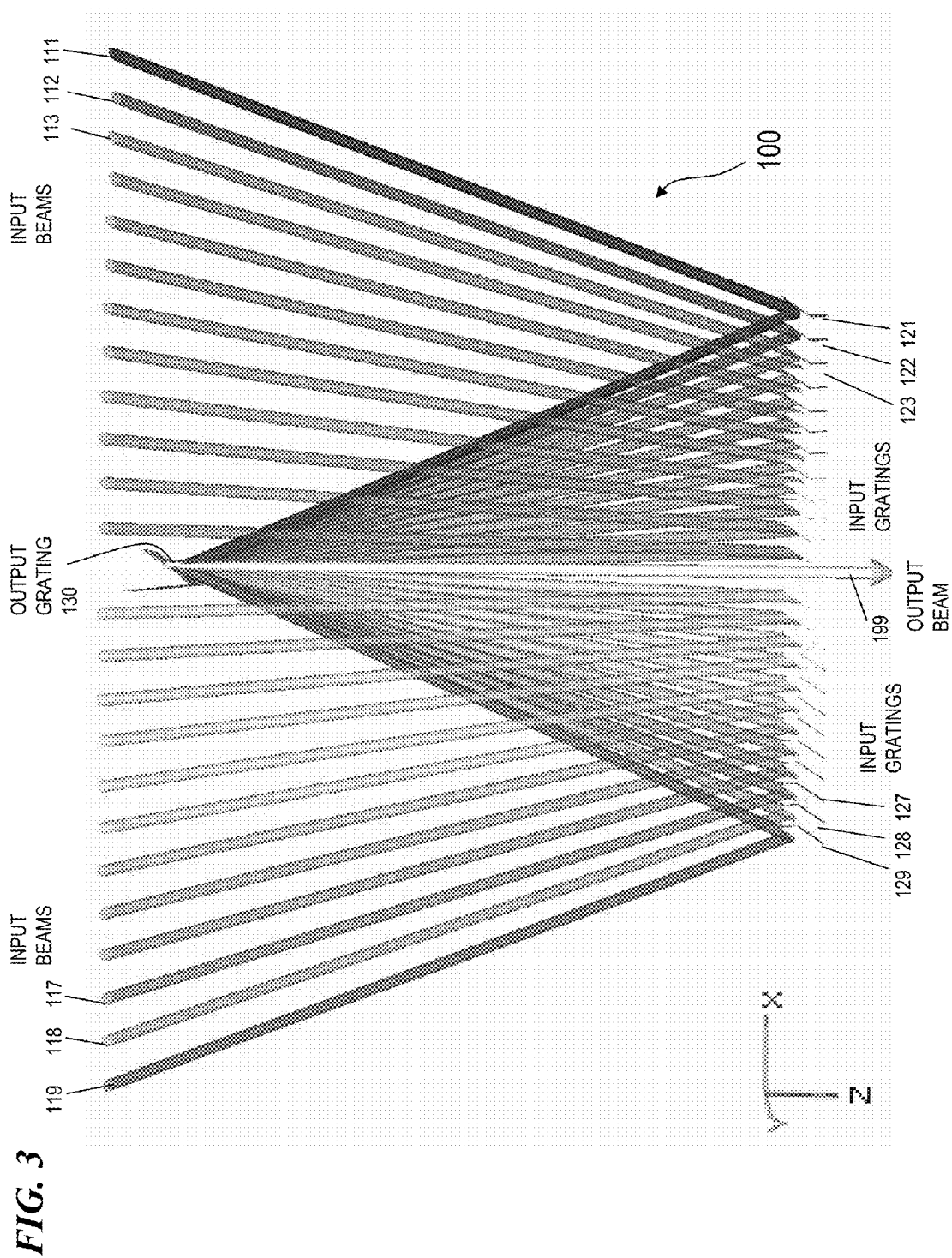
FIG. 3 is a schematic top perspective view of WDC-2D-SBC 100.
Figure 4:
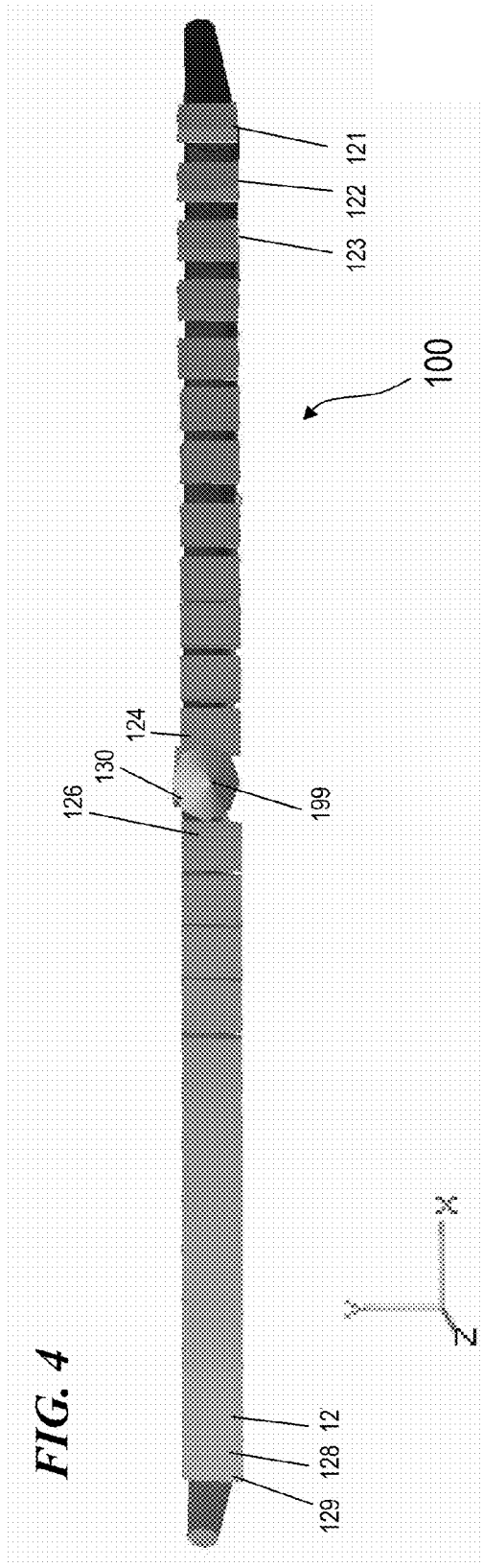
FIG. 4 is a schematic front perspective view of WDC-2D-SBC 100.
Figure 5:
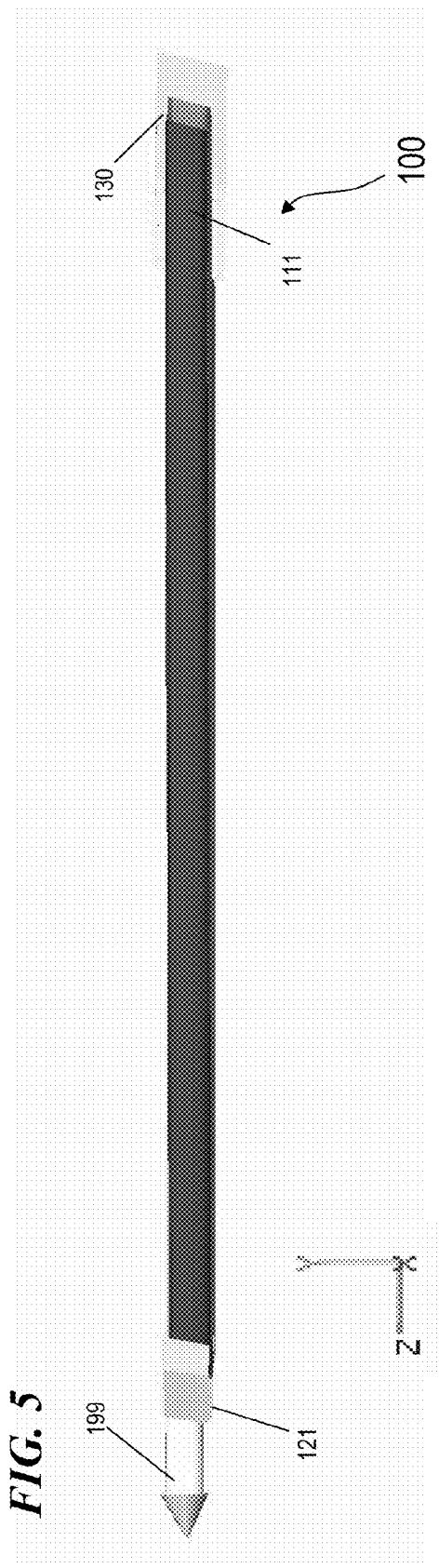
FIG. 5 is a schematic side perspective view of WDC-2D-SBC 100.

FIG. 1 is a schematic back-side-top perspective view of a wavelength-dispersion-compensated one-dimensional-fan-in spectral-beam combiner (WDC-2D-SBC) 100. FIG. 2 is a schematic front-side-top perspective view of WDC-2D-SBC 100. FIG. 3 is a schematic top view of WDC-2D-SBC 100. FIG. 4 is a schematic front perspective view of WDC-2D-SBC 100. FIG. 5 is a schematic side perspective view of WDC-2D-SBC 100.

As used herein, the Z direction is the direction of the output beam, the X direction is a direction perpendicular to the output beam and in the plane of the intermediate beams (i.e., the plane in which a white-light beam traveling in a negative Z direction would spread due to diffraction from the output grating), and the Y direction is a direction that is orthogonal to the Z direction and the X direction. As used herein, WDC means wavelength-dispersion-compensated (also called chromatic-dispersion compensated), typically involving introducing a compensating and opposite dispersion into a plurality (e.g., all, in some embodiments) of the input beams before they impinge on the output grating of a spectral-beam-combining system. As used herein, the various configurations of input beams, mirrors, and/or gratings are referred to as described in Table 1.

TABLE 1

| NAME | INPUT BEAMS' DIRECTIONS OF PROPAGATION WHEN IMPINGING ON INPUT GRATING | MIRRORS USED? | INPUT BEAMS IN X-Z PLANE OF INTERMEDIATE BEAMS? | INPUT BEAMS PARALLEL TO OUTPUT BEAM? |
|---|---|---|---|---|
| One-dimensional-fan-in SBC (1D-SBC) | Parallel to one another and in a single plane when they impinge on their respective input grating | Optional, can be used to move laser sources out of X-Z plane, for example as shown in FIG. 26A-FIG. 26F | Optional, depends on whether input gratings are to be tilted around their X axis; for example they are parallel in many of the embodiments of U.S. Pat. No. 7,199,924 | Optional, depends on whether input gratings are to be tilted around their X axis and whether output grating is tilted about its X axis |
| Two-dimensional-fan-in SBC (2D-SBC) | Converging toward one another in X-direction and in a single plane when they impinge on their respective input grating | Optional, as above | Optional; for example; they are in the embodiments of FIG. 1, FIG. 6, | Optional, as above |
| Two-and-a-half-dimensional-fan-in SBC (2.5D-SBC) | Converging toward one another in Y-direction and in parallel planes, each plane parallel to Z-direction when the beams impinge on their respective input grating | Optional, as above | Optional; for example; they are in the embodiment of FIG. 11A, FIG. 12, FIG. 13 and FIG. 14 | Optional, as above |
| Three-dimensional-fan-in SBC (3D-SBC) | Converging toward one another in X direction and in the Y direction when they impinge on their respective input grating | Optional, as above | At least some are not; for example see the embodiment of FIG. 15-20 and the embodiment of FIG. 27A-FIG. 27F | At least some are not |

In some embodiments, WDC-2D-SBC 100 includes a plurality of laser beams 111, 112, 113, . . . 117, 118 and 119 at converging angles but each beam 111-119 propagating along a path that is centered in a single first plane (i.e., the input beams 111-119 before encountering the input gratings 121, 122, 123, . . . 127, 128, 129 are coplanar). The laser beams between the input gratings 121-129 and the output grating 130 are also coplanar (i.e., centered in a second plane that is the plane into which a multi-wavelength (e.g., white) beam propagating in a direction opposite the output beam 199 would disperse). In some embodiments, the first plane and the second plane are coplanar (as shown in FIG. 1), and the output beam also propagates in that plane (as shown in FIG. 1). In other embodiments, the first plane and the second plane are coplanar (as shown in FIG. 1), but the output beam is at a small angle to these planes due to an up-down tilt in the orientation of output grating 130, which allows the output beam to bypass input gratings 121-129 and thus permits the possibility of having more input gratings than possible if the output beam remains in the plane containing the intermediate beams, input gratings 121-129 and output grating 130. In other embodiments, the first plane and the second plane are at a small angle to one another, and the output beam propagates in a direction determined by the angle between the second plane and the plane of the grating face of the output grating 130, which can be either up or down at a slight angle.

In order to provide greater spacings (center-to-center, as compared to the source spacings in the configurations shown in U.S. Pat. No. 7,233,442 titled "Method and apparatus for spectral-beam combining of high-power fiber lasers," which is incorporated herein by reference in its entirety, and which showed input beams that were all parallel to the output beam) for the laser sources that generate beams 111-119 in WDC-2D-SBC 100, the fan-in configuration provides an angular spread among the input laser beams 111-119 before they encounter the input gratings 121-129. In some embodiments, the first method (described above in the Summary of the Invention section) for permitting an angular spread of the input beams includes using identical gratings for the input gratings 121-129 and for the output grating 130, but at different angles (the grating face of the output grating 130 is non-parallel to the faces of input gratings 121-129). In some embodiments, the second method (also described above in the Summary of the Invention section) for permitting an angular spread of the input beams includes using input gratings 121, 122, 123, . . . 127, 128, and 129 that have a groove density that are different than the groove density of the output grating 130. Each of these methods locate every source 111-119 in a first plane (e.g., the plane in which multi-spectral light would disperse if directed toward the output grating but traveling in the opposite direction as the intended final output beam).

Different angles of incidence to the grating face have different diffraction efficiency values, with the largest amount of diffracted energy going into the first-order (k=1) diffraction direction. One goal of the present invention is to obtain the greatest amount of energy and power in the output beam 199 for a given size of the apparatus and given power of each input beam. In some embodiments, a largest proportion of energy goes into the diffracted output beam when the diffracted output beam counter-propagates along the same path as the input beam (sometimes called auto collimation, this is called the Littrow condition (which varies based on the wavelength of the diffracted light and the groove density (often measured in grooves per millimeter (g/mm) of the grating), wherein the input angle (alpha) from the normal line to the face of the grating is equal to the output angle (beta) from the normal line to the face of the grating (called the grating normal)). In some embodiments, a blazed grating is used, wherein the faces on a first side of each groove have a normal vector direction at a blaze angle (omega) to the groove normal, and the greatest proportion of energy goes into the diffracted output beam when the blaze angle also meets the blaze-Littrow condition (alpha=beta=omega). In some embodiments, when performing spectral beam combining (SBC), the Littrow condition cannot be exactly met by every laser beam at the output grating since the different wavelengths being combined have their different angles of incidence. Accordingly, some embodiments use very narrow linewidth laser beams (in order to reduce beam spread between the input grating and the output grating) and wavelengths that are closely spaced in order that the alpha angles to the output grating are as close as possible to the Littrow angle (within the size and other constraints of the system).

In some embodiments, the input gratings 121-129 are placed in adjacent locations as close together as possible, in order to have the smallest angle of convergence toward the output grating 130, which allows the use of diffraction angles that are as close as possible to the Littrow angle. In some embodiments, at least one of the input gratings is at an angle less than the Littrow angle and at least one of the input gratings is at an angle greater than the Littrow angle (i.e., the output beam exits between the input gratings located at angles less than the Littrow angle and the input gratings at angles greater than the Littrow angle). In some embodiments, an equal number of input gratings are at an angle less than the Littrow angle and an equal number of input gratings are at an angle more than the Littrow angle. In other embodiments, the SBC system of the present invention uses a larger number of input gratings on one side of Littrow (angles smaller than the Littrow angle) than on the other, since the first-order diffraction continues further (i.e., at a greater angle from Littrow) when going towards angles smaller than Littrow.

In some embodiments, in order to have the smallest spread of angles relative to Littrow, the center wavelengths of each input beam are made to be very close together (e.g., 0.1 nm wavelength spacing, or 0.05, 0.02, 0.01, 0.005, 0.002, or 0.001 nm or smaller spacings) and the linewidth of each beam is made very narrow (e.g., 0.1 nm full-width half maximum (FWHM), or 0.05, 0.02, 0.01, 0.005, 0.002, or 0.001 nm or smaller linewidths), in order to have greater numbers of beams combine to a single output beam. Further, in order to resolve such close spacings and narrow linewidths, gratings having a high groove density and large areas are used. The high groove density causes more beam spread between the input gratings and the output grating, so there is a tradeoff between resolving power of the gratings (which allows closer wavelength spacings, but causes more beam spread within each input beam between the input grating for that beam and the output grating), and the area used for each grating (larger areas allow greater resolution, but cause the apparatus size to increase).

In some embodiments, WDC-2D-SBC 100 is limited by the size of the angle at the output grating 130 (herein called the output convergence angle) between the intermediate beam from grating 121 and the intermediate beam from grating 129, the size of the input gratings 121-129, and the distance between the output grating 130 and input gratings 121-129. In some embodiments, each input grating is placed equidistant from the output grating (along a circular arc centered at the output grating 130) in order that the beam spread width amount (i.e., the width of each beam becomes larger as compared to its height due to the chromatic dispersion caused by the non-zero linewidth of each laser beam) for every beam is approximately equal. In other embodiments, the input gratings 121-129 are located along a straight line approximately perpendicular to the output beam. In other embodiments, the locations of the input gratings 121-129 are staggered at different distances in order to get the intermediate beams (the beams after the input gratings 121-129 but before the output grating 130) as close together as possible, thus increasing the number of input beams that can be combined. In some embodiments, once the center-to-center spacing of the intermediate beams (and thus the input gratings 121-129) has been minimized, the center-center spacing of the input lasers and their respective collimating optics becomes a limiting factor as to how many input beams 111-119 can be combined into a single output beam 199. The WDC-SBC systems of the present invention provide for spectral-beam combining of non-parallel input laser beams 111-119 while still providing wavelength-dispersion compensation. In some embodiments, the present invention allows approximately two (or more) times as many laser beams to be combined while having at least some chromatic dispersion compensation, as compared to configurations as described in U.S. Pat. No. 7,199,924 and U.S. Pat. No. 7,233,442, wherein the input laser beams are all approximately parallel and coplanar.

Figure 6:
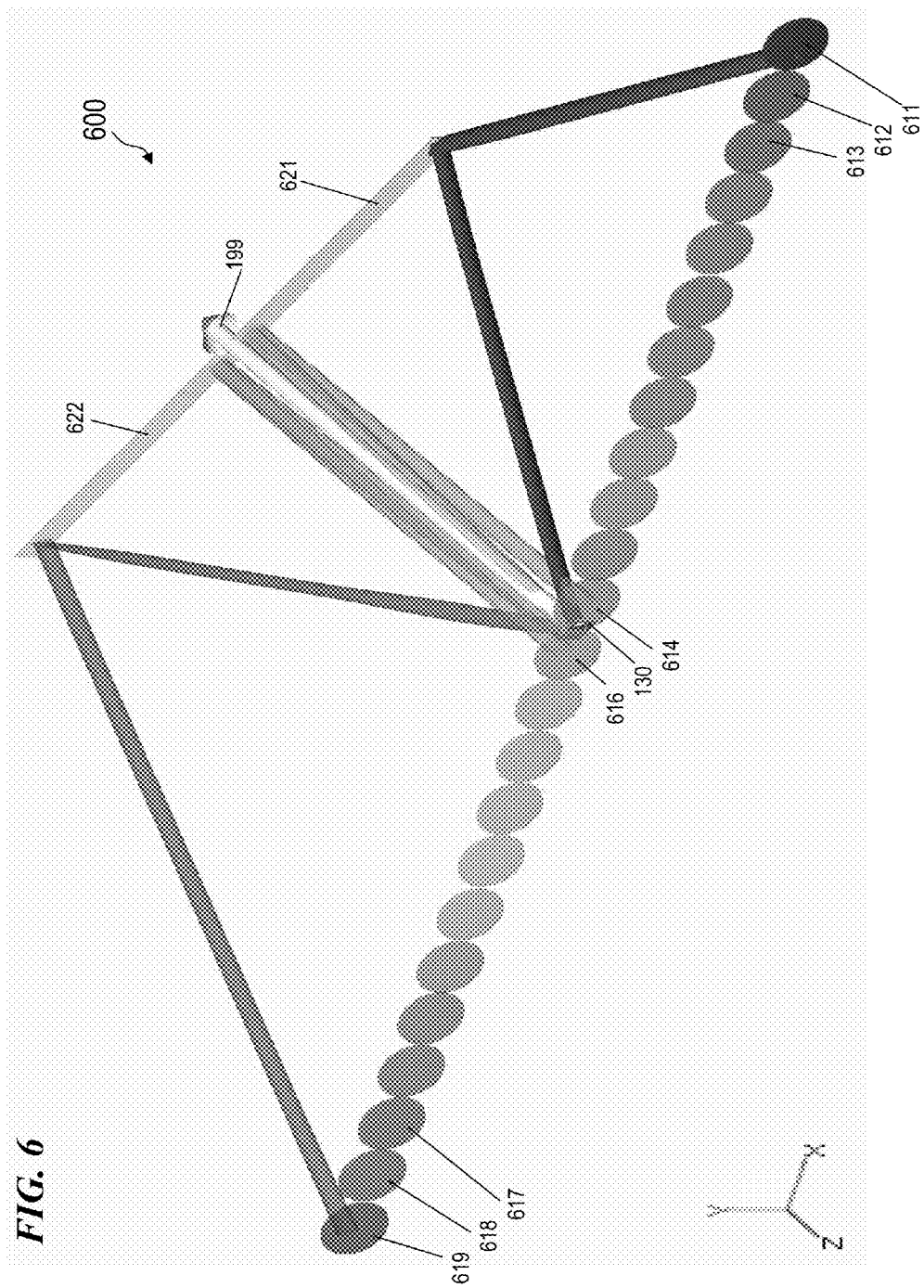
FIG. 6 is a schematic back-side-top perspective view of a wavelength-dispersion-compensated one-dimensional-fan-in spectral-beam combiner (WDC-2D-SBC) 600.
Figure 7:
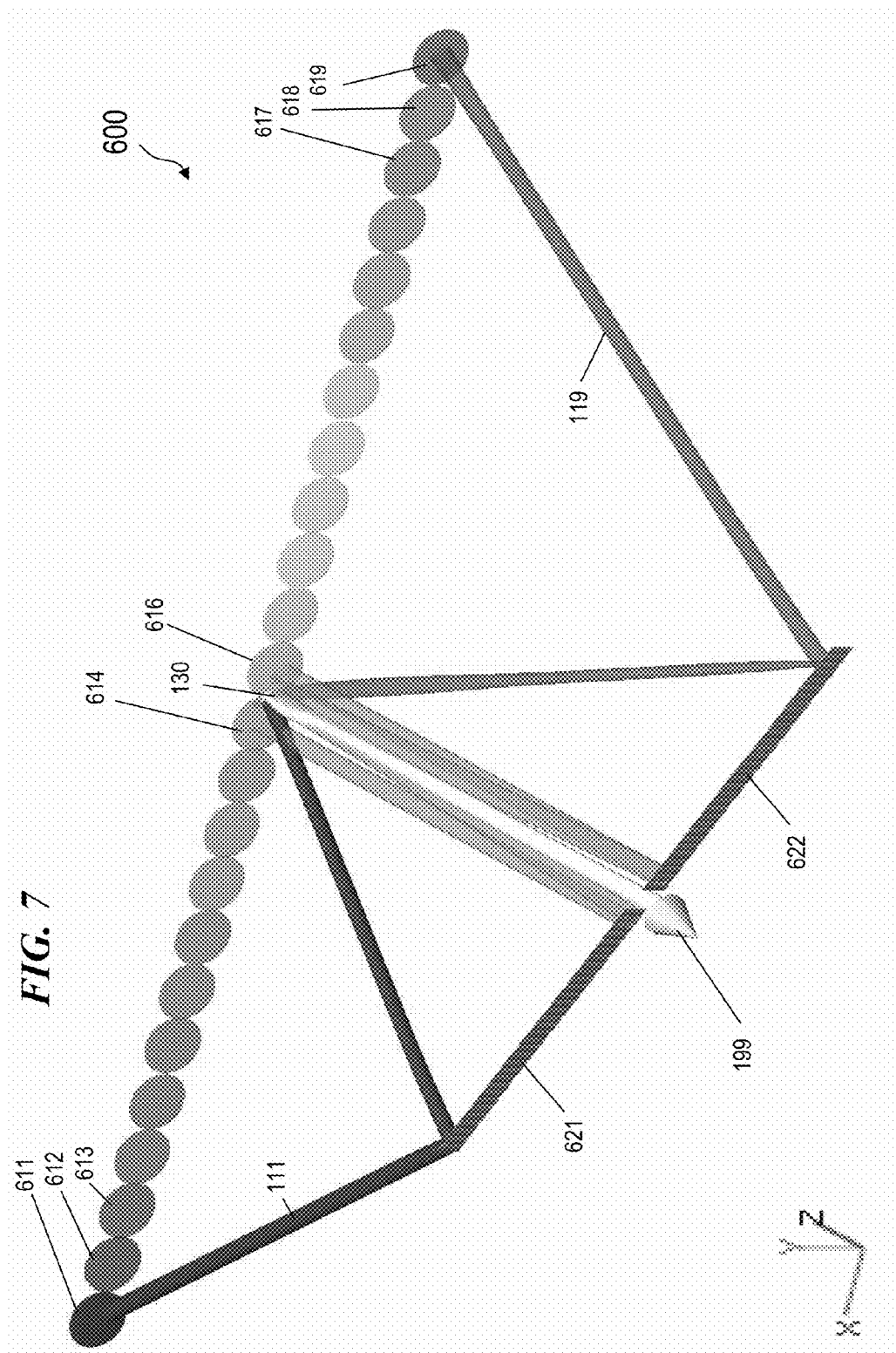
FIG. 7 is a schematic from side-top perspective view of WDC-2D-SBC 600.
Figure 8:
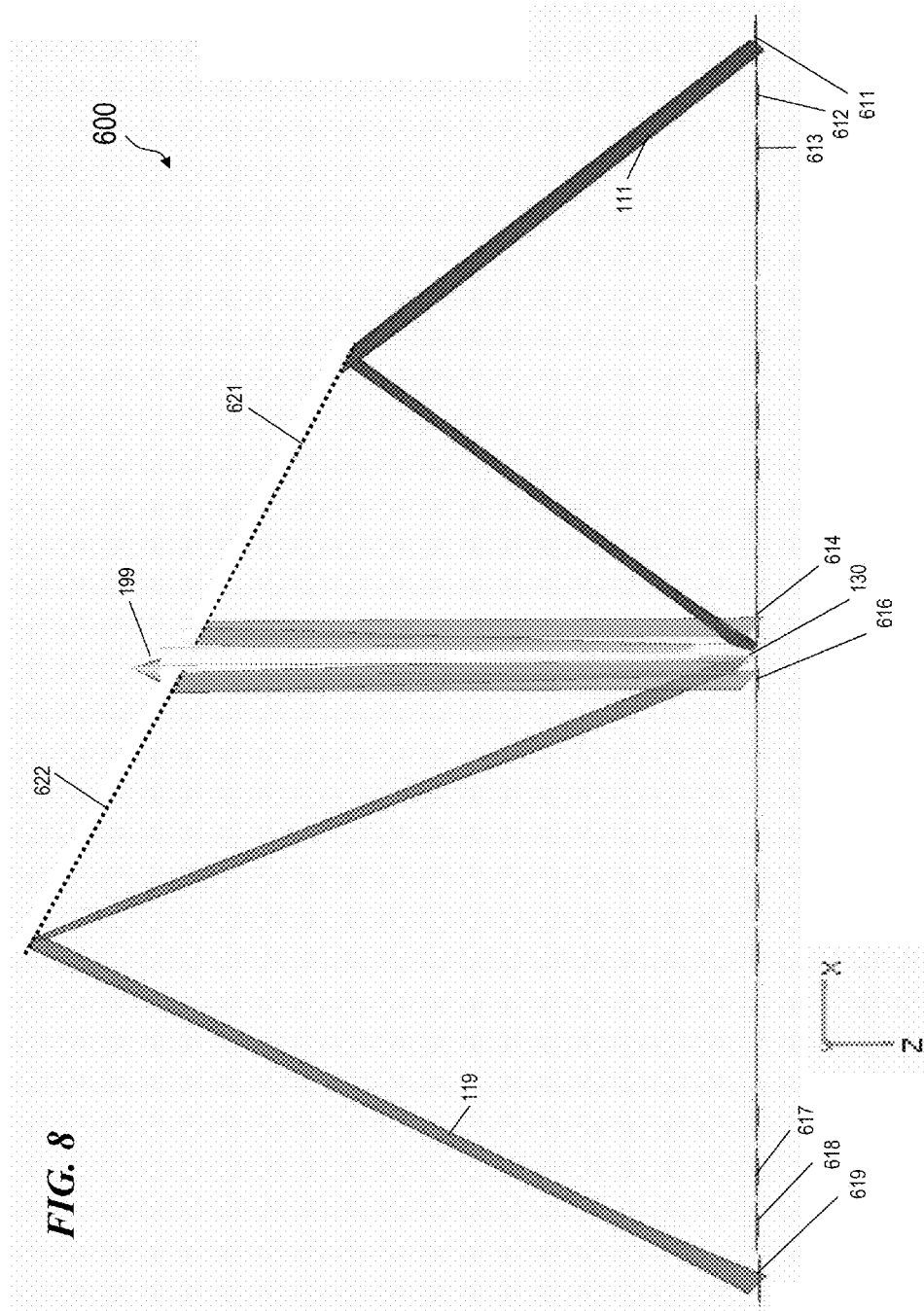
FIG. 8 is a schematic top view of WDC-2D-SBC 600.
Figure 9:
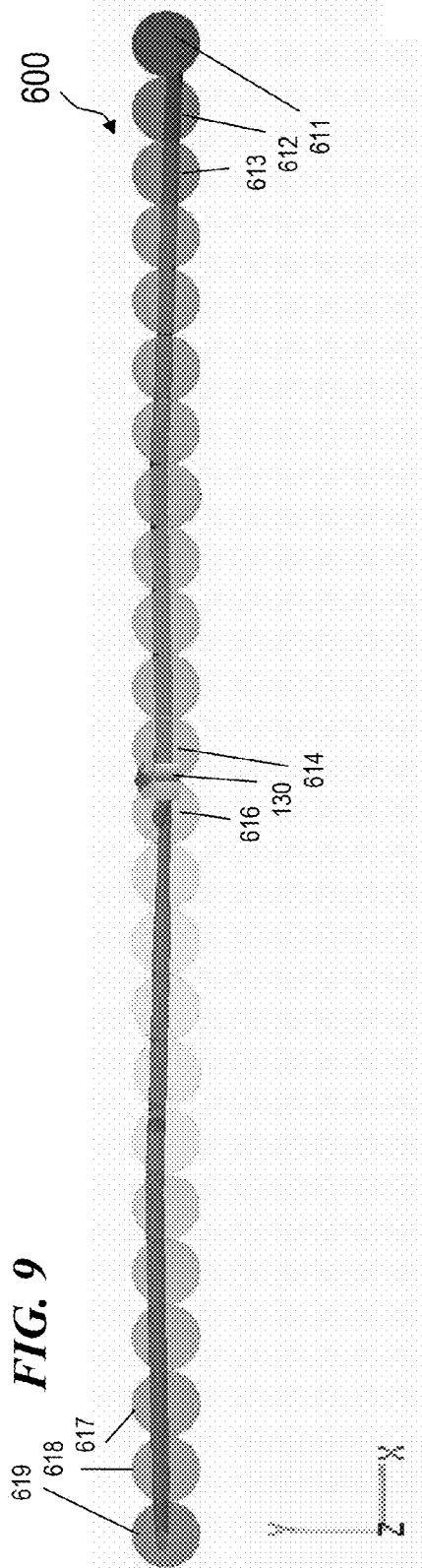
FIG. 9 is a schematic back view of WDC-2D-SBC 600.
Figure 10:
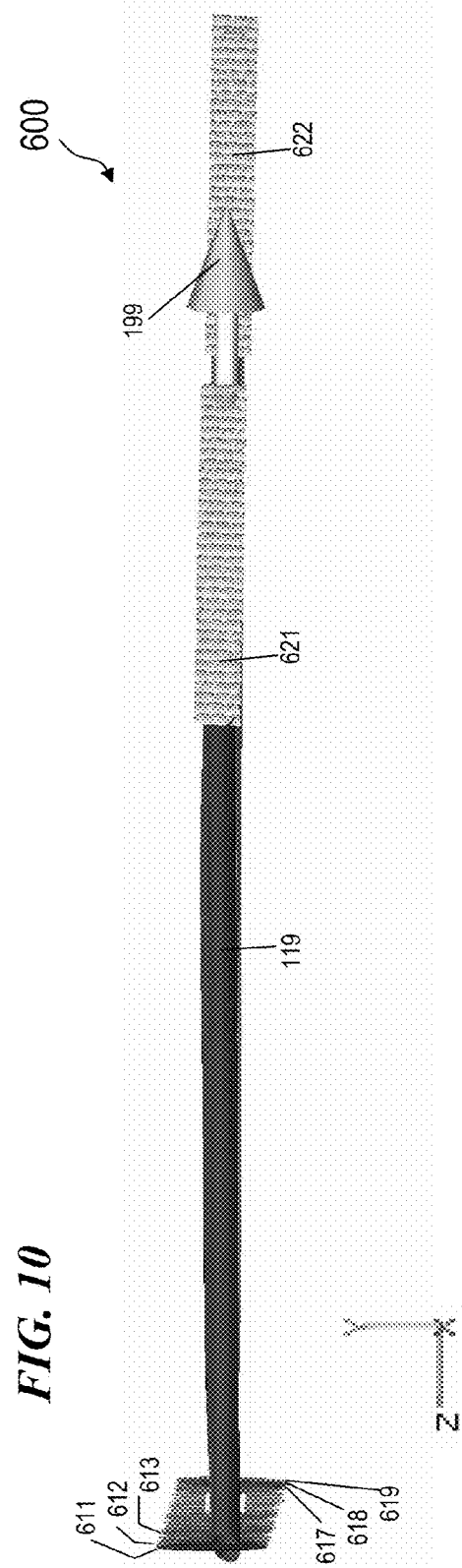
FIG. 10 is a schematic side view of WDC-2D-SBC 600.

FIG. 6 is a schematic back-side-top perspective view of a wavelength-dispersion-compensated one-dimensional-fan-in spectral-beam combiner (WDC-2D-SBC) 600. FIG. 7 is a schematic front-side-top perspective view of WDC-2D-SBC 600. FIG. 8 is a schematic top view of WDC-2D-SBC 600. FIG. 9 is a schematic back view of WDC-2D-SBC 600. FIG. 10 is a schematic side perspective view of WDC-2D-SBC 600.

In some embodiments, WDC-2D-SBC 600 includes a plurality of laser sources 611, 612, 613, . . . 617, 618 and 619 (represented here by lens-shaped objects representing the output lenses or mirrors of the respective collimating optics) that generate a plurality of laser beams 111-119 (only the outer two beams 111 and 119 and the inner two beams next to the output beam 199 are shown here) at converging angles but wherein each input beam 111-119 is propagating along a path that is centered in a single first plane (the input beams 111-119 before encountering the input gratings 621 and/or 622 are coplanar). WDC-2D-SBC 600 differs from WDC-2D-SBC 100 in that only one or two input gratings 621 and/or 622 are used in the latter system, in order to simplify alignment, reduce parts count, and increase ruggedness and reliability. On the other hand, having individual input gratings 121-129 in WDC-2D-SBC 100 allows individual pointing of each grating for alignment and individual spacing from the output grating to obtain equal dispersion amounts. In some embodiments, the intermediate laser beams between the input gratings 621 and/or 622 and the output grating 130 are also coplanar (i.e., centered in a second plane that is the plane into which a multi-wavelength (e.g., white) beam propagating in a direction opposite the output beam 199 would disperse). In some embodiments, the first plane and the second plane are coplanar, and the output beam also propagates in that plane. In some such embodiments, the output beam exits between input grating 621 and input grating 622. In other embodiments, the first plane and the second plane are at a small angle to one another, in which case the output beam propagates in a direction determined by the angle between the second plane and the plane of the grating face of the output grating, which can be either up or down and a slight angle. In some such embodiments, a single wider input grating 621 can be used and positioned to achieve the greatest output efficiency (proportion of the sum of the input beams' power that goes into the output beam).

In order to provide greater spacings (center-to-center) for the laser sources 611-619 that generate beams 111-119 in WDC-2D-SBC 600, the fan-in configuration provides an angular spread between the input laser sources 611-619 in an X direction that is perpendicular relative to the Z direction of the output beam 199) before they encounter the input gratings 121-129. In some embodiments, the first method (described above in the Summary of the Invention section) for permitting an angular spread of the input beams includes using identical gratings for the input gratings 621 and/or 622 and for the output grating 130, but position input gratings 621 and/or 622 at a different angle than is the output grating to the output beam 199 (the grating face of the output grating 130 is non-parallel to the faces of input gratings 621 and/or 622). In some embodiments, the second method (also described above in the Summary of the Invention section) for permitting an angular spread of the input beams includes using input gratings 621 and/or 622 that have a groove densities that are different than the groove density of the output grating 130. Each of these methods locate every source of laser beams 111-119 in a first plane (e.g., the plane in which multi-spectral light would disperse if directed toward the output grating in the opposite direction as the intended final output beam).

The above described WDC-1D-SBC systems 100 and 600 permit the input laser beams to converge from input laser sources that are spread and converging in the X direction that is perpendicular relative to the Z direction of the output beam 199. In contrast, the following-described WDC-2D-SBC systems 1100 and 1600 permits the input laser beams to converge from input laser sources that are spread and converging only in the Y direction that is perpendicular relative to the Z direction of the output beam 199 and perpendicular in the X direction as well (a wedge-like configuration). Further, the later-described WDC-2D-SBC system 1600 permits the input laser beams to converge from input laser sources that are spread and converging both in the Y direction that is perpendicular relative to the Z direction of the output beam 199 and perpendicular in the X direction, as well as converging in the X direction (a pyramid-shaped configuration).

Figure 11A:
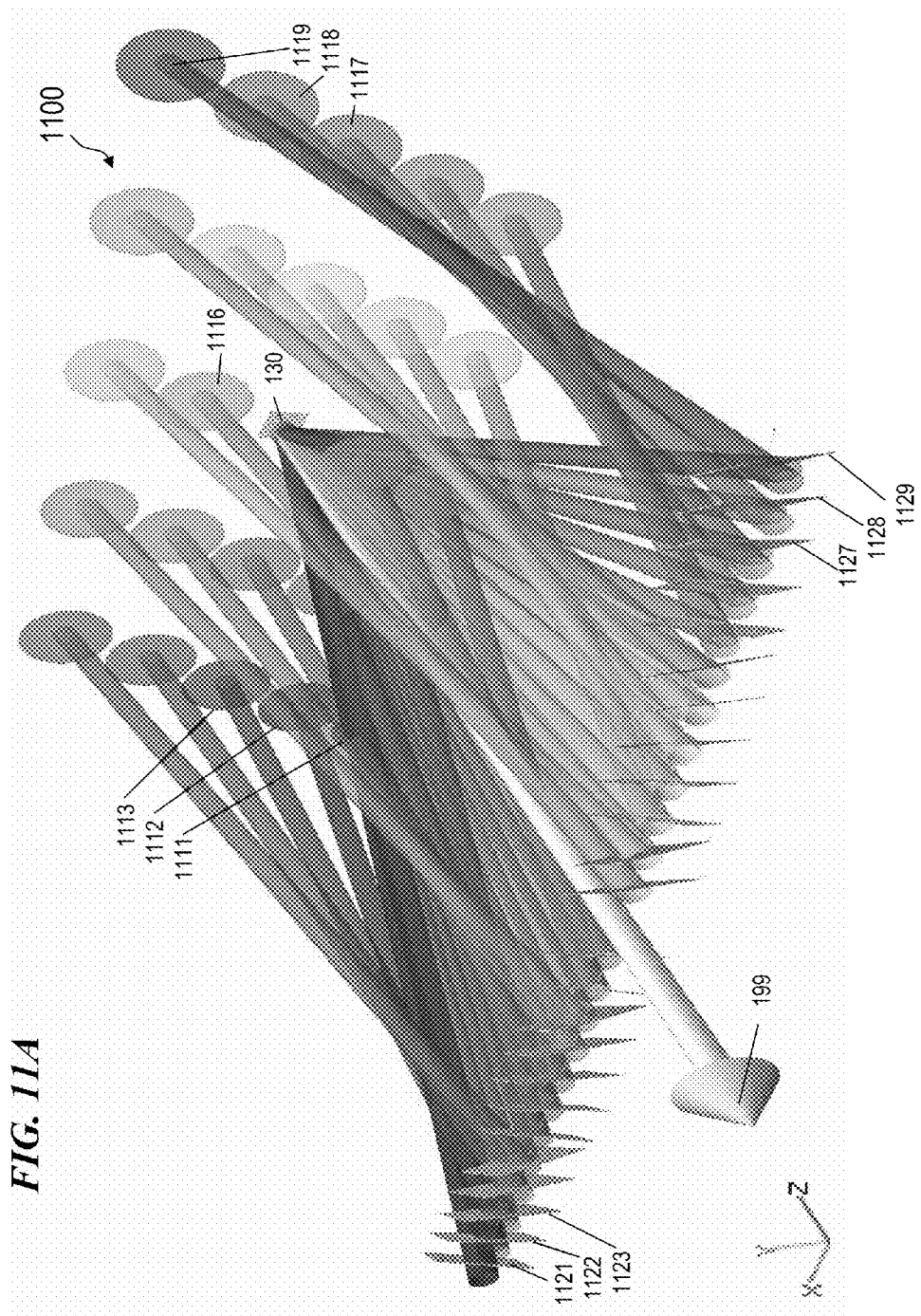
FIG. 11A is a schematic front-side-top perspective view of a wavelength-dispersion-compensated two-dimensional-fan-in spectral-beam combiner (WDC-2.5D-SBC) 1100.
Figure 12:
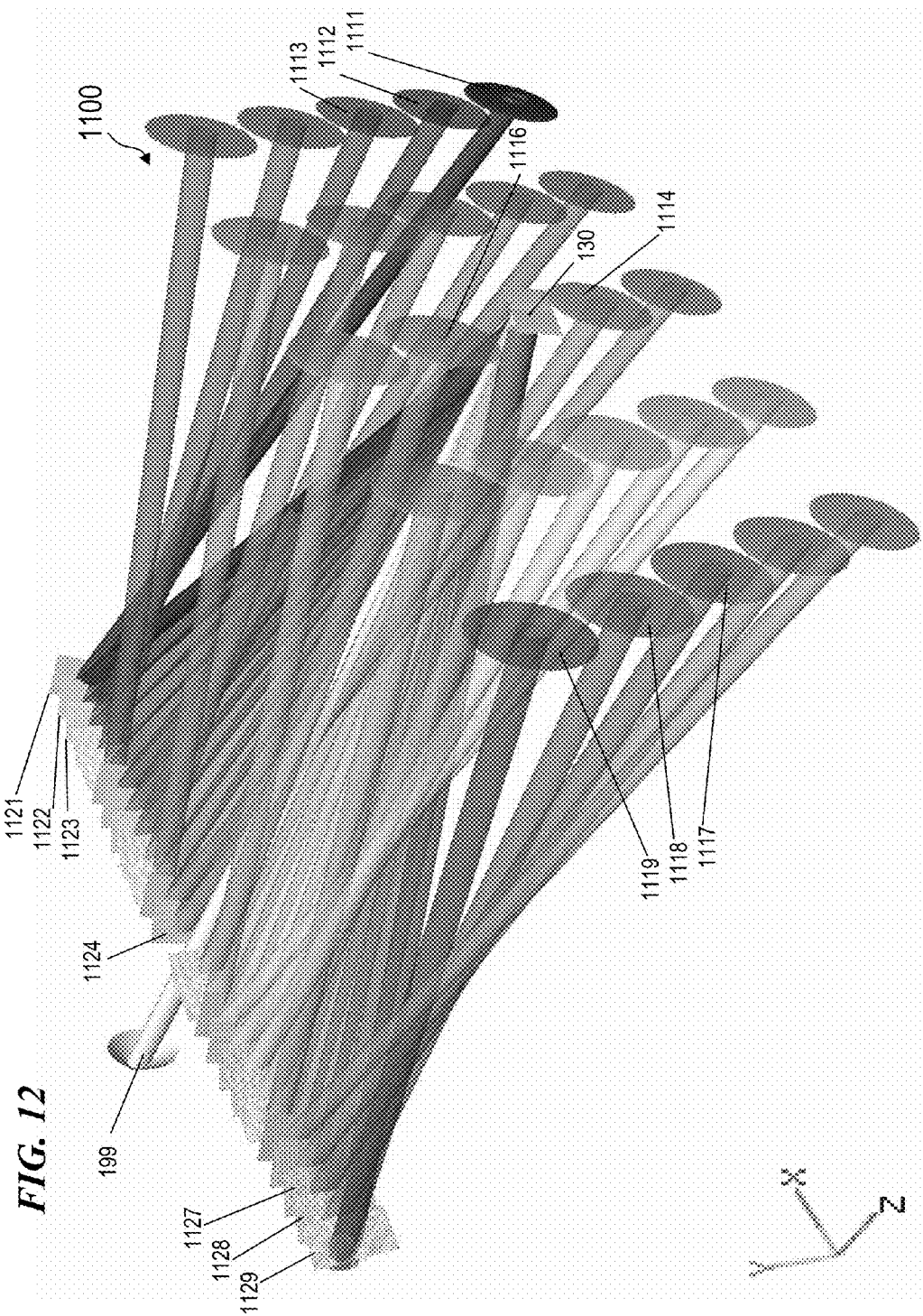
FIG. 12 is a schematic back-side-top perspective view of WDC-2.5D-SBC 1100.
Figure 13:
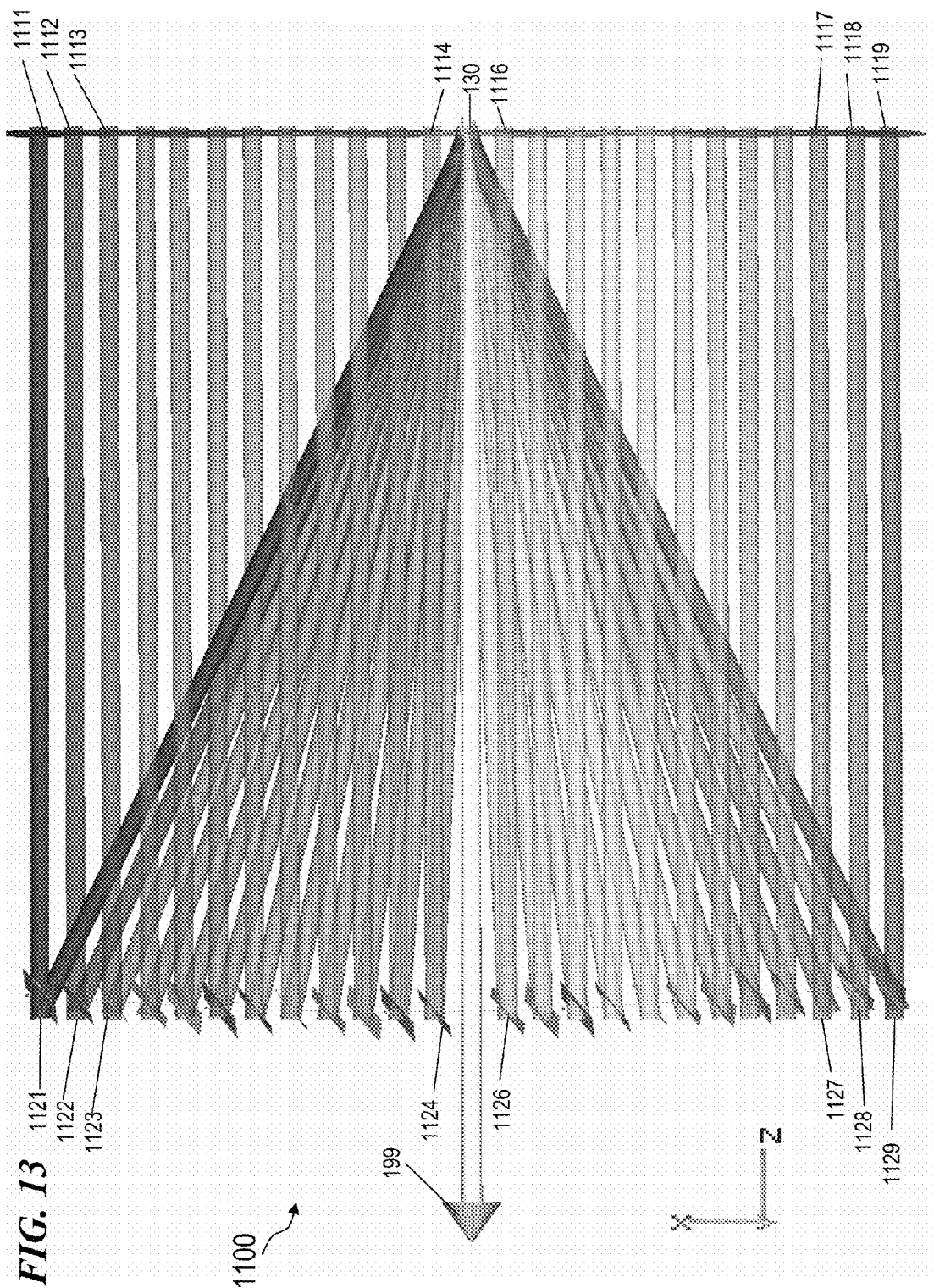
FIG. 13 is a schematic top view of WDC-2.5D-SBC 1100.
Figure 14:
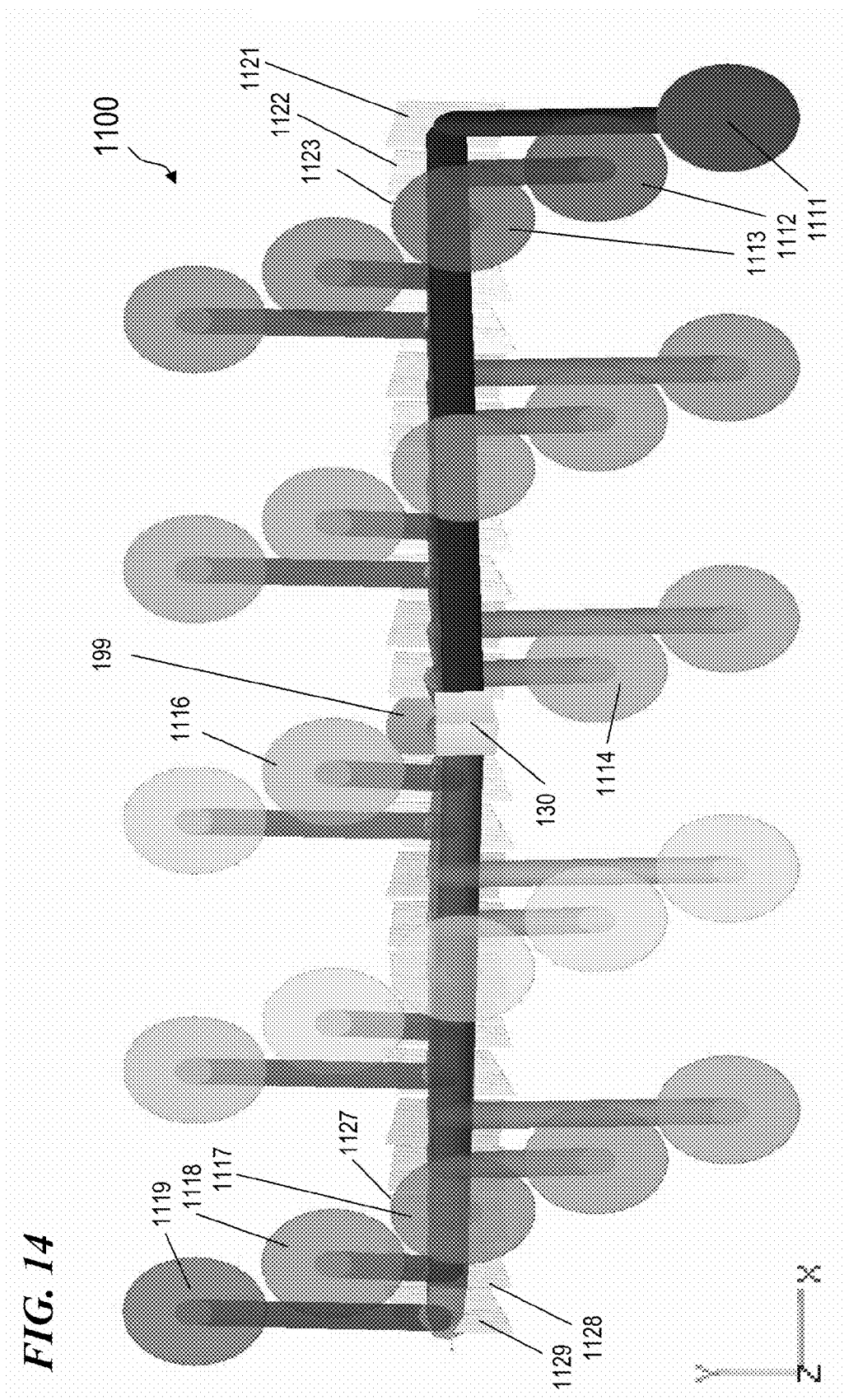
FIG. 14 is a schematic back view of WDC-2.5D-SBC 1100.
Figure 15:
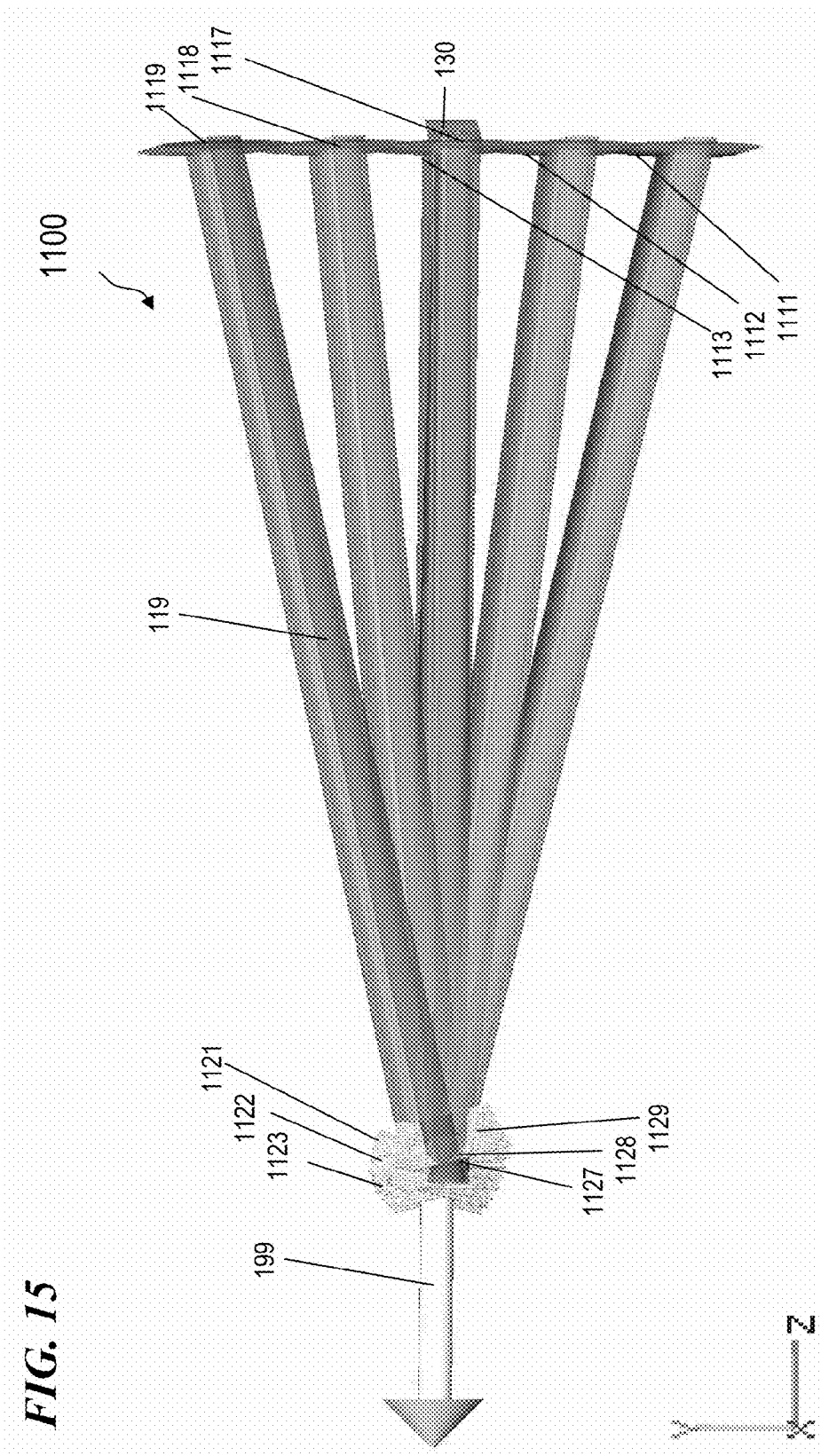
FIG. 15 is a schematic side view of WDC-2.5D-SBC 1100.

FIG. 11A is a schematic front-side-top perspective view of a wavelength-dispersion-compensated two-dimensional-fan-in spectral-beam combiner (WDC-2.5D-SBC) 1100. FIG. 11B is a schematic back-top close-up perspective view of a wavelength-dispersion-compensated two-dimensional-fan-in spectral-beam combiner (WDC-2.5D-SBC) 1100. FIG. 11C is a schematic back-top perspective view of a wavelength-dispersion-compensated two-dimensional-fan-in spectral-beam combiner (WDC-2.5D-SBC) 1100. FIG. 12 is a schematic back-side-top perspective view of WDC-2.5D-SBC 1100. FIG. 13 is a schematic top view of WDC-2.5D-SBC 1100. FIG. 14 is a schematic back view of WDC-2.5D-SBC 1100. FIG. 15 is a schematic side view of WDC-2.5D-SBC 1100.

In some embodiments, WDC-2.5D-SBC 1100 includes a plurality of laser sources 1111, 1112, 1113, . . . 1114, 1116, . . . 1117, 1118 and 1119 (represented here by lens-shaped objects representing the output lenses or mirrors of the respective collimating optics) that generate a plurality of laser beams 111, 112, 113, . . . 117, 118, 119 at converging angles in the Y direction but wherein each input beam 111-119 is propagating along a path that is centered in one or a plurality of Y-Z planes (the input beams 111-119 before encountering the input gratings 1121, 1122, 1123, . . . 1124, 1126, . . . 1127, 1128 and 1129 in a wedge-shaped envelope that is tapered to converge to a row of input gratings 1121-1129 that extend in the X direction; in some embodiments, input gratings 1121-1129 are located along a circular arc centered on the output grating 130, while in other embodiments, input gratings 1121-1129 are located along one or more straight lines, while in still other embodiments, input gratings 1121-1129 are at slightly staggered distances from output grating 130). WDC-2.5D-SBC 1100 differs from WDC-2D-SBC 100 in that the individual input gratings 1121-1129 are tilted up or down at one of a plurality of different angles, in order to spread the input sources 1111-1119 in the Y direction, while simplifying design by allowing identical input and output gratings (same grating density and same angle in the Y-Z plane direction). Thus the beams converge in the X direction from the input gratings 1121-1129 to the output grating 130 due to diffraction at the input gratings 1121-1129, and can converge in the Y direction due to diffraction and reflection (the angle of up-down tilt of each input grating). As with the above-described WDC-2D-SBC 100, having individual input gratings 1121-1129 in WDC-2.5D-SBC 1100 allows individual pointing of each grating for alignment and individual spacing from the output grating to obtain equal dispersion amounts. The intermediate laser beams between the input gratings 1121 and/or 1122 and the output grating 130 are also coplanar (i.e., centered in a second plane that is the plane into which a multi-wavelength (e.g., white) beam propagating in a direction opposite the output beam 199 would disperse). In some embodiments, the second plane and the output beam are coplanar. In some such embodiments, the output beam exits between two of the input gratings 1121-1129. In other embodiments, the second plane and the output beam 199 are at a small angle to one another, in which case the output beam propagates in a direction determined by the angle between the second plane and the plane of the grating face of the output grating, which can be either up or down and a slight angle. In some such embodiments, a single twisted input grating 1121 (e.g., a thin diffractive dielectric substrate that is flexible enough to diffract the individual input beams into a single plane of converging beams directed to the output grating 130) can be used (e.g., back and forth twisting to achieve equivalent Y deflections and convergence of the input beams 111-119). WDC-2.5D-SBC 1100 provides a third method of converging spaced-apart sources that are spread and converging in the Y direction but are essentially in parallel planes that are spaced apart in the X direction.

Figure 16:
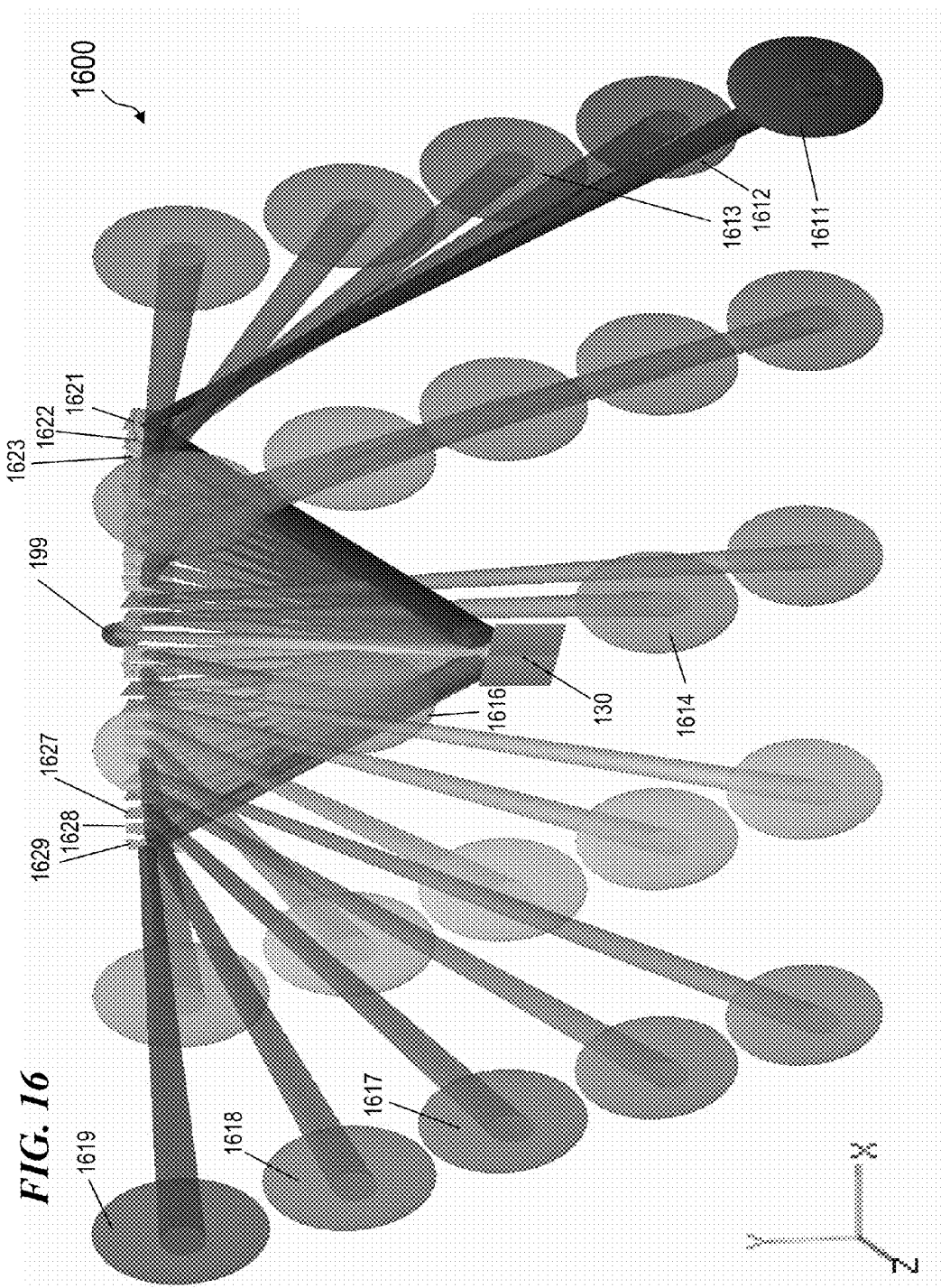
FIG. 16 is a schematic back-top perspective view of a wavelength-dispersion-compensated one-dimensional-fan-in spectral-beam combiner (WDC-3D-SBC) 1600.
Figure 17:
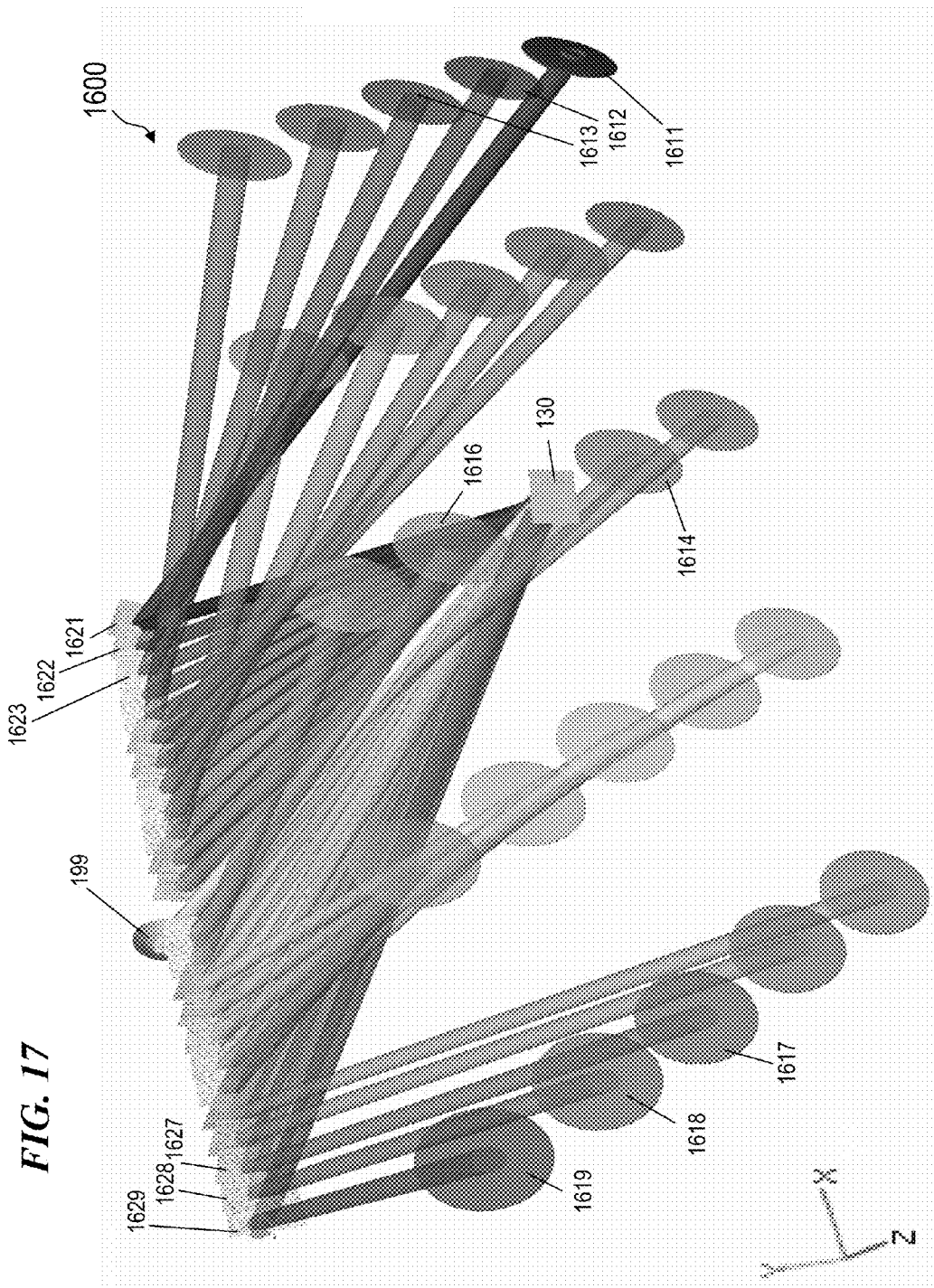
FIG. 17 is a schematic back-side-top perspective view of WDC-3D-SBC 1600.
Figure 18:
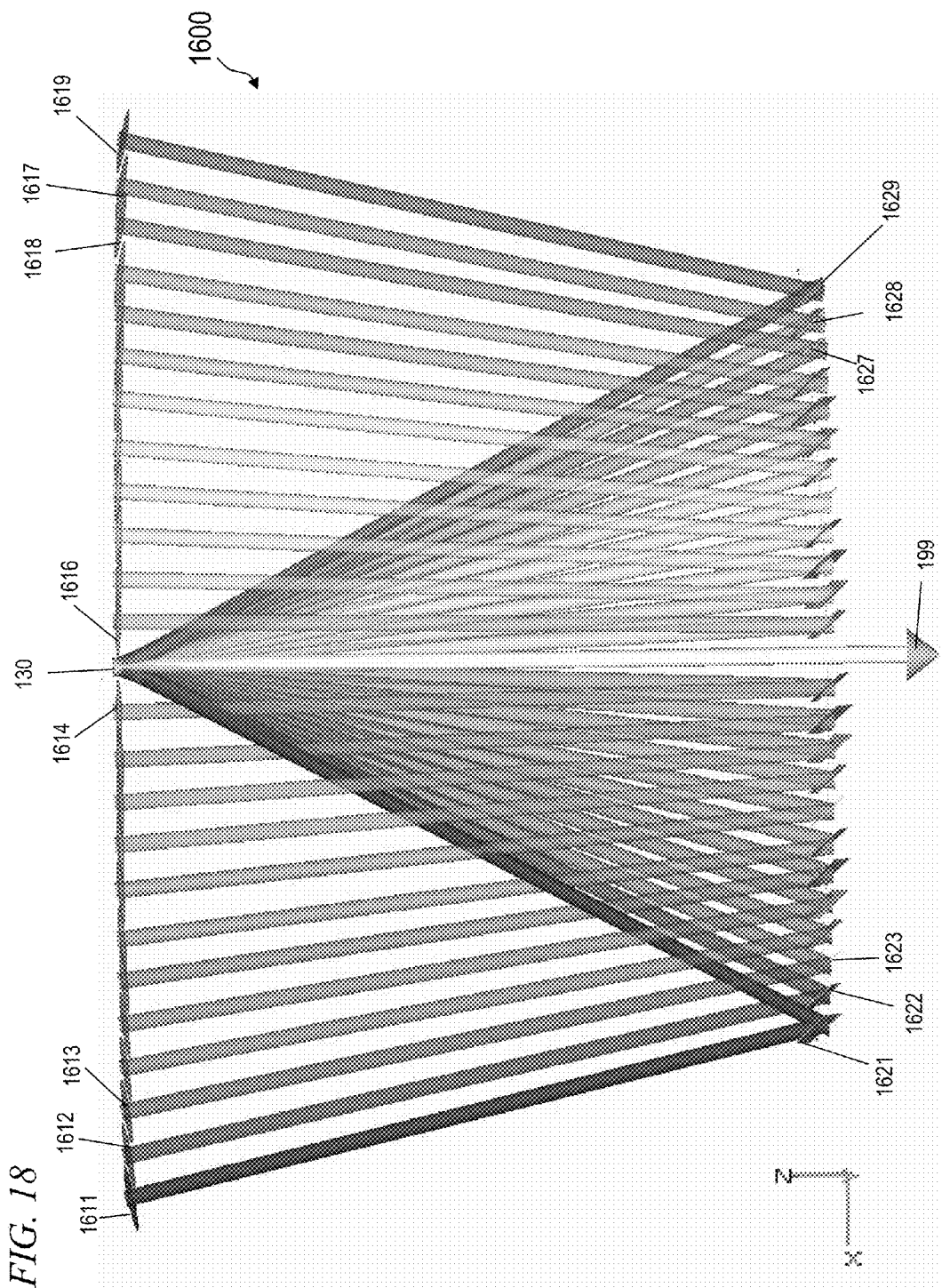
FIG. 18 is a schematic top view of WDC-3D-SBC 1600.
Figure 19:
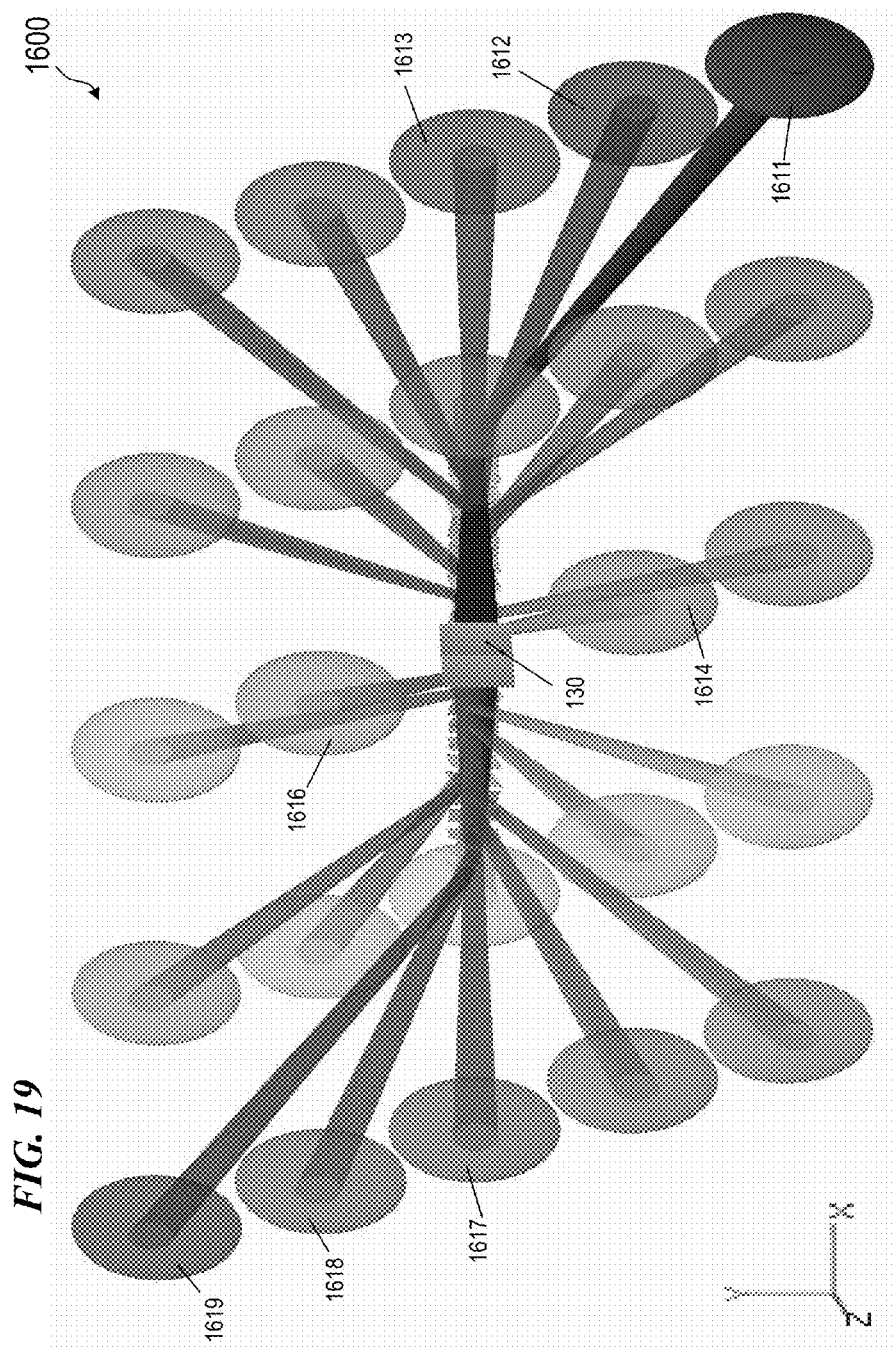
FIG. 19 is a schematic back view of WDC-3D-SBC 1600.
Figure 20:
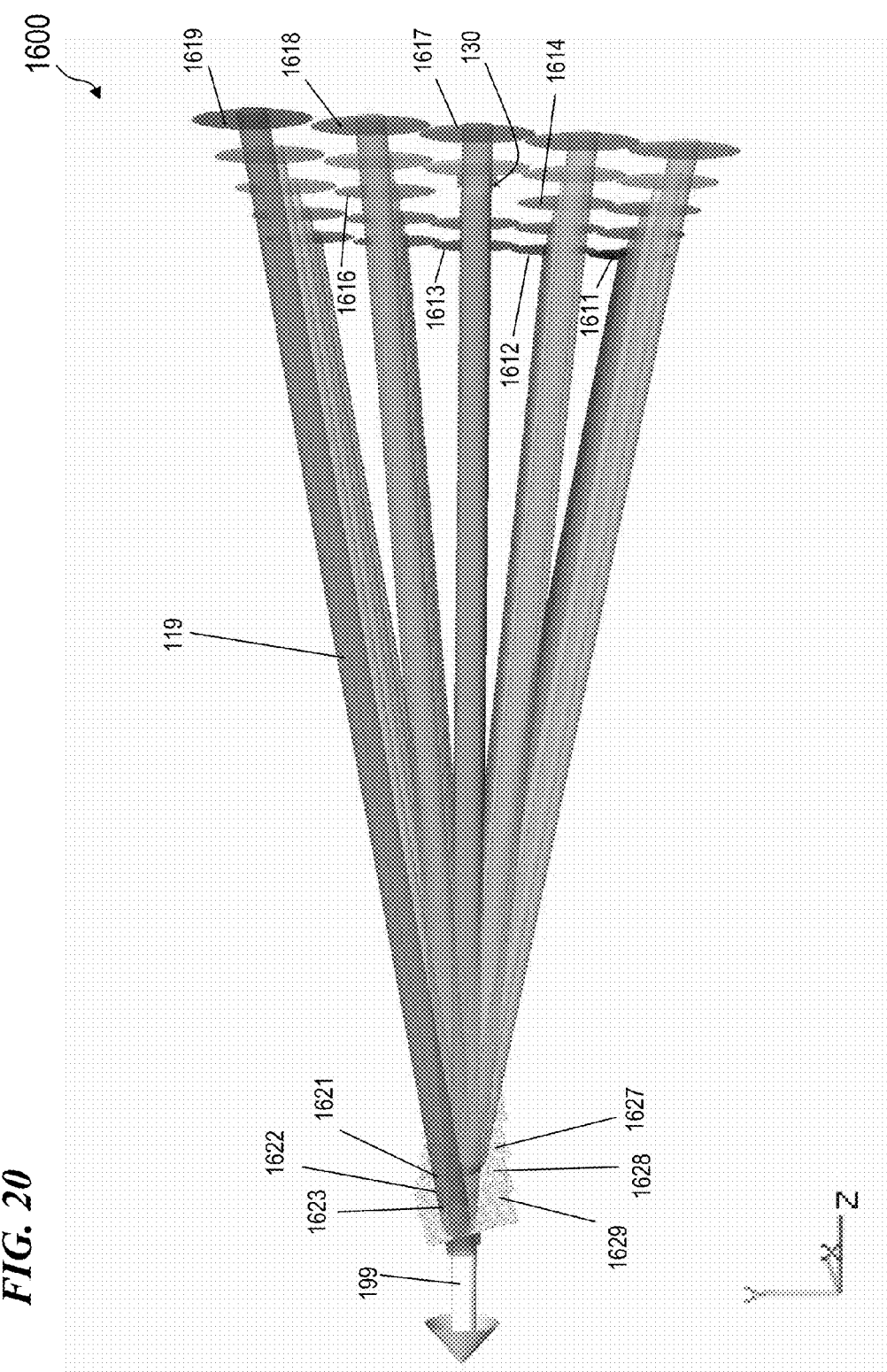
FIG. 20 is a schematic side perspective view of WDC-3D-SBC 1600.

FIG. 16 is a schematic back-top perspective view of a wavelength-dispersion-compensated one-dimensional-fan-in spectral-beam combiner (WDC-3D-SBC) 1600. FIG. 17 is a schematic back-side-top perspective view of WDC-3D-SBC 1600. FIG. 18 is a schematic top perspective view of WDC-3D-SBC 1600. FIG. 19 is a schematic front perspective view of WDC-3D-SBC 1600. FIG. 20 is a schematic side perspective view of WDC-3D-SBC 1600.

The system WDC-3D-SBC 1600 allows spreading the plurality of laser sources 1611, 1612, 1613, . . . 1627, 1628, and 1629 in both the X and Y directions, and having the respective input beams converge to the input gratings 1621, 1622, 1623, . . . 1627, 1628, 1629. In some embodiments, input gratings 1621-1629 have groove densities that are equal to the groove density of output grating 130, but relative to a configuration that is parallel to the output grating 130 are each tilted in the X-Z direction (i.e., along an arc lying in a plane that is parallel to the Y-Z plane containing the output beam 199) and in the Y-Z direction (i.e., along an arc lying in a plane that is perpendicular to the Y-Z plane containing the output beam 199). Such a configuration combines the first and third methods described above.

In other embodiments, input gratings 1621-1629 have groove densities that are different from the groove density of output grating 130, but, relative to a configuration that is parallel to the output grating 130, are each tilted in the X-Z direction (i.e., along an arc lying in a plane that is parallel to the Y-Z plane containing the output beam 199) but not in the Y-Z direction (i.e., along an arc lying in a plane that is perpendicular to the Y-Z plane containing the output beam 199). Such a configuration combines the first and third methods described above.

Thus, in various embodiments, WDC-3D-SBC 1600 provides a combination of the first and third, the second and third, or the first, second and third methods of converging spaced-apart sources that are spread and converging in the Y direction and spread and converging in the X direction.

FIGS. 21A-21K are schematic end views of example packing configurations for various numbers of source lasers that are usable for either system WDC-2.5D-SBC 1100 or system WDC-3D-SBC 1600. Each of these configurations assumes incremental convergence angles in the X direction that are equal to incremental convergence angles in the Y direction. In each of these configurations, the center-to-center spacings between input sources (for a given center-to-center spacing between input gratings) could be about twice as large for use with system WDC-3D-SBC 1600 as with system WDC-2.5D-SBC 1100, because of the additional convergence in the X direction. Note that in each of these configurations, the diameter of the small unit circle represents the collimated size of each input beam, and the size of each unit square represents approximately the size of each input grating 1121-1129 in FIG. 11 or 1621-1629 in FIG. 16, as seen end-on by the respective input beams. In some embodiments, the output grating has a unit height and a width that is at least as wide as the output beam (which will have a slightly larger width than height due to chromatic wavelength dispersion widening of each of the intermediate laser beams after the first grating (which introduces a linewidth-dependent wavelength dispersion to every beam in order to have them all converge at different angles toward the output grating—the output grating compensates and substantially prevents further linewidth-dependent wavelength dispersion by introducing an opposite linewidth-dependent wavelength dispersion to prevent further widening of the beam due to this effect).

Figure 21B:
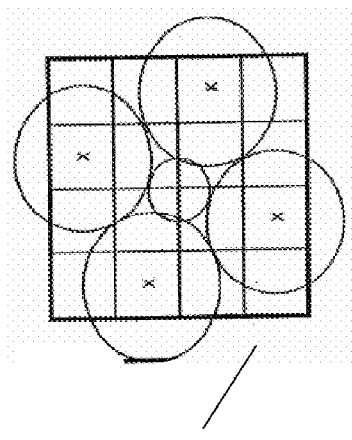
FIGS. 21A-21K are schematic end views of example packing configurations for source lasers that are usable for either system WDC-2.5D-SBC 1100 or system WDC-3D-SBC 1600.
Figure 21D:
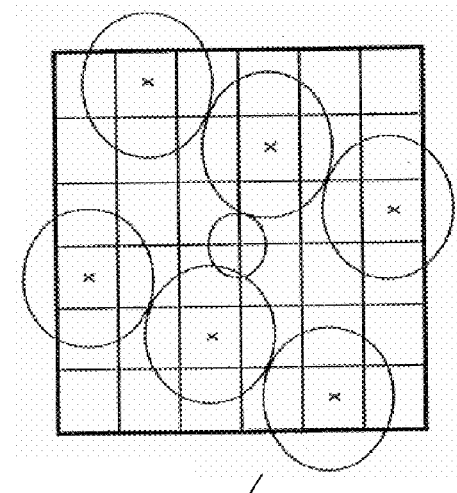
Figure 21A:
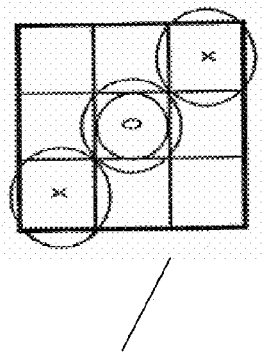

FIG. 21A shows larger circles representing diameters or side-by-side spacings of laser sources in some embodiments (e.g., input sources 1111-1119 of FIG. 11 or input sources 1611-1619 of FIG. 16) that converge to two or three input gratings (not shown here) (e.g., input gratings 1121-1129 of FIG. 11 or input gratings 1621-1629 of FIG. 16) that are disposed along a horizontal line centered on the smaller center circle that represents the location of the output beam 199 and/or the output grating 130. In some embodiments using this configuration, the center-center spacings of input sources 1111-1119 of FIG. 11 would be about 1.414 (square root of 2) times the center-center spacings of input gratings 1121-1129, assuming equal incremental convergence angles in the X and Y directions. In some embodiments using this configuration, the center-center spacings of input sources 1611-1619 of FIG. 16 could be about 2.8 times the center-center spacings of input gratings 1621-1629, depending on the maximum allowable diffraction convergence angle (e.g., the angle between beam 111 and beam 119 as shown in FIG. 3).

FIG. 21B shows larger circles representing diameters or side-by-side spacings of four laser sources in some embodiments (e.g., input sources 1111-1119 of FIG. 11 or input sources 1611-1619 of FIG. 16) that converge to four input gratings (not shown here) (e.g., input gratings 1121-1129 of FIG. 11 or input gratings 1621-1629 of FIG. 16) that are disposed along a horizontal line centered on the smaller center circle that represents the location of the output beam 199 and/or the output grating 130. In some embodiments using this configuration, the center-center spacings of input sources 1111-1119 of FIG. 11 would be about 2.236 (square root of 5) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

Figure 21C:
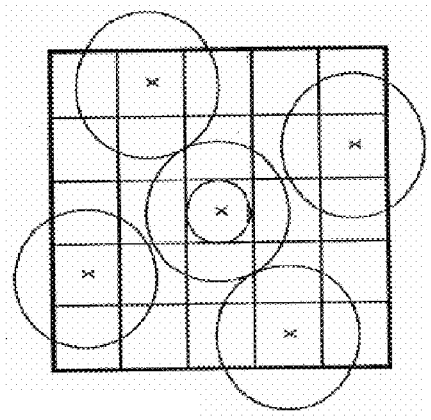

FIG. 21C shows larger circles representing diameters or side-by-side spacings of five laser sources in some embodiments that converge to five input gratings. In some embodiments using this configuration, the center-center spacings of input sources 1111-1119 of FIG. 11 would be about 2.236 (square root of 5) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

FIG. 21D shows larger circles representing diameters or side-by-side spacings of six laser sources in some embodiments that converge to six input gratings. In some embodiments using this configuration, the center-center spacings of input sources 1111-1119 of FIG. 11 would be about 2.236 (square root of 5) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

Figure 21E:
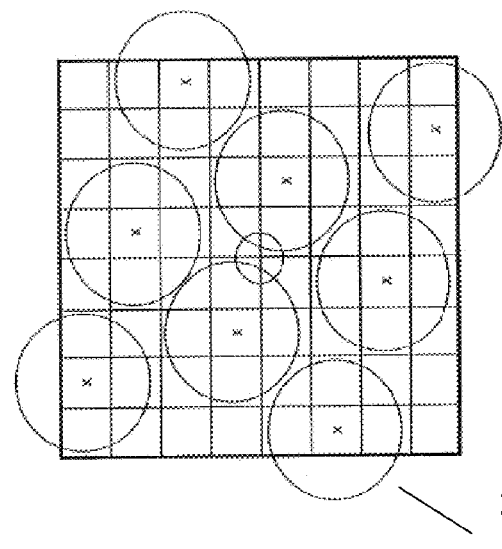

FIG. 21E shows larger circles representing diameters or side-by-side spacings of seven laser sources in some embodiments that converge to seven input gratings. In some embodiments using this configuration, the center-center spacings of input sources 1111-1119 of FIG. 11 would be about 2.828 (square root of 8) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

Figure 21F:
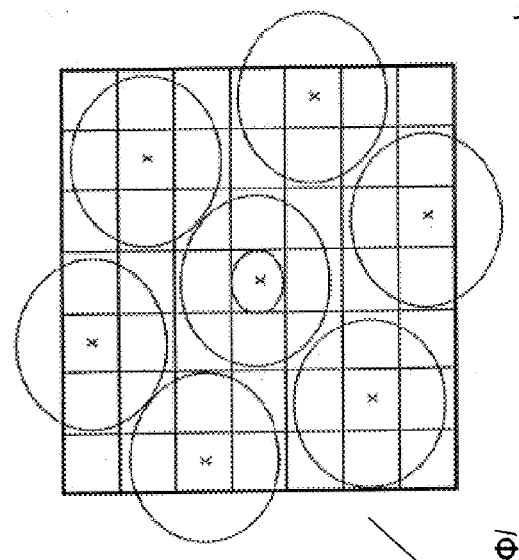

FIG. 21F shows larger circles representing diameters or side-by-side spacings of eight laser sources in some embodiments that converge to eight input gratings. In some embodiments using this configuration, the center-center spacings of input sources 1111-1119 of FIG. 11 would be about 2.828 (square root of 8) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

Figure 21H:
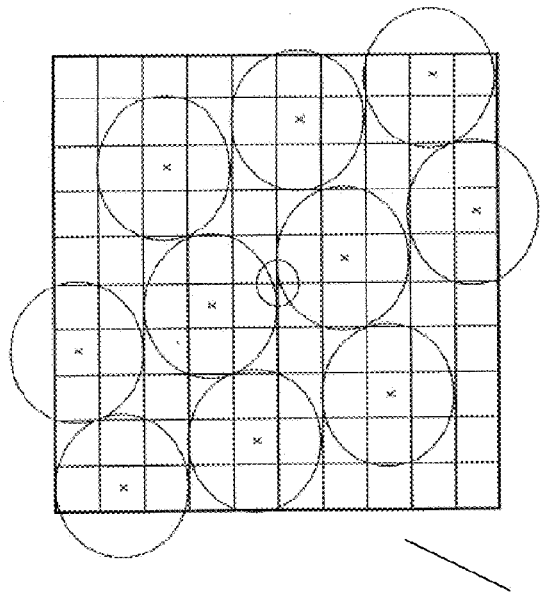
Figure 21G:
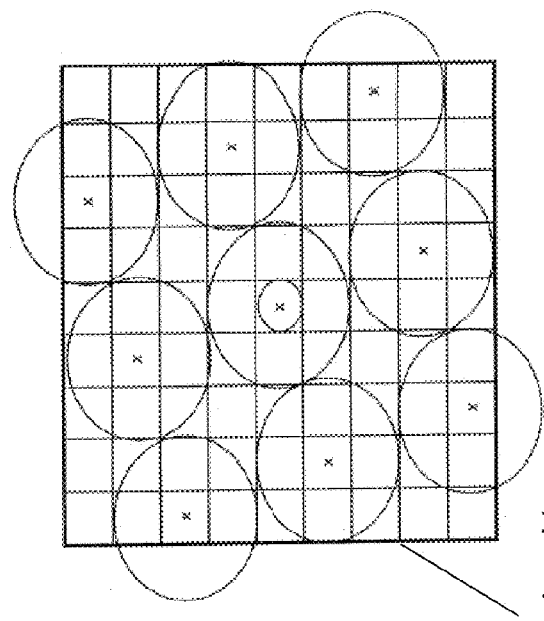

FIG. 21G shows larger circles representing diameters or side-by-side spacings of nine laser sources in some embodiments that converge to nine input gratings. In some embodiments using this configuration, the center-center spacings of input sources 1111-1119 of FIG. 11 would be about 3.162 (square root of 10) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

FIG. 21H shows larger circles representing diameters or side-by-side spacings of ten laser sources in some embodiments that converge to ten input gratings. In some embodiments using this configuration, the center-center spacings of input sources 1111-1119 of FIG. 11 would be about 3.162 (square root of 10) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

Figure 21J:
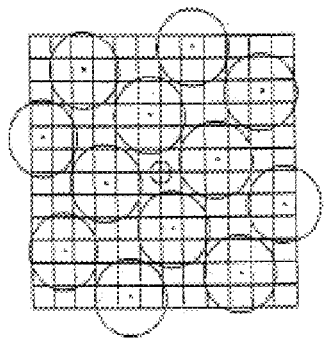
Figure 21I:
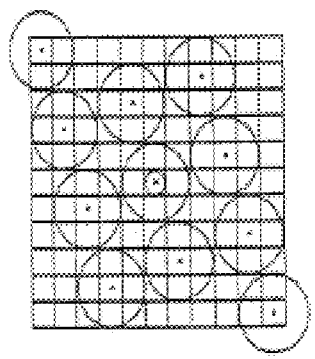

FIG. 21i shows larger circles representing diameters or side-by-side spacings of eleven laser sources in some embodiments that converge to eleven input gratings. In some embodiments using this configuration, the center-center spacings of input sources 1111-1119 of FIG. 11 would be about 3.162 (square root of 10) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

FIG. 21J shows larger circles representing diameters or side-by-side spacings of twelve laser sources in some embodiments that converge to twelve input gratings. In some embodiments using this configuration, the center-center spacings of input sources 1111-1119 of FIG. 11 would be about 3.3 (square root of 13) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing.

In some embodiments, equal numbers of X-direction increments and Y-direction increments are used, and the closest packing of equal-sized circular sources generally results from slightly diagonal configurations of laser sources as the examples here show. One can easily see that sources having a square lateral geometry can be overlaid on the circular outlines shown and are thus closely packed (with the squares at a slight tilt) to packing densities equaling those shown for the large circles here. In many configurations, the outside geometry of the sources will not be circular or square, however extending the teaching shown here is straight forward to other geometries using empirical methods or calculations based on these teachings.

In other embodiments, fewer numbers of X-direction increments and more Y-direction increments are used, especially where greater diffraction efficiencies are obtained in the reflective (Y-direction) than in the diffractive-off-Littrow directions (X direction).

Figure 21K:
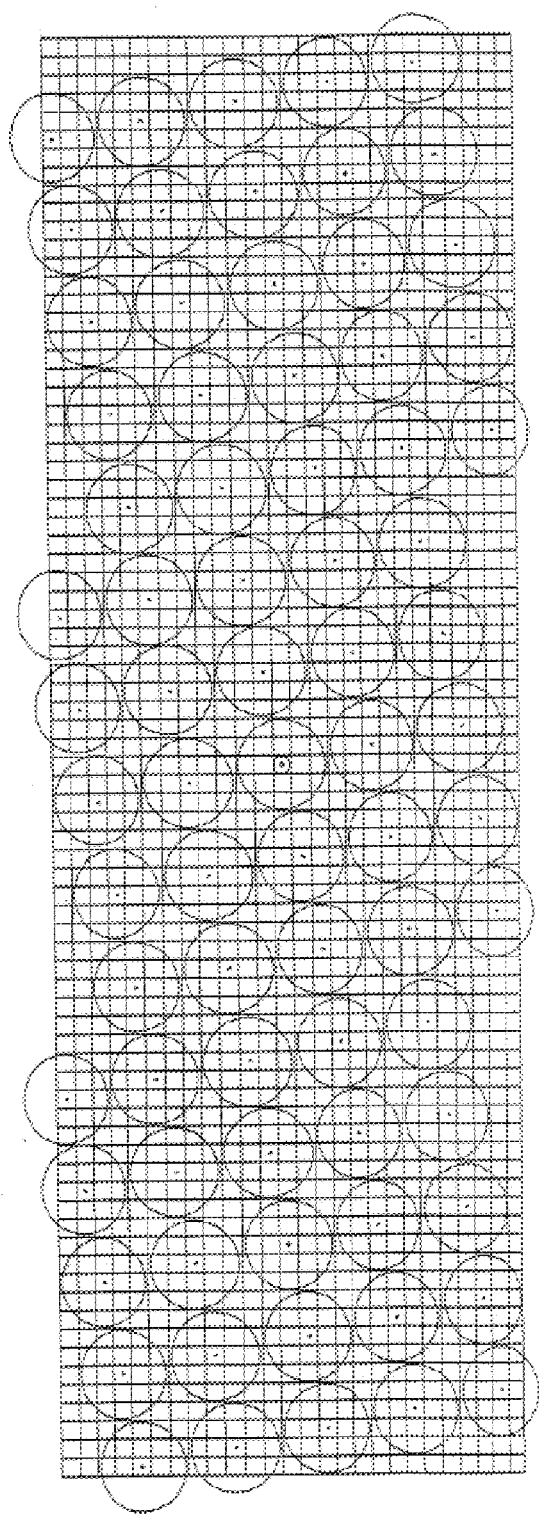

FIG. 21K shows larger circles representing diameters or side-by-side spacings of seventy-five laser sources in some embodiments that converge to seventy-five input gratings along a centrally located horizontal line intersecting the small circle in the center. In some embodiments using this configuration, the center-center spacings of input sources 1111-1119 of FIG. 11 would be about 5.1 (square root of 26) times the center-center spacings of input gratings 1121-1129, assuming equal incremental convergence angles in the X and Y directions. In some embodiments using this configuration, the center-center spacings of input sources 1611-1619 of FIG. 16 could be about twice that center-center spacing. Note that an even larger ratio of source size to grating size can be easily achieved by using more rows (a greater number of vertical increments) and a fewer number of columns (horizontal increments).

In some embodiments, high-efficiency dielectric gratings having many layers are used, wherein the thickness used for all of the dielectric layers is selected to achieve maximum light reflection and/or diffraction for the selected laser wavelength, the selected diffraction angle (alpha and beta) and, for embodiments using both Y-direction fan-in and X-direction fan-in, the selected reflection angle. In some embodiments, the thickness for each of the layers is chosen to be a half wavelength of the wavelength of the laser light given the index of refraction of that layer and the angle of the laser light through that layer. In some embodiments, this means using thinner dielectric layers for the input gratings at steeper reflection angles (i.e., input gratings located further in the Y direction) and at steeper diffraction angles (input gratings located further toward one wavelength end of the input gratings).

In any of the above embodiments that list an odd number of sources, the center source can be omitted to provide space for the output grating 130.

Figure 24:
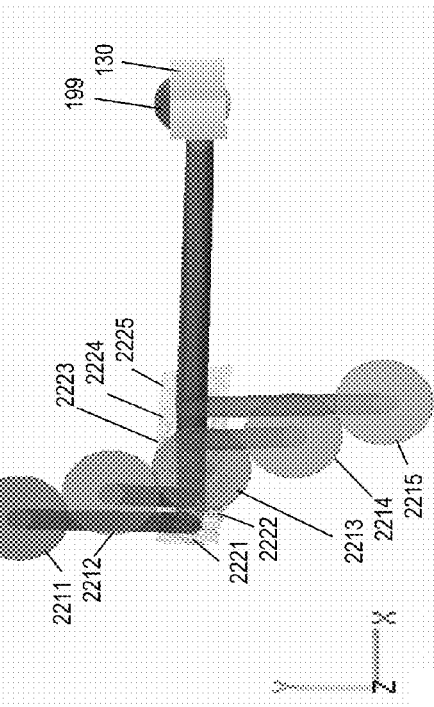
FIG. 24 is a schematic front perspective view of a portion of WDC-2.5D-SBC 1100.
Figure 25:
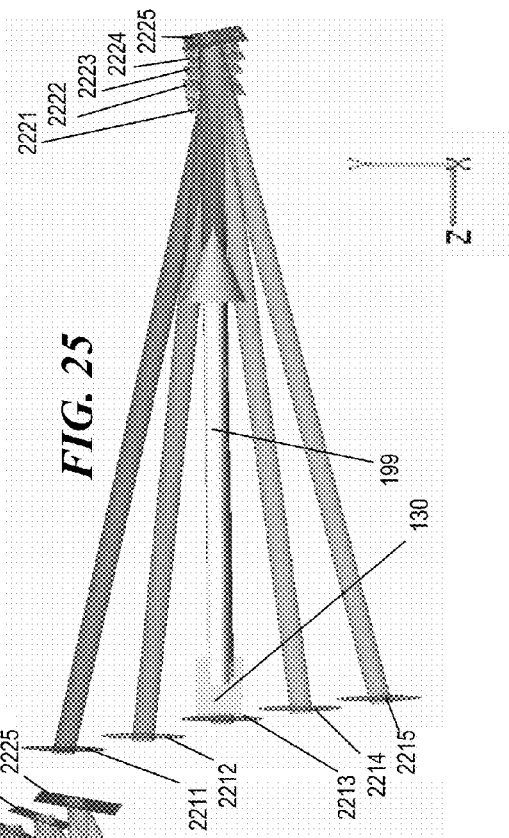
FIG. 25 is a schematic side perspective view of a portion of WDC-2.5D-SBC 1100.
Figure 22:
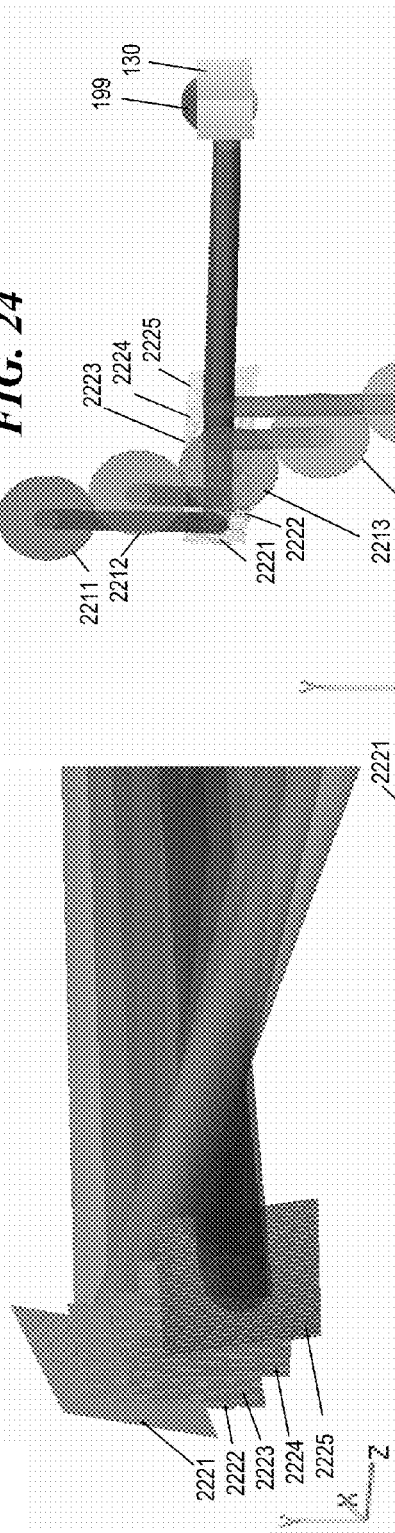
FIG. 22 is a schematic side-detail perspective view of a portion of WDC-2.5D-SBC 1100.
Figure 23:
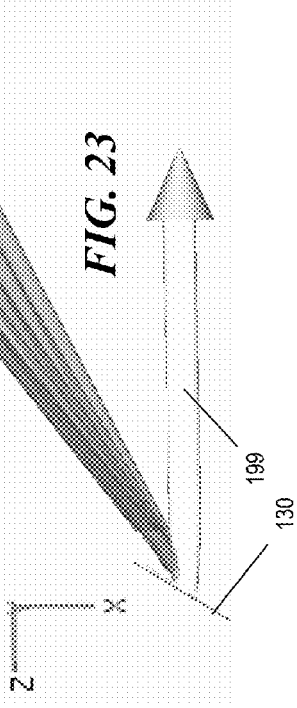
FIG. 23 is a schematic top perspective view of a portion of WDC-2.5D-SBC 1100.

FIG. 22 is a schematic side-detail perspective view of a portion of WDC-2.5D-SBC 1100. FIG. 23 is a schematic top perspective view of a portion of WDC-2.5D-SBC 1100. FIG. 24 is a schematic front perspective view of a portion of WDC-2.5D-SBC 1100. FIG. 25 is a schematic side perspective view of a portion of WDC-2.5D-SBC 1100.

In the embodiment shown, five input sources 2211, 2212, 2213, 2214 and 2215 are used, and direct their light toward the five input gratings 2221, 2222, 2223, 2224 and 2225. The up-down tilt of each of the input gratings is exaggerated in the figures to demonstrate the different up-down tilts used to deflect light from five different Y directions into the single plane of the intermediate laser beams (the paths of the laser beams between the input gratings and output grating 130). In some embodiments, the input gratings are identical to the output grating 130 (except perhaps for overall size) and have the same groove density; the input gratings are initially placed with their faces parallel to but having the opposite normal direction as the output grating 130; they are then tilted up or down in an arc around an axis in the X direction that passes through the center of each respective input grating (in some embodiments, the center grating 2223 is not tilted (0-degree tilt), while the inner input gratings 2222 and 2224 are tilted up and down, respectively, by the same first amount (e.g., 0.64 degrees, or one degree, or some other suitable amount), and the outer input gratings 2221 and 2225 are tilted up and down, respectively, by the same second amount (e.g., 1.28 degrees, or two degrees, or some other suitable amount)). In some embodiments, a much greater number of sources and input gratings are used (for example, such as WDC-2.5D-SBC 1100 of FIG. 11), and a similar pattern is repeated to accommodate all the sources and input gratings.

Figure 26A:
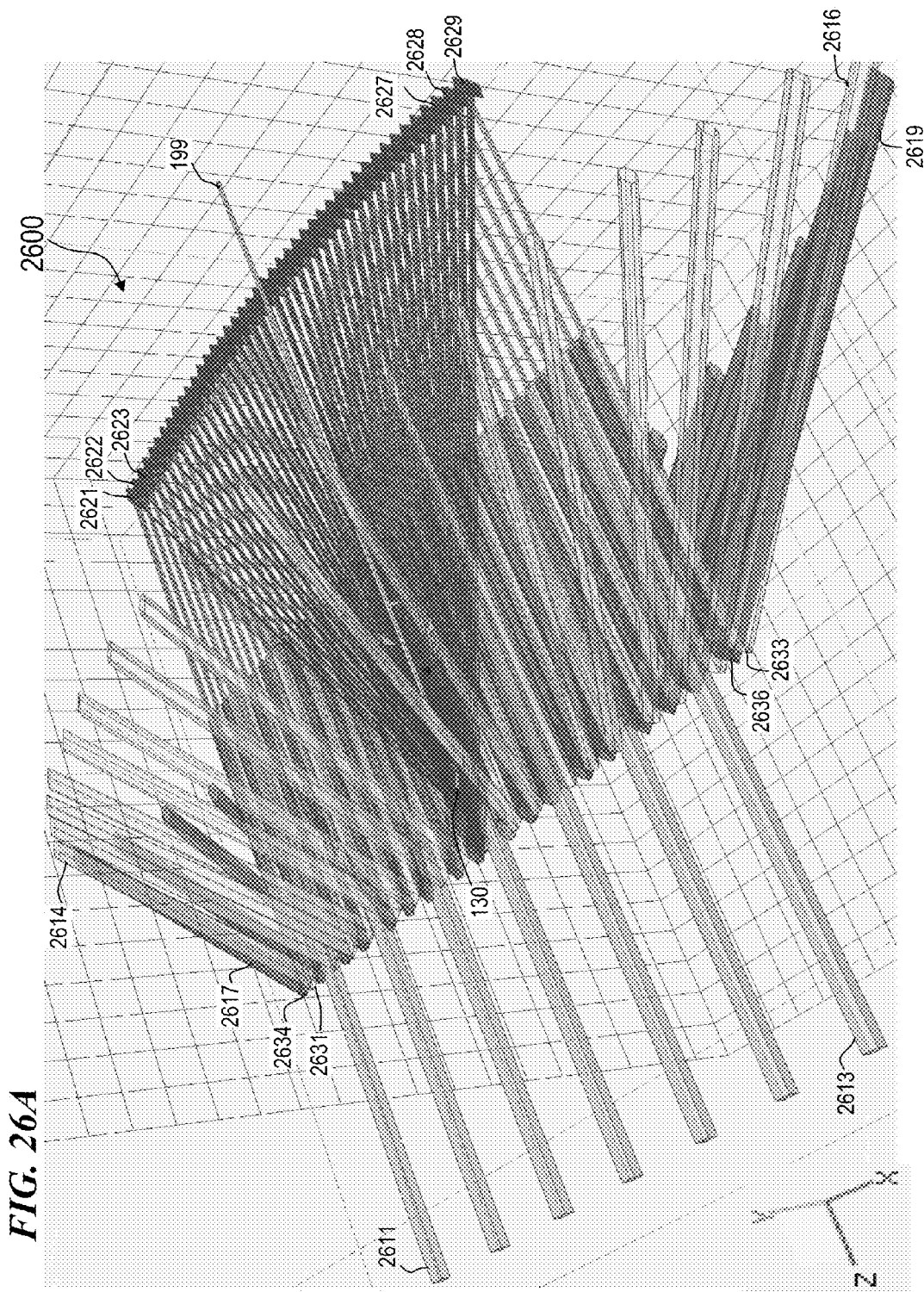
FIG. 26A is a schematic front-side-top perspective view of a wavelength-dispersion-compensated three-dimensional spectral-beam combiner (WDC-1D-SBC) 2600.
Figure 26B:
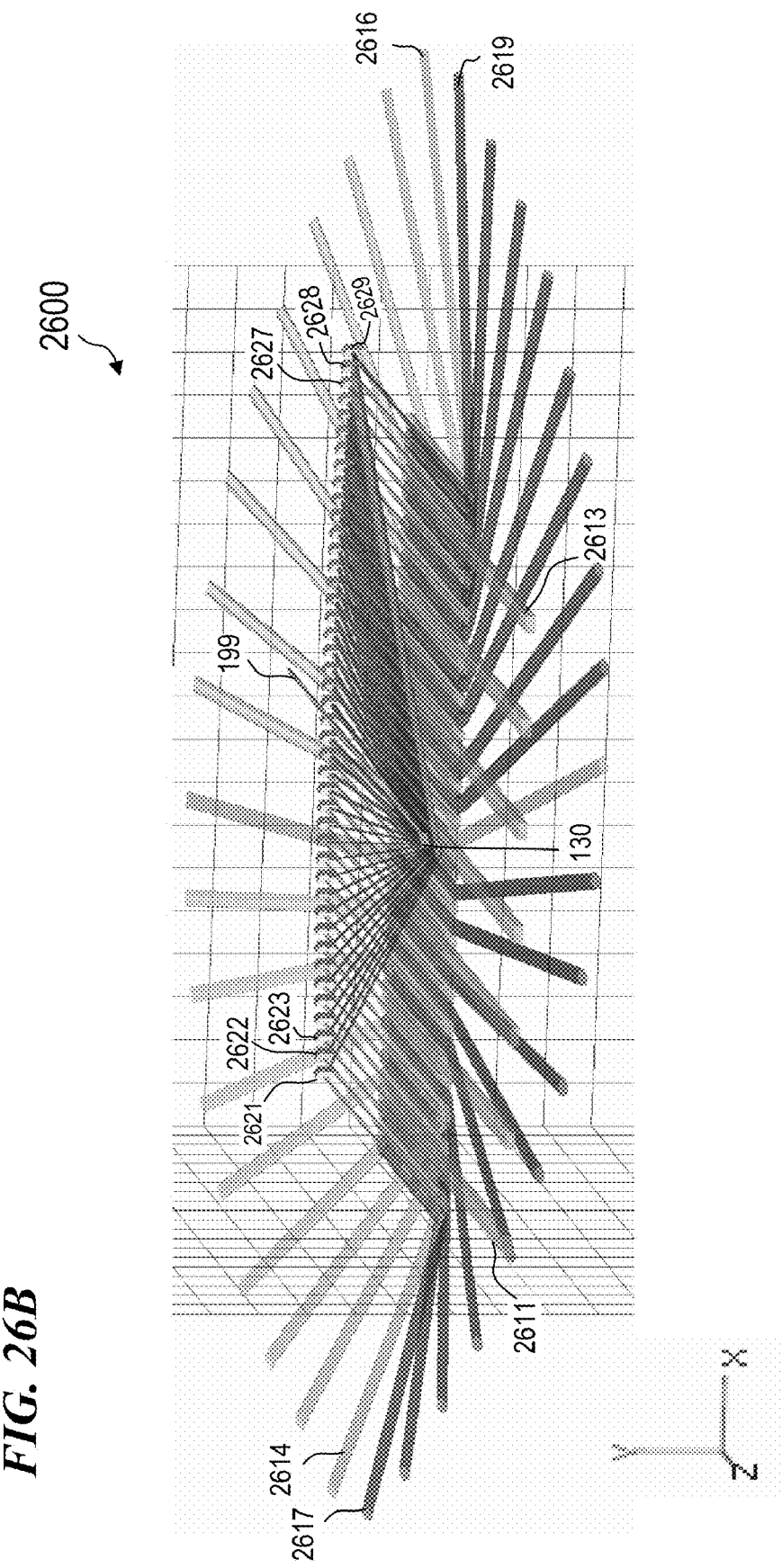
FIG. 26B is a schematic front-side-top perspective view of a wavelength-dispersion-compensated three-dimensional spectral-beam combiner (WDC-1D-SBC) 2600.
Figure 26C:
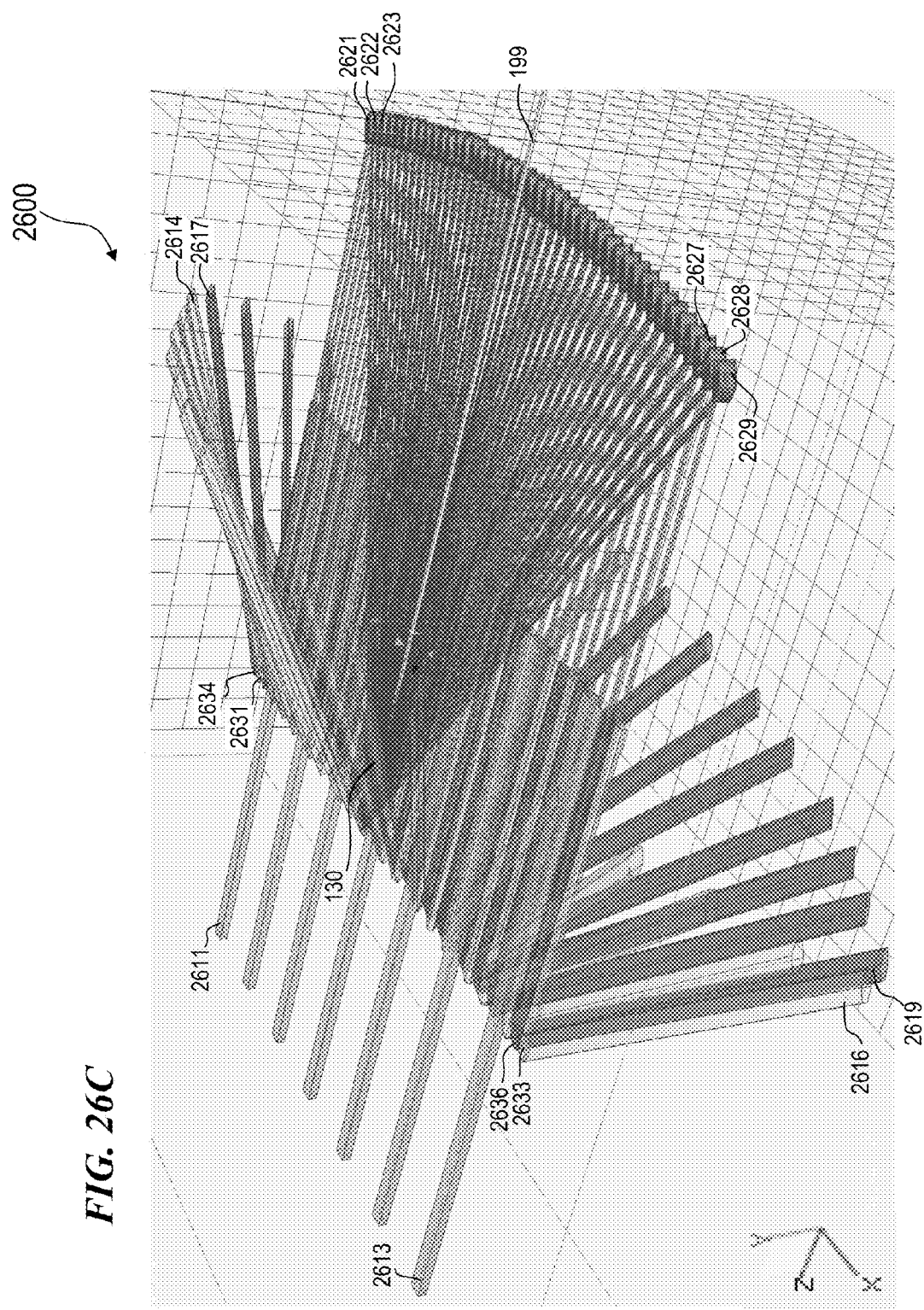
FIG. 26C is a schematic back-top perspective view of a wavelength-dispersion-compensated three-dimensional spectral-beam combiner (WDC-1D-SBC) 2600.
Figure 26D:
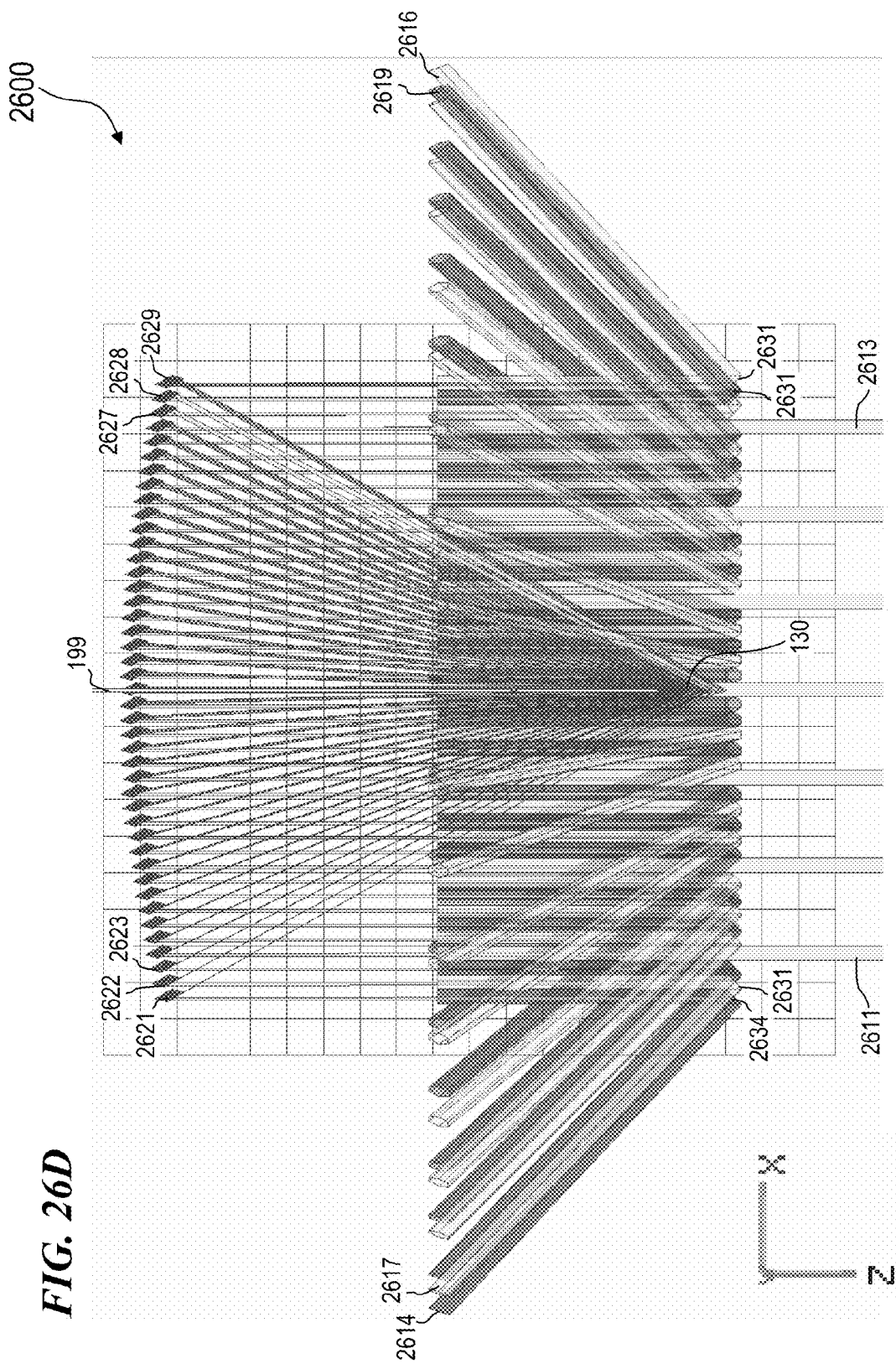
FIG. 26D is a schematic top view of WDC-1D-SBC 2600.
Figure 26E:
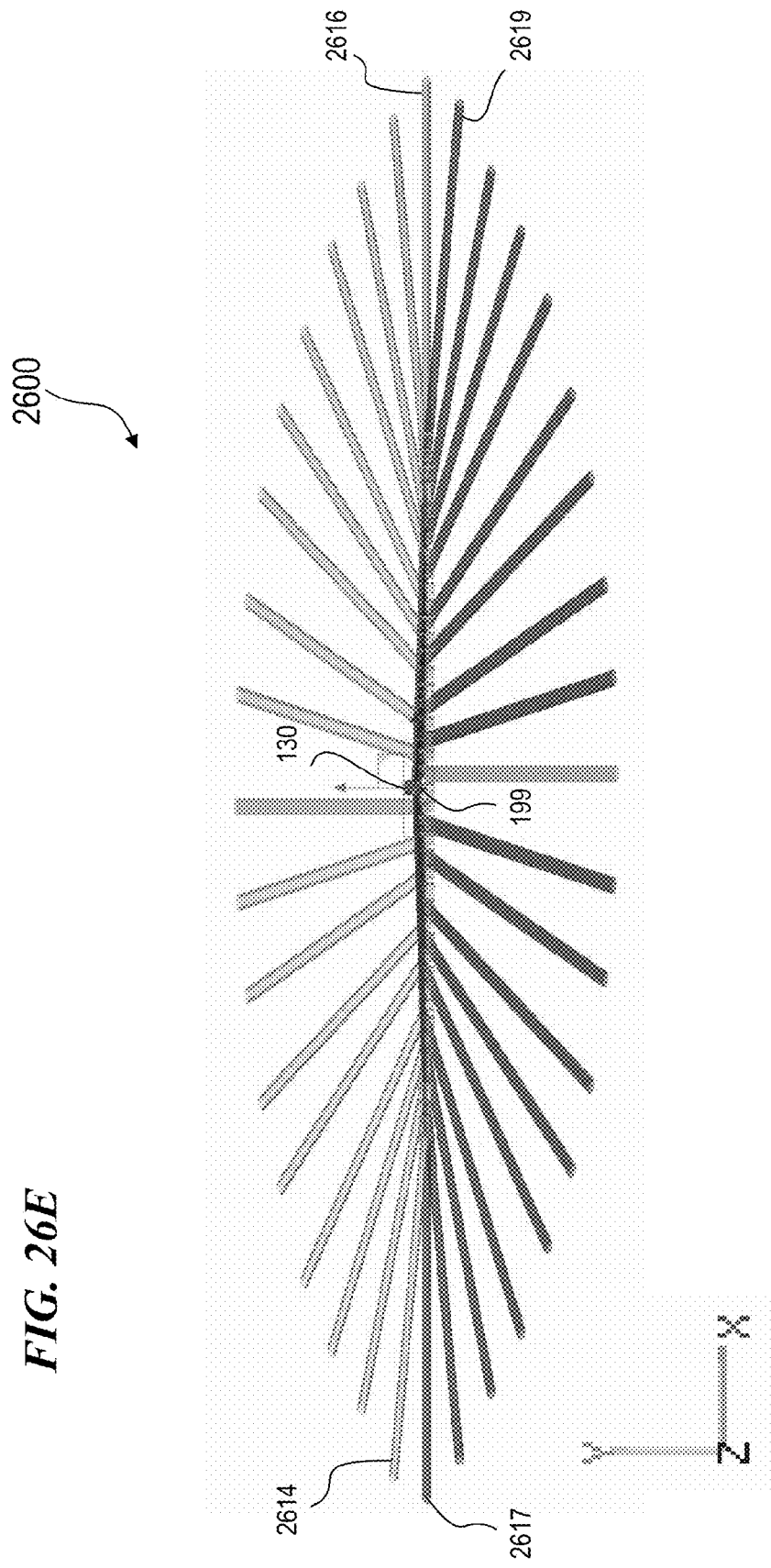
FIG. 26E is a schematic back view of WDC-1D-SBC 2600.
Figure 26F:
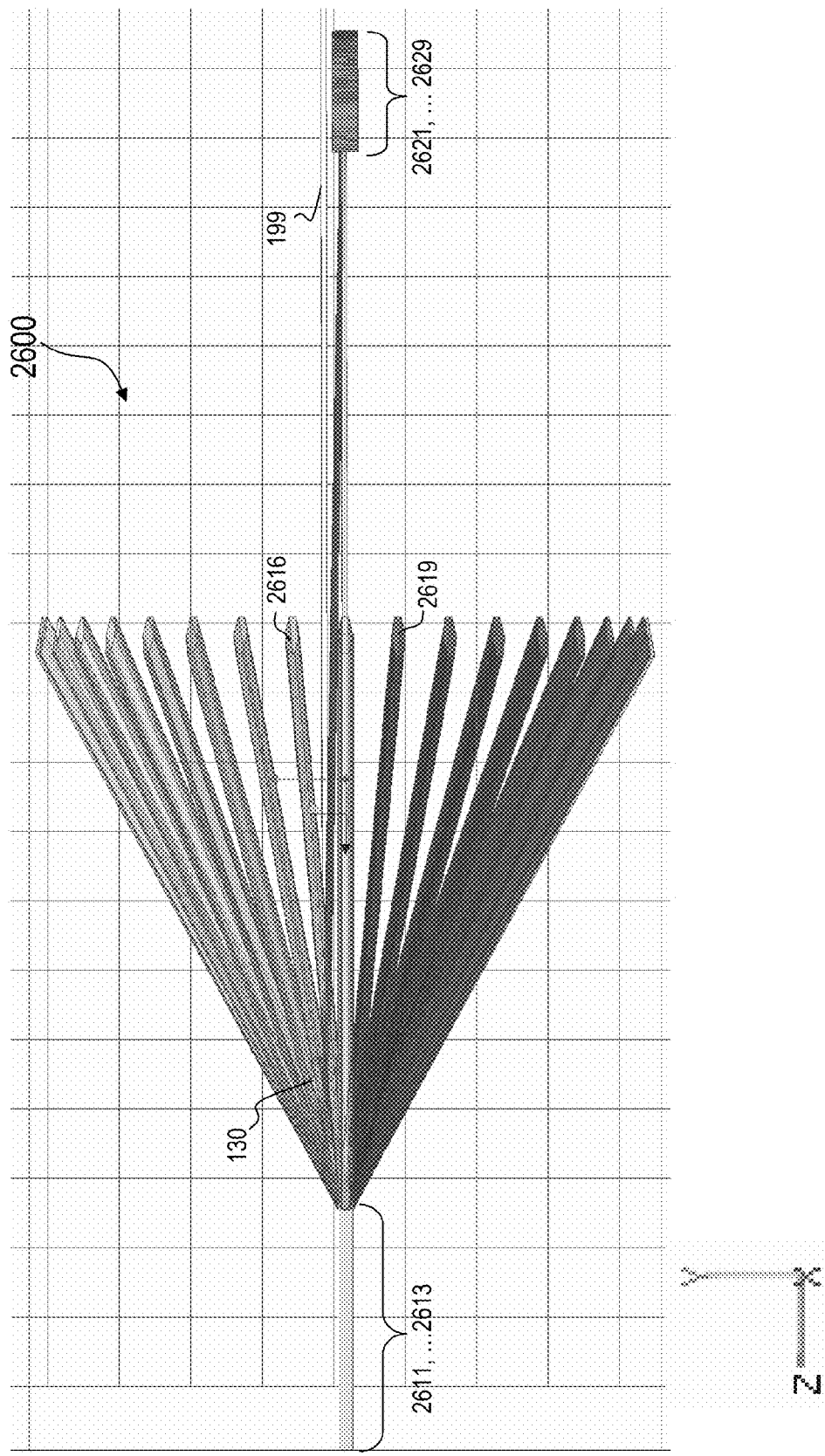
FIG. 26F is a schematic side view of WDC-1D-SBC 2600.

FIG. 26A is a schematic front-side-top perspective view of a wavelength-dispersion-compensated three-dimensional spectral-beam combiner (WDC-1D-SBC) 2600. FIG. 26B, FIG. 26C, FIG. 26D, FIG. 26E, and FIG. 26F are each different views of the WDC-1D-SBC 2600 of FIG. 26A. FIG. 26B is a schematic front-side-top perspective view of wavelength-dispersion-compensated three-dimensional spectral-beam combiner (WDC-1D-SBC) 2600. FIG. 26C is a schematic back-top perspective view of a wavelength-dispersion-compensated three-dimensional spectral-beam combiner (WDC-1D-SBC) 2600. FIG. 26D is a schematic top view of WDC-1D-SBC 2600. FIG. 26E is a schematic back view of WDC-1D-SBC 2600. FIG. 26F is a schematic side view of WDC-1D-SBC 2600.

In some embodiments, WDC-1D-SBC 2600 includes a plurality of direct laser beams 2611, . . . 2613 that propagate directly to a first subset of input gratings 2623, . . . 2627, and a plurality of upper reflected laser beams 2614, . . . 2616 that come from laser sources (e.g., fiber-based laser sources) located above the plane of the intermediate beams and are reflected by a second subset of dielectric mirrors 2631, . . . 2633 towards respective ones of the input gratings 2622, . . . 2629, and a plurality of lower reflected laser beams 2617, . . . 2619, that come from laser sources (e.g., fiber-based laser sources) located below the plane of the intermediate beams and are reflected by a third subset of dielectric mirrors 2634, . . . 2636 towards respective ones of the input gratings 2621, . . . 2628, each direct and reflected laser beam propagating along an optical path and encountering an input grating (i.e., input gratings 2621, 2622, 2623, . . . 2627, 2628, and 2629) and converging onto an output grating 130, the interaction with the output grating 130 causes the plurality of laser beams 2611, . . . 2613 and 2614, . . . 2616 and 2617, . . . 2619 to be spectral-beam combined into a single output beam 199. In some embodiments, input beams 2611 . . . 2613 propagate parallel to and in the same direction as the output beam 199 (i.e., in the minus-Z direction as shown in FIG. 26A) and are coplanar with one another (i.e., input beams 2611 . . . 2613 are in a single first plane). Input beams 2614, . . . 2616 and 2617, . . . 2619 initially propagate in a direction generally moving away from and at a non-zero angle to the direction of propagation of the output beam 199 and input beams 2611, . . . 2613 (i.e., the input beam vector has a Z-component that is in the opposite direction as the direction of propagation of the output beam 199) and radially inward toward the X-Z plane (i.e., the vector of the input beams 2614, . . . 2616 has both an X-component and a Y-component along with the Z-component and is propagating in a downward direction toward the X-Z plane and the vector of the input beams 2617, . . . 2619 also has an X-component and a Y-component along with the Z-component and is propagating in an upward direction toward the X-Z plane).

In some embodiments, input beams 2614 . . . 2616 and 2617 . . . 2619 impinge on highly reflective (HR) mirrors 2631 . . . 2633 and 2634 . . . 2636, respectively, and are reflected towards the input gratings 2621, 2622, 2623 . . . 2627, 2628 and 2629 in the same direction as the output beam 199. In some embodiments, HR mirrors 2631 . . . 2633 and 2634 . . . 2636 are angled such that after reflection, input beams 2614 . . . 2616 and 2617 . . . 2619 are parallel and coplanar with each other as well as with input beams 2611 . . . 2613. In some embodiments, HR mirrors 2631 . . . 2633 and 2634, . . . 2636 are angled such that after reflection, input beams 2614 . . . 2616 and 2617 . . . 2619 and also input beams 2611 . . . 2613 are parallel to output beam 199. In some embodiments, HR mirrors 2631 . . . 2633 and 2634 . . . 2636 are dielectric-coated high-reflectivity mirrors each having a plurality of dielectric layers wherein the thickness and refractive index of the dielectric layers are chosen based on the wavelength and expected angle of incidence of the input beam incident upon each mirror such that the reflection of the input beam is maximized. In some embodiments, HR mirrors 2631 . . . 2633 and 2634 . . . 2636 are substantially identical dielectric coated high reflectivity mirrors each having the same plurality of dielectric layers. For a given plurality of dielectric layers, HR mirrors have one wavelength-dependent angle at which maximum reflectivity is achieved. In some embodiments, since the plurality of mirrors 2631 . . . 2633 and 2634 . . . 2636 are each angled according to the wavelength of its respective input beam such that the reflection of the respective input beam is maximized.

For example, in some embodiments, it is believed if a certain HR mirror has dielectric layers that maximize reflectivity at 1060 nm and a 15-degree angle of incidence (i.e., an angle between the incident beam and the reflected beam of 30 degrees, such that a dielectric layer having an index of refraction of 1.5 would be 174.02 nm thick), a range of input wavelengths from about 1044 nm to about 1100 nm might have angles of incidence for maximum reflectivity of about 0 degrees to about 54 degrees (i.e., angles between the incident beam and the reflected beam of between about 0 degrees to about 27 degrees), while a range of input wavelengths from about 1056 nm to about 1065 nm might have angles of incidence for maximum reflectivity of about 26 degrees to about 34 degrees (i.e., angles between the incident beam and the reflected beam of between about 13 degrees to about 17 degrees). Further, in some embodiments, the plurality of mirrors 2631 . . . 2633 and 2634 . . . 2636 are each angled so as to maximize the distance from each laser source to its nearest neighbors given the constraint of the total volume available for the laser sources and the maximum distance allowed for propagation of the input beams. Thus, in order to meet both the goal of maximum reflectivity and maximum distance between sources within the allowed volume, the input beams are angled in the X and Y directions such that some adjacent beams alternate upward and downward with successively larger X components, and, in some embodiments, about every fifth beam is not reflected but travels directly from the laser source to its respective input grating. In other embodiments, other angles and/or alternation patterns for the input beams are used.

In some embodiments, input beams 2611 . . . 2613 and 2614 . . . 2616 and 2617, . . . 2619 encounter input gratings 2621, 2622, 2623 . . . 2627, 2628 and 2629 and converge towards the output grating 130 and are spectral beam combined into output beam 199. In some embodiments, the laser beams between the input gratings 2621-2629 and the output grating 130 are also coplanar (i.e., centered in a second plane that is the plane into which a multi-wavelength (e.g., white) beam propagating in a direction opposite the output beam 199 would disperse). In some embodiments, the first plane and the second plane are coplanar, and the output beam also propagates in that plane. In other embodiments, the first plane and the second plane are coplanar (as shown in FIG. 26A), but the output beam is at a small angle to these planes (as shown in FIG. 26A) due to an up-down tilt in the orientation of output grating 130, which allows the output beam to bypass input gratings 2621-2629 and thus permits the possibility of having more input gratings than possible if the output beam remains in the plane containing the intermediate beams, input gratings 2621-2629 and output grating 130. In other embodiments, the first plane and the second plane are at a small angle to one another, and the output beam propagates in a direction determined by the angle between the second plane and the plane of the grating face of the output grating 130, which can be either up or down at a slight angle.

In order to provide greater density of input laser beams (as compared to the density of input laser beams in the configurations shown in U.S. Pat. No. 7,233,442 titled "Method and apparatus for spectral-beam combining of high-power fiber lasers," which is incorporated herein by reference in its entirety, and which showed input beams that were all parallel to the output beam) for the input laser beams 2611-2619 in WDC-1D-SBC 2600, the use of HR mirrors to reflect the input laser beams propagating from above and below the X-Z plane into the first plane provides an increased density of input beams 2611-2619 before they encounter the input gratings 2621-2629.

In some embodiments, the input gratings 2621-2629 are placed in adjacent locations as close together as possible, in order to have the smallest angle of convergence toward the output grating 130, which allows the use of diffraction angles that are as close as possible to the Littrow angle. In some embodiments, at least one of the input gratings is at an angle less than the Littrow angle and at least one of the input gratings is at an angle greater than the Littrow angle (i.e., the output beam exits between the input gratings located at angles less than the Littrow angle and the input gratings at angles greater than the Littrow angle). In some embodiments, an equal number of input gratings are at an angle less than the Littrow angle and an equal number of input gratings are at an angle more than the Littrow angle. In other embodiments, the SBC system of the present invention uses a larger number of input gratings on one side of Littrow (angles smaller than the Littrow angle) than on the other, since the first-order diffraction continues further (i.e., at a greater angle from Littrow) when going towards angles smaller than Littrow.

In some embodiments, WDC-1D-SBC 2600 is limited by the size of the angle at the output grating 130 (herein called the output convergence angle) between the intermediate beam from grating 2621 and the intermediate beam from grating 2629, the size of the input gratings 2621-2629, and the distance between the output grating 130 and input gratings 2621-2629. In some embodiments, each input grating is placed equidistant from the output grating (along a circular arc centered at the output grating 130) in order that the beam spread width amount (i.e., the width of each beam becomes larger as compared to its height due to the chromatic dispersion caused by the non-zero linewidth of each laser beam) for every beam is approximately equal. In other embodiments, the input gratings 2621-2629 are located along a straight line approximately perpendicular to the output beam. In other embodiments, the locations of the input gratings 2621-2629 are staggered at different distances in order to get the intermediate beams (the beams after the input gratings 2621-2629 but before the output grating 130) as close together as possible, thus increasing the number of input beams that can be combined. In some embodiments, once the center-to-center spacing of the intermediate beams (and thus the input gratings 2621-2629) has been minimized, the center-center spacing of the input lasers and their respective collimating optics becomes a limiting factor as to how many input beams 2621-2629 can be combined into a single output beam 199.

The WDC-SBC systems of the present invention provide for spectral-beam combining of non-parallel input laser beams 2611-2619 while still providing wavelength-dispersion compensation. In some embodiments, the present invention allows approximately two (or more) times as many laser beams to be combined while having at least some chromatic dispersion compensation, as compared to configurations as described in U.S. Pat. No. 7,199,924 and U.S. Pat. No. 7,233,442, wherein the input laser beams are all approximately parallel and coplanar.

Figure 27A:
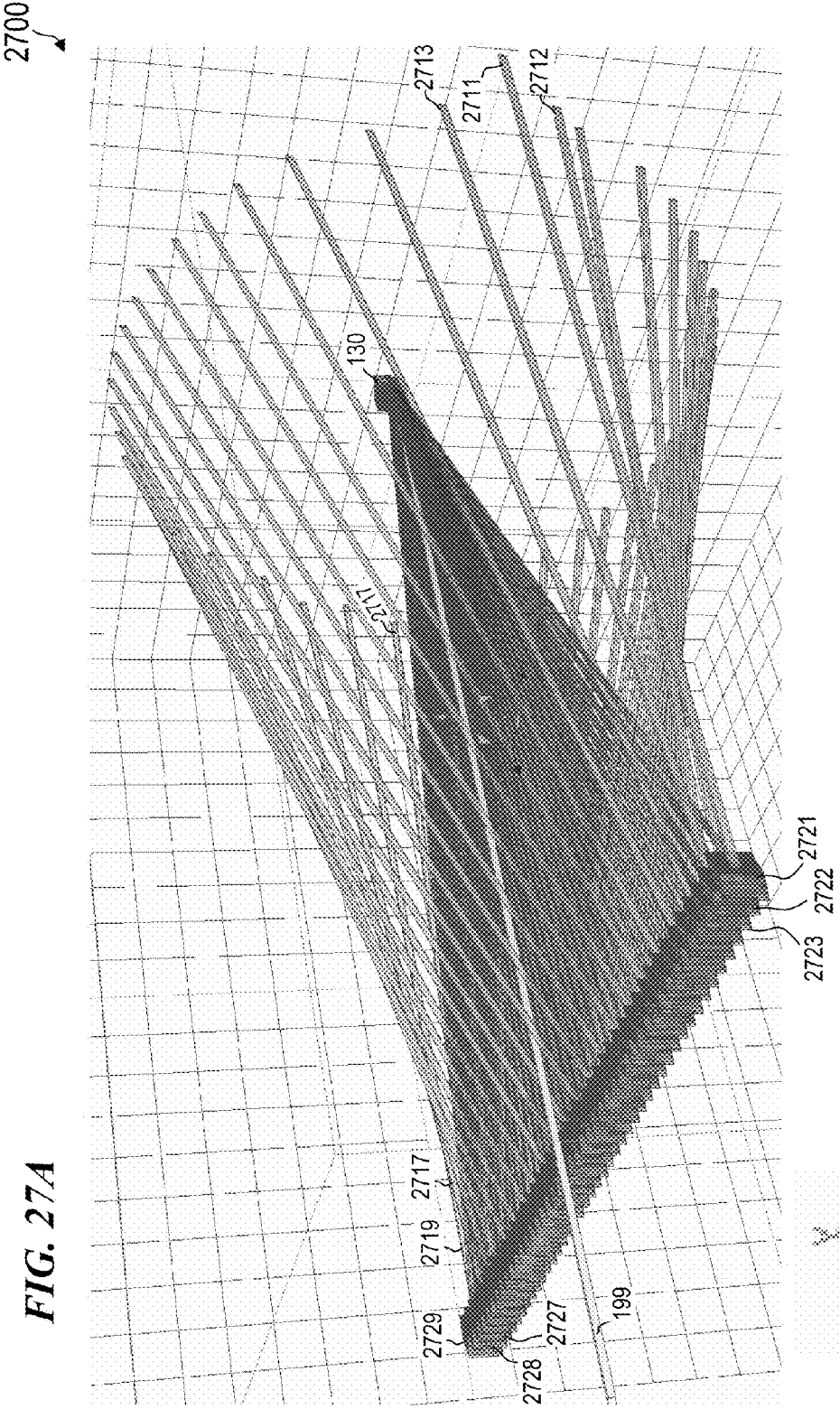
FIG. 27A is a schematic back-top perspective view of a wavelength-dispersion-compensated three-dimensional spectral-beam combiner (WDC-3D-SBC) 2700.
Figure 27B:
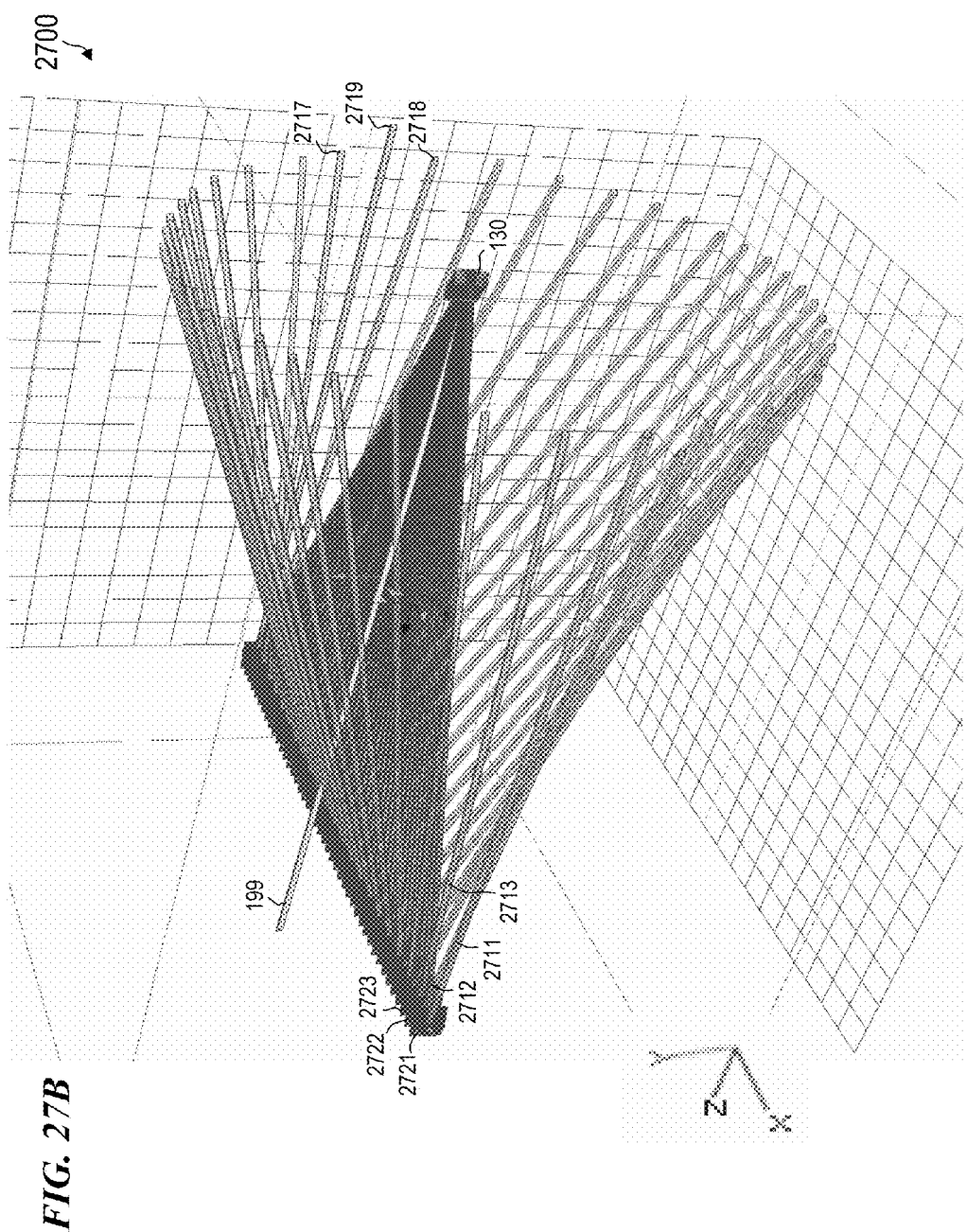
FIG. 27B is a schematic front-side-top perspective view of a wavelength-dispersion-compensated three-dimensional spectral-beam combiner (WDC-3D-SBC) 2700.
Figure 27C:
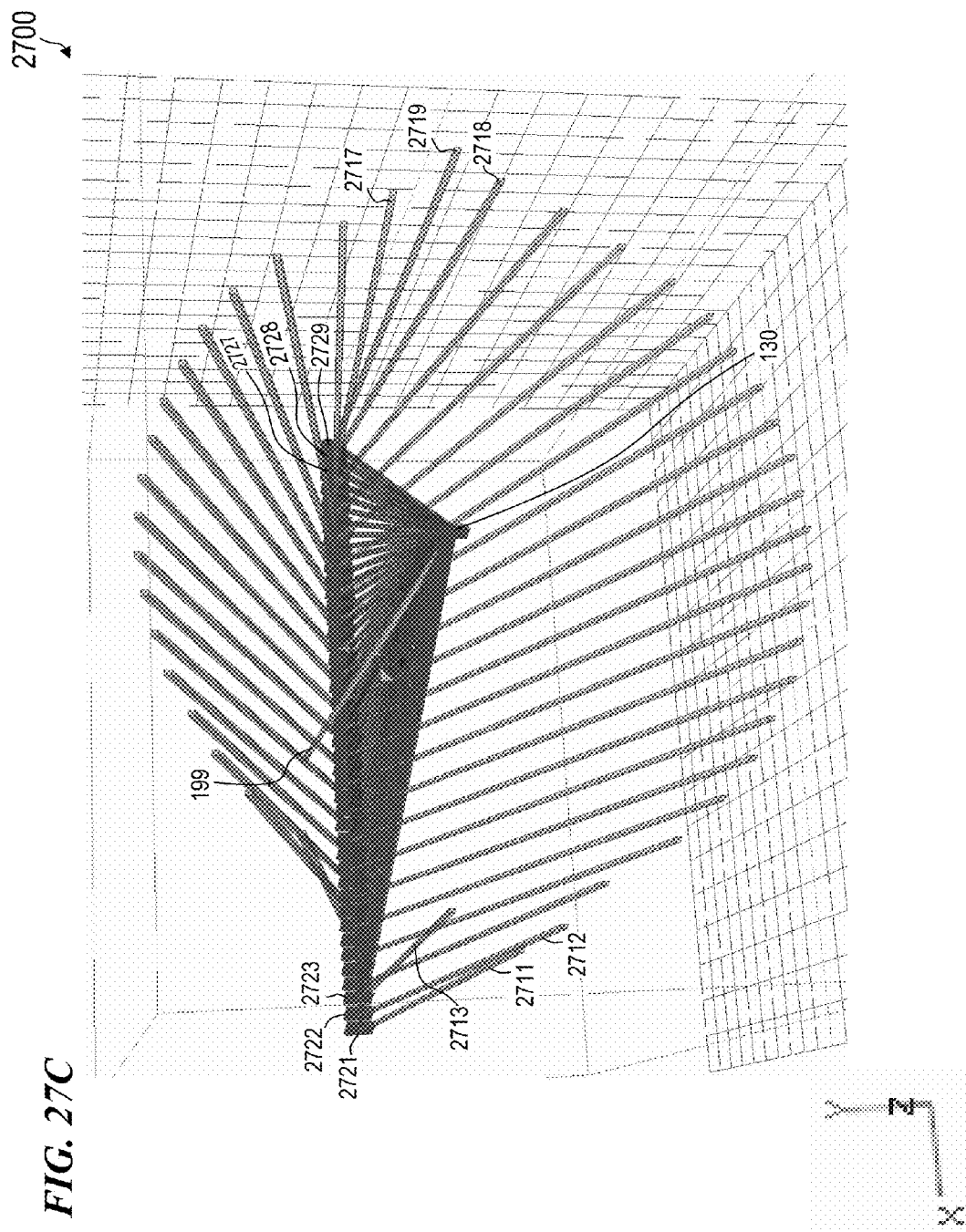
FIG. 27C is a schematic front-side-top perspective view of a wavelength-dispersion-compensated three-dimensional spectral-beam combiner (WDC-3D-SBC) 2700.
Figure 27D:
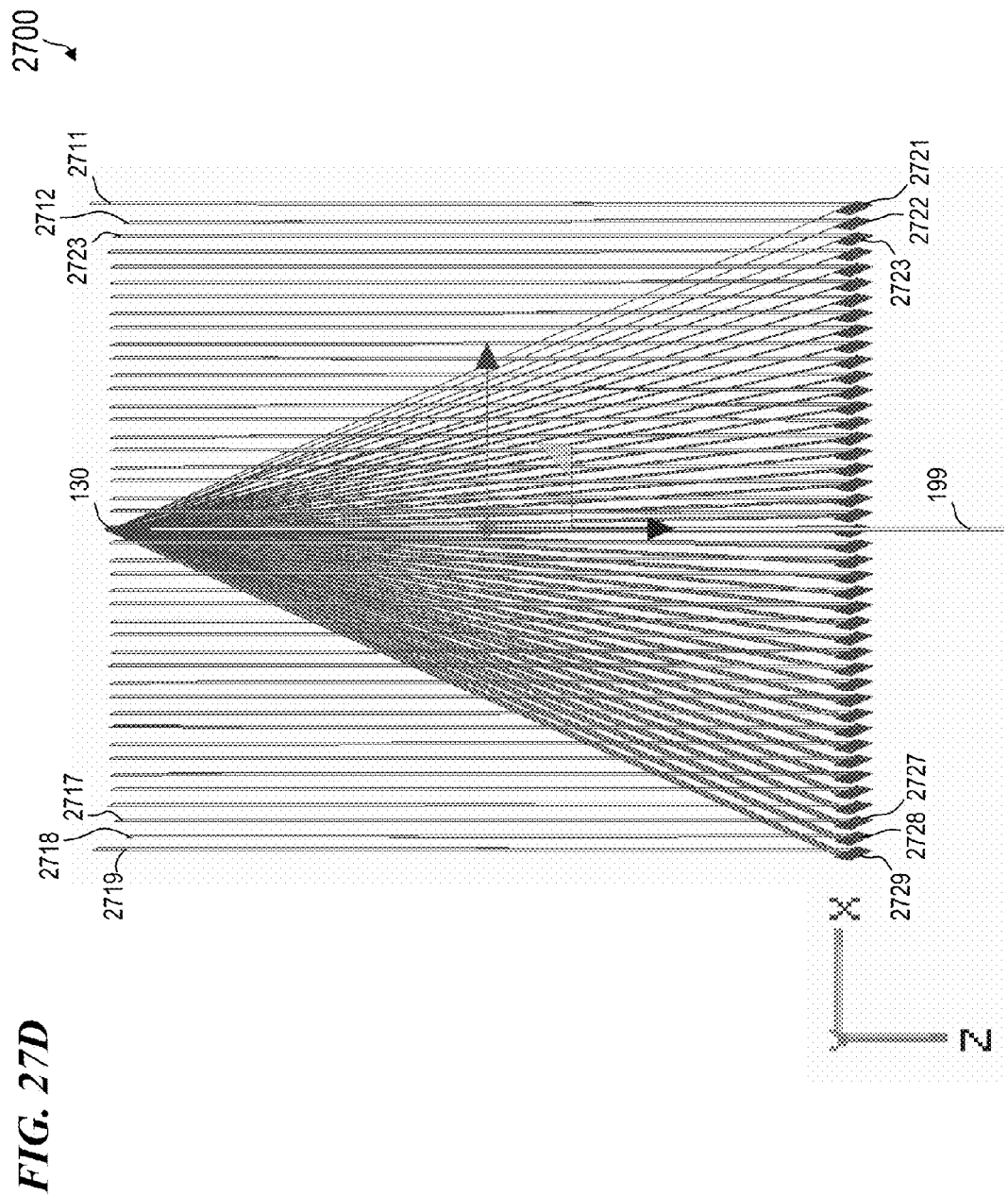
FIG. 27D is a schematic top view of WDC-3D-SBC 2700.
Figure 27E:
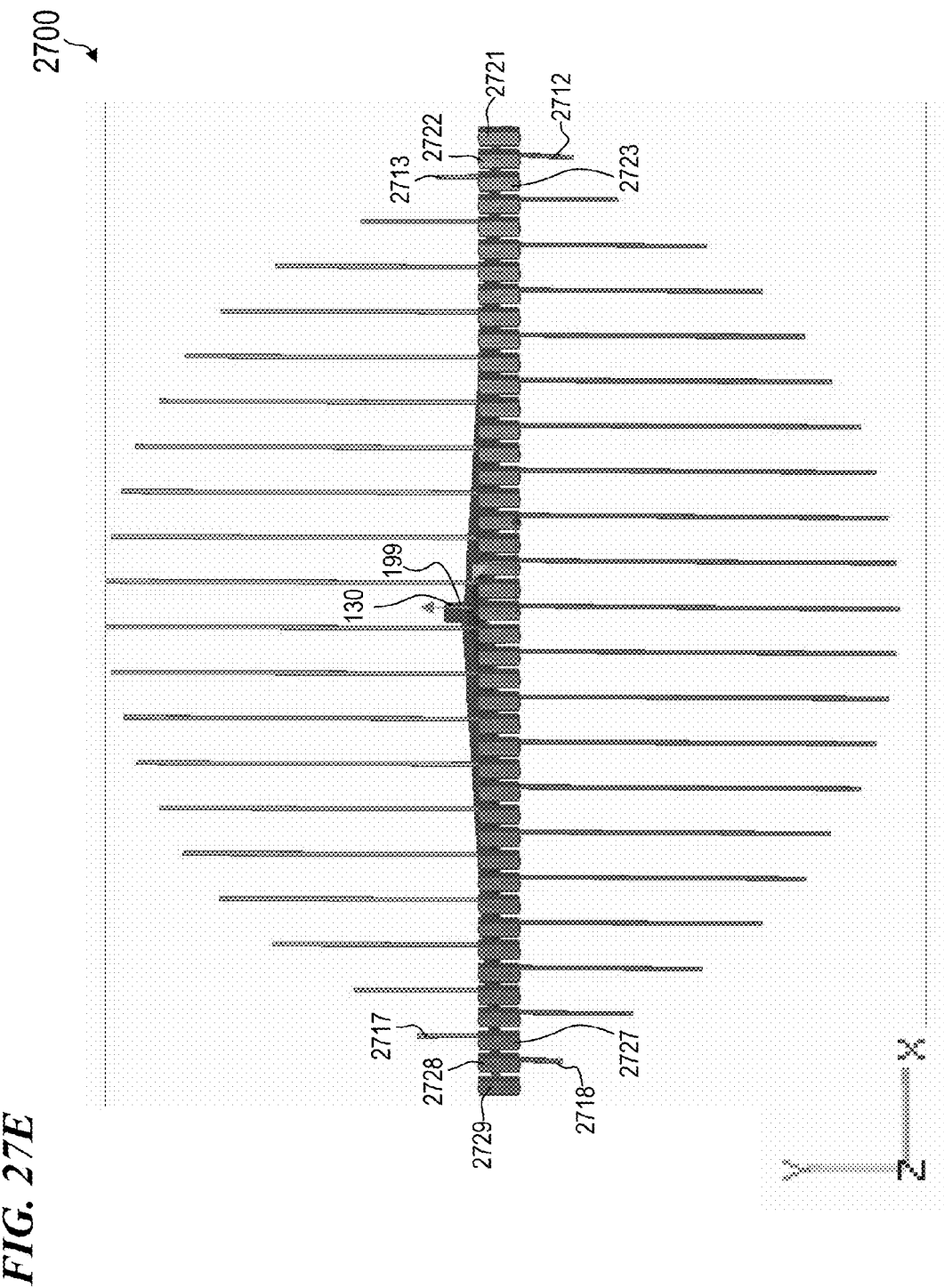
FIG. 27E is a schematic front view of WDC-3D-SBC 2700.
Figure 27F:
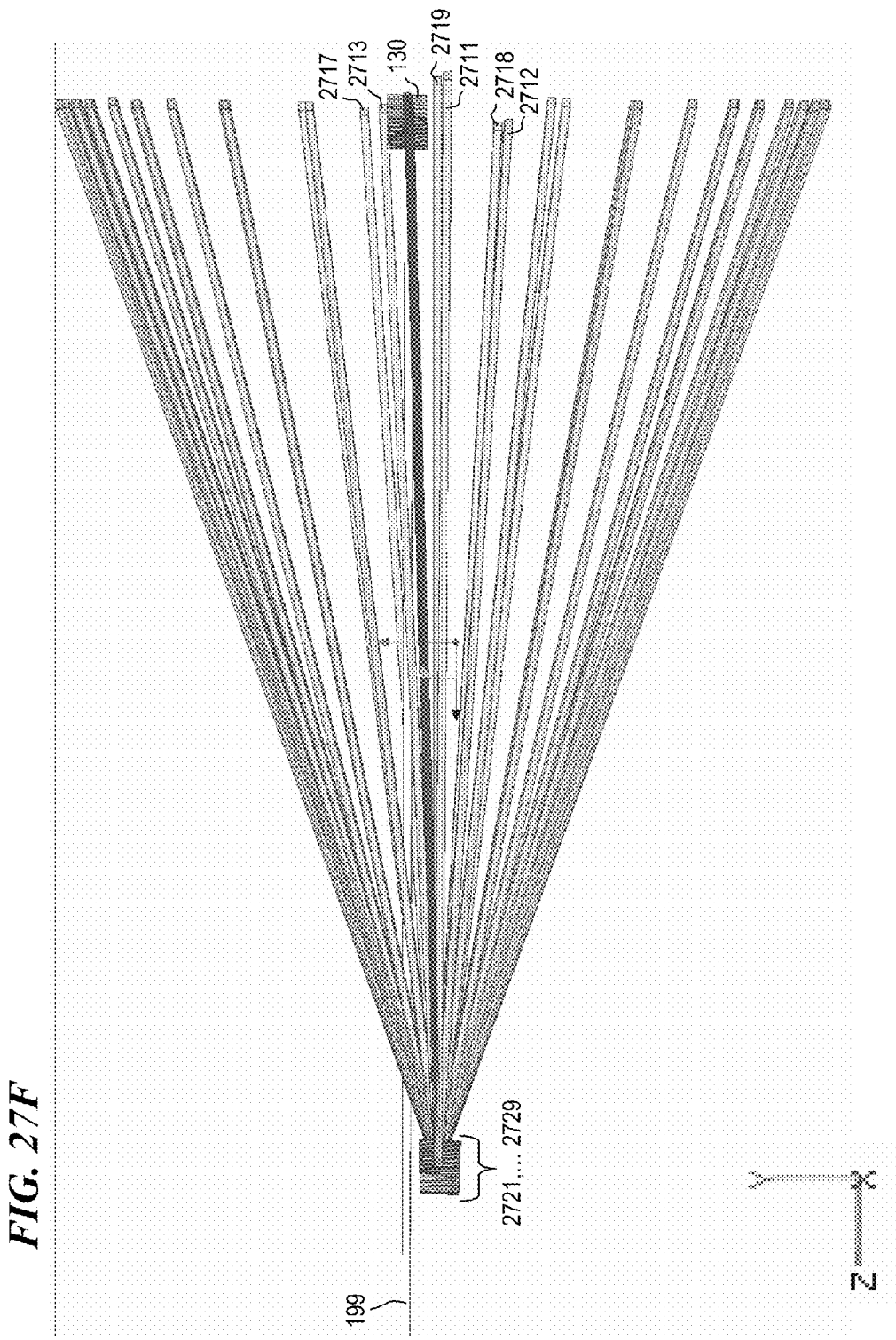
FIG. 27F is a schematic side view of WDC-3D-SBC 2700.

FIG. 27A is a schematic back-top perspective view of a wavelength-dispersion-compensated three-dimensional spectral-beam combiner (WDC-3D-SBC) 2700. FIG. 27B is a schematic front-side-top perspective view of a wavelength-dispersion-compensated three-dimensional spectral-beam combiner (WDC-3D-SBC) 2700. FIG. 27C is a schematic front-side-top perspective view of a wavelength-dispersion-compensated three-dimensional spectral-beam combiner (WDC-3D-SBC) 2700. FIG. 27D is a schematic top view of WDC-3D-SBC 2700. FIG. 27E is a schematic front view of WDC-3D-SBC 2700. FIG. 27F is a schematic side view of WDC-3D-SBC 2700.

In some embodiments, WDC-3D-SBC 2700 includes a plurality of laser beams 2711, 2712, 2713, . . . 2717, 2718, and 2719, each laser beam propagating along an optical path and encountering an input grating (i.e., input gratings 2721, 2722, 2723, . . . 2727, 2728, and 2729) and converging onto an output grating 130, the interaction with the output grating 130 causes the plurality of laser beams 2711, 2712, 2713, . . . 2717, 2718 and 2719 to be spectrally combined into a single output beam 199. In some embodiments, input beams 2711 and 2719 propagate in the same direction as the output beam 199 and are coplanar. In some embodiments, the other input beams (i.e., 2712, 2713, . . . 2718 and 2719) propagate in the same general direction as the output beam 199 (i.e., the input beam vector has a Z-component that is in the same direction as the direction of propagation of the output beam 199) and along a path that is parallel to the output beam 199 toward the X-Z plane (i.e., the vectors of the input beams 2614, . . . 2616 and 2617, . . . 2619 have a Y-component and a Z-component, but no X-component and are input beams 2614, . . . 2616 are propagating in a downward direction toward the X-Z plane and the input beams 2617, . . . 2619 are propagating in an upward direction toward the X-Z plane). In some embodiments, the input beams 2711 . . . 2719 form an arc above and below the X-Z plane. In some embodiments, input beams 2712, 2713 . . . 2718 and 2719 alternate between propagating in an upward direction toward the X-Z plane and in a downward direction toward the X-Z plane (i.e., the even numbered input beams 2712 . . . 2718 propagate in an upward direction toward the X-Z plane and the odd numbered input beams 2713 . . . 2717 propagate in a downward direction toward the X-Z plane, as shown in FIGS. 27C and 27E).

In some embodiments, input beams 2711, 2712, 2713, . . . 2717, 2718 and 2719 impinge on input gratings 2721, 2722, 2723, . . . 2727, 2728 and 2729 and are converged towards the output grating 130 and spectral beam combined into output beam 199. In some embodiments, the laser beams between the input gratings 2721-2729 and the output grating 130 are coplanar (i.e., centered in a first plane that is the plane into which a multi-wavelength (e.g., white) beam propagating in a direction opposite the output beam 199 would disperse). In some embodiments, the first plane and the output beam propagate in the same plane. In other embodiments, the first plane and the output beam are at a small angle to the first (as shown in FIG. 27A) due to an up-down tilt in the orientation of output grating 130, which allows the output beam to bypass input gratings 2721-2729 and thus permits the possibility of having more input gratings than possible if the output beam remains in the plane containing the intermediate beams, input gratings 2721-2729 and output grating 130.

For example, in some embodiments, it is believed if a certain HR grating has dielectric layers that maximize reflectivity at 1060 nm and an angle of incidence that matches the Littrow angle for that grating (i.e., an angle such that the incident beam and the reflected beam are parallel to one another and propagating in opposite directions) and that the dielectric layers are of a thickness that maximizes output power, beams of other wavelengths (e.g., wavelengths in the power bandwidth of Yb of about 1040 nm to about 1100 nm), this range of input wavelengths may benefit from having the input beams impinge on the input gratings at angles that are out-of-plane to the plant of the intermediate beams. Thus, in order to meet both the goal of maximum power in the diffracted beam and maximum distance between sources within the allowed volume, the input beams of WDC-3D-SBC system 2700 are angled in the X and Y directions such that some adjacent beams alternate upward and downward with successively larger X components, as shown in the various views of WDC-3D-SBC system 2700 in FIG. 27A, FIG. 27B, FIG. 27C, FIG. 27D, FIG. 27E, and FIG. 27F. In other embodiments, other angles and/or alternation patterns for the input beams are used.

In order to provide greater density of input laser beams (as compared to the density of input laser beams in the configurations shown in U.S. Pat. No. 7,233,442 titled "Method and apparatus for spectral-beam combining of high-power fiber lasers," which is incorporated herein by reference in its entirety, and which showed input beams that were all parallel to the output beam) for the input laser beams 2711-2719 in WDC-3D-SBC 2700, the input laser beams propagating from above and below the X-Z plane provides an increased density of input beams.

Figure 27G:
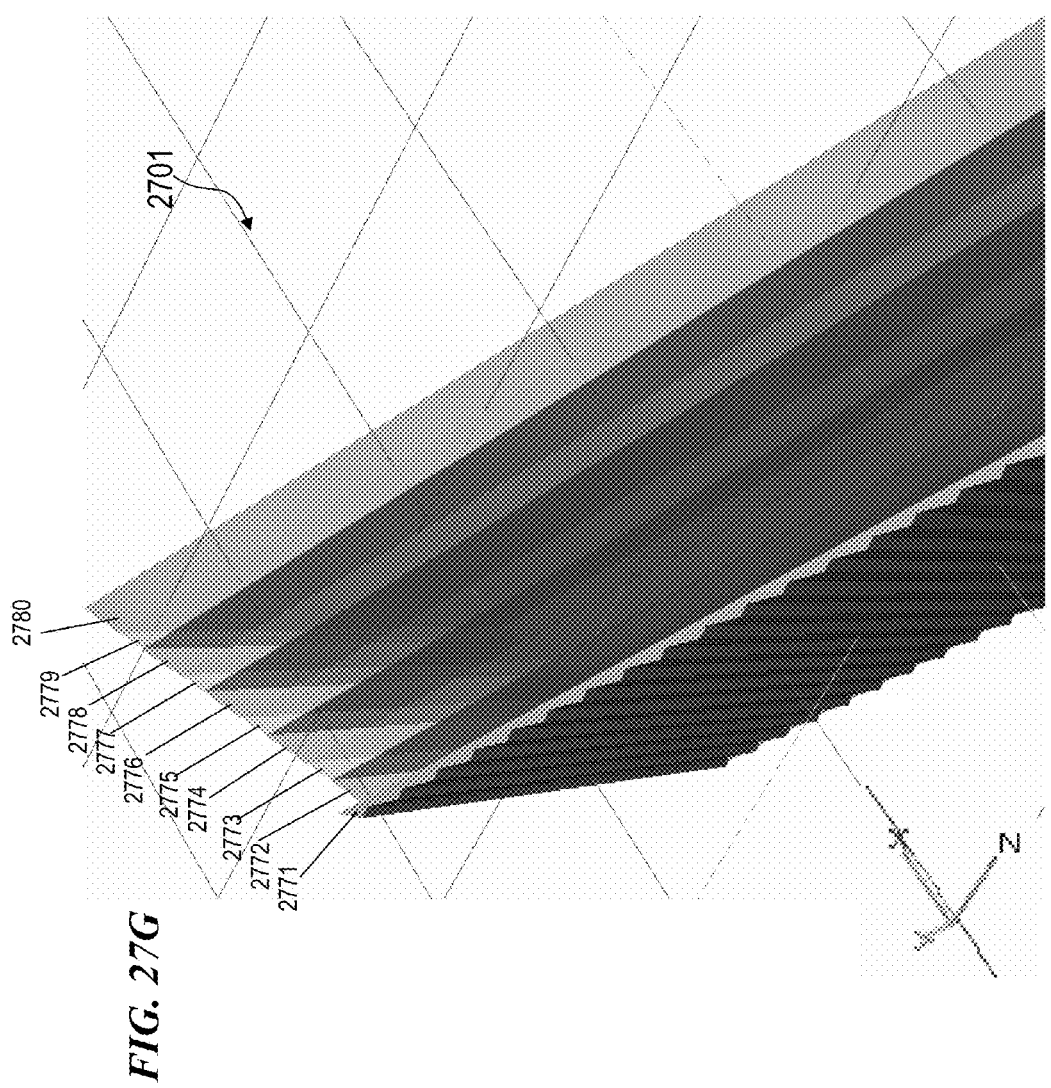
FIG. 27G is a close-up schematic view of a portion of WDC-3D-SBC 2700.

In some embodiments, the input gratings 2721-2729 are high-efficiency gratings (as shown by grating 2701 in FIG. 27G) each having a metal interior surface 2771 and a plurality of dielectric layers 2772-2780 wherein the thickness and refractive index of the dielectric layers 2772-2780 are chosen based on the range of wavelengths of the input beams incident upon their respective input gratings such that the power delivered into the diffracted beam of each of a plurality of the input gratings is maximized and/or the output beam power is maximized. In some embodiments, a single input grating configuration (i.e., the same lines-per-millimeter grating-line spacing, the same grating-line geometry, and the same dielectric layer thicknesses and material) can be used for a plurality of the input beams by having the input beams directed at different X- and Y-displacement angles out of the plane of the intermediate beams (e.g., in some embodiments, a single input grating design is used, wherein every input grating has the identical grating-line spacing (i.e., the spacing between parallel lines on the face of the grating; sometimes called the grating pitch) and design, and the identical dielectric thicknesses; while in other embodiments, more than one but fewer than all of the input gratings (e.g., two, three or four designs) have different design configurations better optimized for the range of input wavelengths used, while in still other embodiments, different design configurations are used for every input grating). In some embodiments, the output grating 130 has a different dielectric-layer configuration that is designed to accommodate the full range of input wavelengths used. Such an output grating may be more costly and/or less efficient than are the input gratings for one particular input wavelength, but a single output grating is needed in some embodiments, so a more costly and/or less efficient broad-bandwidth design is used. In some embodiments, the input gratings 2721-2729 are all substantially identical high-efficiency gratings (as shown by grating 2701 in FIG. 27G) having the same metal surface 2771 and the same plurality of dielectric layers 2772-2780 and wherein the input gratings are rotated (i.e., angled to accommodate input beams from out-of-plane relative to the plane of the intermediate beams) according to the wavelength of the input beam incident upon each input grating such that the reflectance of the input grating is maximized.

In some embodiments, the input gratings 2721-2729 are placed in adjacent locations as close together as possible, in order to have the smallest angle of convergence toward the output grating 130, which allows the use of diffraction angles that are as close as possible to the Littrow angle. In some embodiments, at least one of the input gratings is at an angle less than the Littrow angle and at least one of the input gratings is at an angle greater than the Littrow angle (i.e., the output beam exits between the input gratings located at angles less than the Littrow angle and the input gratings at angles greater than the Littrow angle). In some embodiments, an equal number of input gratings are at an angle less than the Littrow angle and an equal number of input gratings are at an angle more than the Littrow angle. In other embodiments, the SBC system of the present invention uses a larger number of input gratings on one side of Littrow (angles smaller than the Littrow angle) than on the other, since the first-order diffraction continues further (i.e., at a greater angle from Littrow) when going towards angles smaller than Littrow.

In some embodiments, WDC-3D-SBC 2700 is limited by the size of the angle between the outermost intermediate beams at the output grating 130 (herein called the output convergence angle), between the intermediate beam from grating 2721 and the intermediate beam from grating 2729, the size of the input gratings 2721-2729, and the distance between the output grating 130 and input gratings 2721-2729. In some embodiments, each input grating is placed equidistant from the output grating (along a circular arc centered at the output grating 130) in order that the beam spread width amount (i.e., the width of each beam becomes larger as compared to its height due to the chromatic dispersion caused by the non-zero linewidth of each laser beam) for every beam is approximately equal. In other embodiments, the input gratings 2721-2729 are located along a straight line approximately perpendicular to the output beam. In other embodiments, the locations of the input gratings 2721-2729 are staggered at different distances in order to get the intermediate beams (the beams after the input gratings 2721-2729 but before the output grating 130) as close together as possible, thus increasing the number of input beams that can be combined. In some embodiments, once the center-to-center spacing of the intermediate beams (and thus the input gratings 2721-2729) has been minimized, the center-center spacing of the input lasers and their respective collimating optics becomes a limiting factor as to how many input beams 2721-2729 can be combined into a single output beam 199. The WDC-SBC systems of the present invention provide for spectral-beam combining of non-parallel input laser beams 2711-2719 while still providing wavelength-dispersion compensation. In some embodiments, the present invention allows approximately two (or more) times as many laser beams to be combined while having at least some chromatic dispersion compensation, as compared to configurations as described in U.S. Pat. No. 7,199,924 and U.S. Pat. No. 7,233,442, wherein the input laser beams are all approximately parallel and coplanar.

In some embodiments, the present invention is implemented as a combination of any of the above the above systems, methods, components and configurations with the systems, methods, configurations and/or components described in the commonly owned U.S. Pat. No. 7,199,924, U.S. Pat. No. 7,391,561, and U.S. Pat. No. 7,233,442, and U.S. patent application Ser. Nos. 11/565,619, 11/426,302, 11/688,854 and 11/556,658, each of which is incorporated herein by reference.

In some embodiments, active real-time beam centering of each beam is accomplished during system operation by detecting whether the particular beam is parallel but not aligned (i.e., the beam does not hit the single spot on the diffraction grating to which the other beams are directed) into the single output beam, as described in U.S. Pat. No. 7,199,924 and U.S. Pat. No. 7,233,442.

U.S. Pat. No. 6,212,310 entitled "High power fiber gain media system achieved through power scaling via multiplexing" by Waarts et al., which is incorporated herein by reference, includes a single grating in FIG. 12 of U.S. Pat. No. 6,212,310. The present invention provides an improvement that both compensates for chromatic dispersion and allows wider spacings between sources when using dielectric gratings having a given bandwidth.

Another aspect of some embodiments of the present invention provides a method that includes providing a plurality of laser beams including a first laser beam and a second laser beam, wavelength tuning the first fiber to generate the first laser beam at the first wavelength and having a linewidth of about 1 nm or less, wavelength tuning the second fiber to generate the second laser beam at the second wavelength and having a linewidth of about 1 nm or less, and spectrally combining the plurality of laser beams into a single output beam using one or more high-efficiency dielectric diffractive gratings, the output beam having a power-per-unit-area incident to least one grating of about 10 W/(cm$^2$ of grating surface of the output grating) or more.

In some embodiments, the beam output power/area is about 15 W/(cm$^2$ of grating surface of the output grating) or more. In some embodiments, the beam output power/area is about 20 W/(cm$^2$ of grating surface of the output grating) or more. In some embodiments, the beam output power/area is about 50 W/(cm$^2$ of grating surface of the output grating) or more. In some embodiments, the beam output power/area is about 100 W/(cm$^2$ of grating surface of the output grating) or more. In some embodiments, the beam output power/area is about 150 W/(cm$^2$ of grating surface of the output grating) or more. In some embodiments, the beam output power/area is about 200 W/(cm$^2$ of grating surface of the output grating) or more. In some embodiments, the beam output power/area is about 500 W/(cm$^2$ of grating surface of the output grating) or more. In some embodiments, the beam output power/area is about 1,000 W/(cm$^2$ of grating surface of the output grating) or more. In some embodiments, the beam output power/area is about 1,500 W/(cm$^2$ of grating surface of the output grating) or more. In some embodiments, the beam output power/area is about 2,000 W/(cm$^2$ of grating surface of the output grating) or more. In some embodiments, the beam output power/area is about 5,000 W/(cm$^2$ of grating surface of the output grating) or more. In some embodiments, the beam output power/area is about 10,000 W/(cm$^2$ of grating surface of the output grating) or more. In some embodiments, the beam output power/area is about 15,000 W/(cm$^2$ of grating surface of the output grating) or more. In some embodiments, the beam output power/area is about 20,000 W/(cm$^2$ of grating surface of the output grating) or more. In some embodiments, the beam output power/area is about 50,000 W/(cm$^2$ of grating surface of the output grating) or more. In some embodiments, the beam output power/area is about 100,000 W/(cm$^2$ of grating surface of the output grating) or more.

In some embodiments, these output power densities are possible by using high-efficiency dielectric gratings where the output beam diffracted from the output grating has 80% or more of the power sum of the input beams, or, in some embodiments, 85% or more, 90% or more, 95% or more, 97% or more, 98% or more, 99% or more, 99.5% or more, 99.7% or more, 99.8% or more, or 99.9% or more, in order to minimize absorption of heat from the diffracted beam(s). In some embodiments, the gratings are high-efficiency dielectric reflection gratings, in order to minimize absorption of heat from the diffracted beam(s). In some embodiments, the gratings are oriented at or close to the Littrow angle (i.e., where the output angle $\beta \approx \alpha$, the input angle, relative to the grating-surface's normal vector) for at least some of the wavelengths used, in order to minimize absorption of heat from the diffracted beam(s).

In some embodiments, the output beam's power is 500 W or more. In some embodiments, the output beam's power is 1,000 W or more. In some embodiments, the output beam's power is 2,000 W or more. In some embodiments, the output beam's power is 5,000 W or more. In some embodiments, the output beam's power is 10,000 W or more. In some embodiments, the output beam's power is 20,000 W or more. In some embodiments, the output beam's power is 50,000 W or more. In some embodiments, the output beam's power is 100,000 W or more. In some embodiments, the output beam's power is 200,000 W or more. In some embodiments, the output beam's power is 500,000 W or more. In some embodiments, the output beam's power is 1,000,000 W or more. In some embodiments, the output beam's power is 2,000,000 W or more. In some embodiments, the output beam's power is 5,000,000 W or more. In some embodiments, the output beam's power is 10,000,000 W or more. In some of each of the above embodiments, the output beam's power is about 50,000,000 W or less (i.e., a range of power between one of the above lower limits and a 50,000,000 W upper limit). In some of each of the above embodiments, the output beam's power is about 100,000,000 W or less. In some of each of the above embodiments, the output beam's power is about 200,000,000 W or less. In some of each of the above embodiments, the output beam's power is about 500,000,000 W or less.

In order to obtain high beam quality, $M^2$, some embodiments control the FWHM linewidth. In some embodiments, the first and second (and optionally other subsequent) laser beams each have a linewidth of about 0.5 nm or less. In some embodiments, the first and laser beam each have a linewidth of about 0.2 nm or less. In some embodiments, the first and second laser beams each have a linewidth of about 0.1 nm or less. In some embodiments, the first and second laser beams each have a linewidth of about 0.05 nm or less. In some embodiments, the first and second laser beams each have a linewidth of about 0.02 nm or less. In some embodiments, the first and second laser beams each have a linewidth of about 0.01 nm or less. In some embodiments, the first and second laser beams each have a linewidth of about 0.005 nm or less. In some embodiments, the first and second laser beams each have a linewidth of about 0.002 nm or less. In some embodiments, the first and second laser beams each have a linewidth of about 0.001 nm or less.

In order to obtain high beam quality, $M^2$, some embodiments control spectral fill (i.e., the ratio of FWHM linewidth/center-to-center wavelength spacing=$\Delta\lambda/(\lambda_{N+1}-\lambda_N)$)) relative to the spatial fill (i.e., the ratio of beam-waist width $\omega_0$/beam center-to-center spacing $(X_{N+1}-X_N)$) of successive input beams. In some embodiments, spectral fill $\Delta\lambda/(\lambda_{N+1}-\lambda_N)$ is set to be equal to or less than spatial fill $\omega_0/(X_{N+1}-X_N)$. In some embodiments, $\Delta\lambda/(\lambda_{N+1}-\lambda_N)<\omega_0/(X_{N+1}-X_N)$. In some embodiments, $\Delta\lambda/(\lambda_{N+1}-\lambda_N)<0.9\omega_0/(X_{N+1}-X_N)$. In some embodiments, $\Delta\lambda/(\lambda_{N+1}-\lambda_N)<0.8\omega_0/(X_{N+1}-X_N)$. In some embodiments, $\Delta\lambda/(\lambda_{N+1}-\lambda_N)<0.7\omega_0/(X_{N+1}-X_N)$. In some embodiments, $\Delta\lambda/(\lambda_{N+1}-\lambda_N)<0.6\omega_0/(X_{N+1}-X_N)$. In some embodiments, $\Delta\lambda/(\lambda_{N+1}-\lambda_N)<0.5\omega_0/(X_{N+1}-X_N)$. In some embodiments, $\Delta\lambda/(\lambda_{N+1}-\lambda_N)<0.4\omega_0/(X_{N+1}-X_N)$. In some embodiments, $\Delta\lambda/(\lambda_{N+1}-\lambda_N)<0.3\omega_0/(X_{N+1}-X_N)$. In some embodiments, $\Delta\lambda/(\lambda_{N+1}-\lambda_N)<0.2\omega_0/(X_{N+1}-X_N)$. In some embodiments, $\Delta\lambda/(\lambda_{N+1}-\lambda_N)<0.1\omega_0/(X_{N+1}-X_N)$.

In order to obtain high beam quality, $M^2$, some embodiments reduce the output beam center-to-center spacing $(X_{N+1}-X_N)$ by shaving, grinding or otherwise reducing a diameter of one or more of the output (e.g., final stage of the power amplifier) fibers. Some such embodiments use a plurality of cores spaced side-by-side along a straight transverse line of a "ribbon" fiber, in order to reduce the output beam center-to-center spacing $(X_{N+1}-X_N)$. Some embodiments reduce the center-to-center input spacing $(X'_{N+1}-X'_N)$ by shaving, grinding or otherwise reducing a diameter of one or more of the frequency-setting (e.g., master oscillator) fibers. Some embodiments use a side or star coupler at or near an output end of the output (e.g., final stage of the power amplifier) fibers. Some embodiments use a photonic-crystal fiber, fiber-like rod, or rod as the output or final stage of the power amplifier.

In order to obtain high beam quality, $M^2$, and to also obtain high power, some embodiments operate a large-mode area amplifying fiber, and/or photonic-crystal fiber, fiber-like rod, or rod, operating substantially on its fundamental mode (i.e., the $LP_{01}$ mode of a fiber, corresponding to a $TEM_{00}$ mode of other lasers).

Some embodiments further include using polarized input laser beams (e.g., as described in U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD"). In some such embodiments, one or more of the plurality of input laser beams has a waveplate in its propagation path operably configured to adjust its angle of polarization.

In some embodiments, the input beams are pulsed in order to increase their power. In some such embodiments, the input-beam pulses are synchronized with one another to occur simultaneously in order to increase the power in the output beam pulses. In other embodiments, the input-beam pulses are synchronized with one another to occur sequentially one after another in order to increase the pulse duration in the output beam pulses or make the output beam substantially continuous wave (cw).

Some embodiments further include temporally forming the first laser beam into a first serial plurality of pulses and temporally forming the second laser beam into a second serial plurality of pulses, each such pulse having a pulse length of about 10 ns or less. In some embodiments, the pulse lengths are about 9 ns or less. In some embodiments, the pulse lengths are about 8 ns or less. In some embodiments, the pulse lengths are about 7 ns or less. In some embodiments, the pulse lengths are about 6 ns or less. In some embodiments, the pulse lengths are about 5 ns or less. In some embodiments, the pulse lengths are about 5 ns or less. In some embodiments, the pulse lengths are about 4 ns or less. In some embodiments, the pulse lengths are about 3 ns or less. In some embodiments, the pulse lengths are about 2 ns or less. In some embodiments, the pulse lengths are about 1 ns or less. In some embodiments, the pulse lengths are about 0.5 ns or less.

In some embodiments, pulses of the first serial plurality of pulses are alternated with pulses of the second serial plurality of pulses.

Some embodiments further include detecting that one of the laser beams has become misaligned relative to the single combined beam, determining that the first laser beam is the misaligned one, and adjusting the wavelength tuning of the first fiber in order that the first laser beam is aligned relative to the single combined beam.

In some embodiments, the spectrally combining further includes: providing a first diffractive element, introducing a first chromatic dispersion into the first laser beam with the first diffractive element, providing a second diffractive element, introducing a second chromatic dispersion into the second laser beam with the second diffractive element, and providing a third diffractive element, and spectrally combining the first and second laser beams and introducing a third chromatic dispersion into the first laser beam with the third diffractive element, wherein the third chromatic dispersion is a compensating dispersion that negates at least a portion of the first chromatic dispersion from the first laser beam, and introducing a fourth chromatic dispersion into the second laser beam with the third diffractive element, wherein the fourth chromatic dispersion is a compensating dispersion that negates at least a portion of the second chromatic dispersion from the second laser beam.

In some embodiments, the providing of the first diffractive element and the second diffractive element includes providing dielectric diffractive gratings having the same diffractive pattern on both the first diffractive element and the second diffractive element, and positioning the second diffractive element so a diffractive surface of the second diffractive element is approached by the laser beams at an angle corresponding to an angle the beams left the first diffractive element.

Some embodiments further include providing a plurality of Yb-doped large-mode-area (LMA) optical-amplification fibers operating substantially on the fundamental mode, including a first fiber and a second fiber, pumping of each of the plurality of fibers with pump light from one or more laser diodes, amplifying, with the first fiber, the first laser beam at a first wavelength, and amplifying, with the second fiber, the second laser beam at a second wavelength.

Some embodiments further include filtering the first laser beam to a full-width half-maximum linewidth of about one nanometer or less; filtering the second laser beam to a full-width half-maximum linewidth of about one nanometer or less; pulsing the first laser beam to a pulse length of about ten nanoseconds or less, and sufficiently short to substantially prevent SBS buildup in the amplifying of the first laser beam; and pulsing the second laser beam to a pulse length of about ten nanoseconds or less, and sufficiently short to substantially prevent SBS buildup in the amplifying of the second laser beam. For the filtering, in some embodiments, the full-width half-maximum linewidth is about 1 nm or less. For the filtering, in some embodiments, the full-width half-maximum linewidth is about 0.9 nm or less. For the filtering, in some embodiments, the full-width half-maximum linewidth is about 0.8 nm or less. For the filtering, in some embodiments, the full-width half-maximum linewidth is about 0.7 nm or less. For the filtering, in some embodiments, the full-width half-maximum linewidth is about 0.6 nm or less. For the filtering, in some embodiments, the full-width half-maximum linewidth is about 0.5 nm or less. In some embodiments, the full-width half-maximum linewidth is about 0.4 nm or less. In some embodiments, the full-width half-maximum linewidth is about 0.3 nm or less. In some embodiments, the full-width half-maximum linewidth is about 0.2 nm or less. In some embodiments, the full-width half-maximum linewidth is about 0.1 nm or less. For the filtering, in some embodiments, the full-width half-maximum linewidth is about 0.09 nm or less. For the filtering, in some embodiments, the full-width half-maximum linewidth is about 0.08 nm or less. For the filtering, in some embodiments, the full-width half-maximum linewidth is about 0.07 nm or less. For the filtering, in some embodiments, the full-width half-maximum linewidth is about 0.06 nm or less. In some embodiments, the full-width half-maximum linewidth is about 0.05 nm or less. In some embodiments, the full-width half-maximum linewidth is about 0.04 nm or less. In some embodiments, the full-width half-maximum linewidth is about 0.03 nm or less. In some embodiments, the full-width half-maximum linewidth is about 0.02 nm or less. In some embodiments, the full-width half-maximum linewidth is about 0.01 nm or less. For the filtering, in some embodiments, the full-width half-maximum linewidth is about 0.009 nm or less. For the filtering, in some embodiments, the full-width half-maximum linewidth is about 0.008 nm or less. For the filtering, in some embodiments, the full-width half-maximum linewidth is about 0.007 nm or less. For the filtering, in some embodiments, the full-width half-maximum linewidth is about 0.006 nm or less. In some embodiments, the full-width half-maximum linewidth is about 0.005 nm or less. In some embodiments, the full-width half-maximum linewidth is about 0.004 nm or less. In some embodiments, the full-width half-maximum linewidth is about 0.003 nm or less. In some embodiments, the full-width half-maximum linewidth is about 0.002 nm or less. In some embodiments, the full-width half-maximum linewidth is about 0.001 nm or less. For the filtering, in some embodiments, the full-width half-maximum linewidth is about 0.0009 nm or less. For the filtering, in some embodiments, the full-width half-maximum linewidth is about 0.0008 nm or less. For the filtering, in some embodiments, the full-width half-maximum linewidth is about 0.0007 nm or less. For the filtering, in some embodiments, the full-width half-maximum linewidth is about 0.0006 nm or less. In some embodiments, the full-width half-maximum linewidth is about 0.0005 nm or less. In some embodiments, the full-width half-maximum linewidth is about 0.0004 nm or less. In some embodiments, the full-width half-maximum linewidth is about 0.0003 nm or less. In some embodiments, the full-width half-maximum linewidth is about 0.0002 nm or less. In some embodiments, the full-width half-maximum linewidth is about 0.0001 nm or less.

Some embodiments further include detecting that one of the laser beams has become angularly misaligned relative to the single combined beam, determining which laser beam is the angularly misaligned one, and adjusting an angle of the angularly misaligned laser beam in order to align it relative to the single combined beam, wherein the detecting of the angularly misaligned beam and the determining of which laser beam is the angularly misaligned one are based on a timing of a pulse of one of the laser beams.

In some embodiments, the detecting of the angularly misaligned beam and the determining of which laser beam is the angularly misaligned one are performed while one or more of the other beams are active. As used herein, two lasers are both ON is defined to mean instantaneously and simultaneously emitting light, whether as when two pulse are simultaneously on, or two cw lasers are both on; whereas two lasers are both ACTIVE is defined to mean operating in their normal mode, which, when pulsed lasers are discussed, means where both lasers are pulsing, whether or not the pulses of one laser are instantaneously and simultaneously emitting light, as well as when two cw lasers are both on.

In some embodiments, the determining of which laser beam is the angularly misaligned one is performed during a time when a plurality of the other laser beams are on, and includes: changing a power value of a first laser beam, detecting a corresponding change in a misaligned beam; and changing the angle of the first laser based on the detecting of the corresponding change in the misaligned beam.

In some embodiments, the present invention provides a method that includes providing a plurality of laser beams including a first laser beam at a first characteristic wavelength having a full-width half maximum (FWHM) linewidth of at most 1 nm and a second laser beam at a second characteristic wavelength having an FWHM linewidth of at most 1 nm; providing a diffractive output grating; providing one or more diffractive input gratings optically coupled to receive the first and second laser beams, wherein the first and second laser beams are non parallel to one another when they impinge on the one or more input gratings; diffracting the first and second laser beams with the one or more input gratings at converging angles toward the output grating; and spectrally combining the first and second laser beams into a single output beam at the output grating. In some embodiments, the output grating and/or the one or more input gratings are high-efficiency dielectric diffractive gratings.

In some embodiments, the present invention provides a method that includes providing a plurality of laser beams including a first laser beam at a first characteristic wavelength and a second laser beam at a second characteristic wavelength; providing a diffractive output grating; providing one or more diffractive input gratings optically coupled to receive the first and second laser beams, wherein the first and second laser beams are non parallel to one another when they impinge on the one or more input gratings; diffracting the first and second laser beams with the one or more input gratings at converging angles toward the output grating; and spectrally combining the first and second laser beams into a single output beam at the output grating.

Some embodiments of the method further include placing the one or more input gratings all parallel to one another and substantially parallel to the output grating with the faces of the input gratings facing the grating face of the output grating, and wherein the one or more input gratings each have a grating-line spacing that is different than the output grating's grating-line spacing.

Some embodiments of the method further include placing the one or more input gratings each non-parallel to the output grating with the faces of the input gratings generally facing the output grating, and wherein the one or more input gratings each have a grating-line spacing that is equal to the output grating's grating-line spacing.

Some embodiments of the method further include generating the plurality of laser beams with master-oscillator power-amplifier (MOPA) laser sources having fiber gain media. Some embodiments of the present invention use amplifier configurations and/or MOPA configurations such as described in U.S. Pat. No. 7,391,561 titled "FIBER- OR ROD-BASED OPTICAL SOURCE FEATURING A LARGE-CORE, RARE-EARTH-DOPED PHOTONIC-CRYSTAL DEVICE FOR GENERATION OF HIGH-POWER PULSED RADIATION AND METHOD," which is incorporated herein by reference.

In some embodiments, the spectrally combining outputs the single output beam at a power/area of at least about 10,000 W/(cm$^2$ of grating surface of the output grating).

In some embodiments, the spectrally combining outputs the single output beam at a power of at least about 10 megawatts.

In some embodiments, the diffracting the first and second laser beams with the one or more input gratings includes introducing a first chromatic dispersion to the first laser beam and a second chromatic dispersion to the second laser beam, and wherein the spectrally combining of the first and second laser beams includes introducing a compensating chromatic dispersion that negates at least a portion of the first chromatic dispersion and at least a portion of the second chromatic dispersion such that the output beam has less chromatic dispersion than either the first or the second laser beams after they encounter the one or more input gratings.

In some embodiments, the first chromatic dispersion's angle of dispersion is substantially equal to the second chromatic dispersion's angle of dispersion.

In some embodiments, the first chromatic dispersion's width at the output grating is substantially equal to the second chromatic dispersion's width at the output grating; that is, in some embodiments, a diameter of the first beam due to the first chromatic dispersion's dispersion at the output grating is substantially equal to a corresponding diameter of the second beam due to the second chromatic dispersion's dispersion at the output grating.

In some embodiments, the one or more input gratings include a plurality of input gratings, and the method further includes placing each of the plurality of input gratings approximately equidistant from the output grating.

In some embodiments, the present invention provides an apparatus that includes a plurality of laser sources configured to emit laser beams including a first laser beam at a first characteristic wavelength having a full-width half maximum (FWHM) linewidth of at most 1 nm and a second laser beam at a second characteristic wavelength having an FWHM linewidth of at most 1 nm; a high-efficiency dielectric diffractive output grating; and one or more high-efficiency dielectric diffractive input gratings optically coupled to the plurality of laser sources to receive the first and second laser beams, wherein the first and second laser beams are non parallel to one another, and wherein the one or more input gratings diffract the first and second laser beams at converging angles toward the output grating; and wherein the output grating is configured to spectrally combine the first and second laser beams into a single output beam. In some embodiments, the present invention provides an apparatus that includes a plurality of laser sources configured to emit laser beams including a first laser beam at a first characteristic wavelength and a second laser beam at a second characteristic wavelength; a diffractive output grating; and one or more diffractive input gratings optically coupled to the plurality of laser sources to receive the first and second laser beams, wherein the first and second laser beams are non parallel to one another, and wherein the one or more input gratings diffract the first and second laser beams at converging angles toward the output grating; and wherein the output grating is configured to spectrally combine the first and second laser beams into a single output beam. In some such embodiments, at least some of the one or more input gratings are high-efficiency dielectric gratings. In some embodiments, the output grating is a high-efficiency dielectric grating.

In some embodiments of the apparatus, the one or more input gratings are all parallel to one another and substantially parallel to the output grating with the faces of the input gratings facing the grating face of the output grating, and wherein the one or more input gratings each have a grating-line spacing that is different than the output grating's grating-line spacing.

In some embodiments of the apparatus, the one or more input gratings are each non-parallel to the output grating with the faces of the input gratings generally facing the output grating, and wherein the one or more input gratings each have a grating-line spacing that is equal to the output grating's grating-line spacing.

In some embodiments of the apparatus, the plurality of laser sources includes MOPA laser sources having fiber gain media.

In some embodiments of the apparatus, the single output beam outputs at a power/area of about 10 W/cm$^2$ or more.

In some embodiments of the apparatus, the single output beam has a power of at least about 10 megawatts.

In some embodiments of the apparatus, the one or more input gratings are configured to introduce a first chromatic dispersion to the first laser beam and a second chromatic dispersion to the second laser beam, and wherein the output grating introduces a compensating chromatic dispersion that negates at least a portion of the first chromatic dispersion and at least a portion of the second chromatic dispersion such that the output beam has less chromatic dispersion than either the first or the second laser beams after they encounter the one or more input gratings. In some such embodiments, the first chromatic dispersion's angle is substantially equal to the second chromatic dispersion's angle of dispersion.

In some embodiments of the apparatus, the first chromatic dispersion's width at the output grating is substantially equal to the second chromatic dispersion's width at the output grating.

In some embodiments of the apparatus, the one or more input gratings include a plurality of input gratings that are each placed approximately equidistant from the output grating.

In some embodiments, the present invention provides an apparatus that includes a plurality of fiber gain media configured to emit laser beams including a first fiber gain medium that emits a first laser beam at a first characteristic wavelength having a full-width half maximum (FWHM) linewidth of at most 1 nm and a second fiber gain medium that emits a second laser beam, non-parallel to the first beam, at a second characteristic wavelength having an FWHM linewidth of at most 1 nm; and means for spectrally combining and chromatic-dispersion compensating the first and second non-parallel laser beams into a single output beam.

It is specifically contemplated that the present invention includes embodiments having combinations and sub-combinations of the various embodiments and features that are individually described herein (i.e., some of the features from one embodiment combined with some of the features of another embodiment. Further, some embodiments include fewer than all the components described as part of any one of the embodiments described herein.

It is further specifically contemplated that the present invention includes embodiments having combinations and sub-combinations of the various embodiments and features that are individually described herein (i.e., some of the features from one embodiment combined with some of the features of another embodiment) and in combinations and sub-combinations of the various embodiments and features that are individually described in the U.S. patents and U.S. patent applications that have been incorporated herein by reference. Further, some embodiments include fewer than all the components described as part of any one of the embodiments described herein.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method comprising:
   providing a plurality of laser beams including a first laser beam at a first characteristic wavelength and a second laser beam at a second characteristic wavelength;
   providing a diffractive output grating;
   providing one or more diffractive input gratings optically coupled to receive the first and second laser beams, wherein the first and second laser beams are non parallel to one another when they impinge on the one or more input gratings;
   diffracting the first and second laser beams with the one or more input gratings at converging angles toward the output grating; and
   spectrally combining the first and second laser beams into a single output beam at the output grating.

2. The method of claim 1, further comprising:
   placing the one or more input gratings all parallel to one another and substantially parallel to the output grating with the faces of the input gratings facing the grating face of the output grating, and wherein the one or more input gratings each have a grating-line spacing that is different than the output grating's grating-line spacing.

3. The method of claim 1, further comprising:
   placing the one or more input gratings each non-parallel to the output grating with the faces of the input gratings generally facing the output grating, and wherein the one or more input gratings each have a grating-line spacing that is equal to the output grating's grating-line spacing.

4. The method of claim 1, further comprising:
   generating the plurality of laser beams with master-oscillator power-amplifier (MOPA) laser sources having fiber gain media.

5. The method of claim 1, wherein the spectrally combining outputs the single output beam at a power/area of at least about 10,000 W/(cm$^2$ of grating surface of the output grating).

6. The method of claim 1, wherein the spectrally combining outputs the single output beam at a power of at least about 10 megawatts.

7. The method of claim 1, wherein the diffracting the first and second laser beams with the one or more input gratings includes introducing a first chromatic dispersion to the first laser beam and a second chromatic dispersion to the second laser beam, and wherein the spectrally combining of the first and second laser beams includes introducing an opposite chromatic dispersion that negates at least a portion of the first chromatic dispersion and at least a portion of the second chromatic dispersion such that the output beam has less chromatic dispersion than either the first or the second laser beams after they encounter the one or more input gratings.

8. The method of claim 7, wherein the first chromatic dispersion's angle of dispersion is substantially equal to the second chromatic dispersion's angle of dispersion.

9. The method of claim 7, wherein a diameter of the first beam due to the first chromatic dispersion's dispersion at the output grating is substantially equal to a corresponding diameter of the second beam due to the second chromatic dispersion's dispersion at the output grating.

10. The method of claim 1, wherein the one or more input gratings include a plurality of input gratings, the method further comprising:
    locating each of the plurality of input gratings approximately equidistant from the output grating.

11. An apparatus comprising:
    a plurality of laser sources configured to emit laser beams including a first laser beam at a first characteristic wavelength and a second laser beam at a second characteristic wavelength;
    a diffractive output grating; and
    one or more diffractive input gratings optically coupled to the plurality of laser sources to receive the first and second laser beams, wherein the first and second laser beams are non parallel to one another, and wherein the one or more input gratings diffract the first and second laser beams at converging angles toward the output grating; and wherein the output grating is configured to spectrally combine the first and second laser beams into a single output beam.

12. The apparatus of claim 11, wherein the one or more input gratings are all parallel to one another and substantially parallel to the output grating with the faces of the input gratings facing the grating face of the output grating, and wherein the one or more input gratings each have a grating-line spacing that is different than the output grating's grating-line spacing.

13. The apparatus of claim 11, wherein the one or more input gratings are each non-parallel to the output grating with the faces of the input gratings generally facing the output grating, and wherein the one or more input gratings each have a grating-line spacing that is equal to the output grating's grating-line spacing.

14. The apparatus of claim 11, wherein the plurality of laser sources include one or more master-oscillator power-amplifier (MOPA) laser sources having fiber gain media.

15. The apparatus of claim 11, wherein the single output beam outputs at a power/area of at least about 10,000 W/(cm$^2$ of grating surface of the output grating).

16. The apparatus of claim 11, wherein the single output beam has a power of at least about 10 megawatts.

17. The apparatus of claim 11, wherein the one or more input gratings are configured to introduce a first chromatic dispersion to the first laser beam and a second chromatic dispersion to the second laser beam, and wherein the output grating introduces an opposite chromatic dispersion that negates at least a portion of the first chromatic dispersion and at least a portion of the second chromatic dispersion such that the output beam has less chromatic dispersion than either the first or the second laser beams after they encounter the one or more input gratings.

18. The apparatus of claim 17, wherein the first chromatic dispersion's angle of dispersion is substantially equal to the second chromatic dispersion's angle of dispersion.

19. The apparatus of claim 17, wherein a diameter of the first beam due to the first chromatic dispersion's dispersion at the output grating is substantially equal to a corresponding diameter of the second beam due to the second chromatic dispersion's dispersion at the output grating.

20. The apparatus of claim 11, wherein the one or more input gratings include a plurality of input gratings that are each placed approximately equidistant from the output grating.

21. The apparatus of claim 11, wherein at least some of the one or more input gratings are high-efficiency dielectric gratings.

22. The apparatus of claim 11, wherein the output grating is a high-efficiency dielectric grating.

23. An apparatus comprising:
a plurality of fiber gain media configured to emit laser beams including a first fiber gain medium that emits a first laser beam at a first characteristic wavelength having a full-width half maximum (FWHM) linewidth of at most 1 nm and a second fiber gain medium that emits a second laser beam, non-parallel to the first beam, at a second characteristic wavelength having an FWHM linewidth of at most 1 nm; and
means for spectrally combining and chromatic-dispersion compensating the first and second non-parallel laser beams into a single output beam.

* * * * *